(12) United States Patent
Jeon et al.

(10) Patent No.: US 8,472,519 B2
(45) Date of Patent: *Jun. 25, 2013

(54) METHOD AND APPARATUS FOR DECODING/ENCODING A VIDEO SIGNAL

(75) Inventors: Byeong Moon Jeon, Seoul (KR); Seung Wook Park, Seoul (KR); Han Suh Koo, Seoul (KR); Yeon Kwan Koo, legal representative, Seoul (KR); Yong Joon Jeon, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 607 days.

This patent is subject to a terminal disclaimer.

(21) Appl. No.: 12/585,839

(22) Filed: Sep. 25, 2009

(65) Prior Publication Data
US 2010/0111169 A1    May 6, 2010

Related U.S. Application Data

(63) Continuation of application No. 12/225,688, filed as application No. PCT/KR2007/001581 on Mar. 30, 2007.

(60) Provisional application No. 60/787,171, filed on Mar. 30, 2006, provisional application No. 60/801,398, filed on May 19, 2006, provisional application No. 60/810,642, filed on Jun. 5, 2006, provisional application No. 60/830,601, filed on Jul. 14, 2006, provisional application No. 60/832,153, filed on Jul. 21, 2006, provisional application No. 60/837,925, filed on Aug. 16, 2006, provisional application No. 60/840,032, filed on Aug. 25, 2006, provisional application No. 60/842,152, filed on Sep. 5, 2006.

(51) Int. Cl.
*H04N 7/12*    (2006.01)

(52) U.S. Cl.
USPC .................................. 375/240.12; 375/240.25

(58) Field of Classification Search
USPC ..................................................... 375/240.12
See application file for complete search history.

(56) References Cited

U.S. PATENT DOCUMENTS

| | | | |
|---|---|---|---|
| 5,886,736 A | 3/1999 | Chen | |
| 6,055,012 A | 4/2000 | Haskell et al. | |

(Continued)

FOREIGN PATENT DOCUMENTS

| | | |
|---|---|---|
| EP | 0 652 678 | 5/1995 |
| EP | 1784022 | 5/2007 |

(Continued)

OTHER PUBLICATIONS

Chinese Office Action dated Sep. 1, 2010, issued in corresponding Application No. CN 200780018827.3.

(Continued)

*Primary Examiner* — Christopher S Kelley
*Assistant Examiner* — Maria Vazquez Colon
(74) *Attorney, Agent, or Firm* — Harness, Dickey & Pierce

(57) ABSTRACT

The method includes obtaining initialization information of a reference picture list for a random access slice, obtaining type information indicating whether the random access slice is predicted for a single direction or a bi-direction, initializing the reference picture list using the initialization information according to the type information, obtaining modification information for the initialized reference picture list from a multi-view video data stream, determining an assignment modification value for modifying an inter-view reference index in the initialized reference picture list according to the modification information, and modifying the initialized reference picture list for inter-view prediction using the determined assignment modification value.

12 Claims, 45 Drawing Sheets

U.S. PATENT DOCUMENTS

| | | | |
|---|---|---|---|
| 6,278,736 | B1 | 8/2001 | De Haan et al. |
| 6,441,844 | B1 | 8/2002 | Tatsuzawa |
| 6,782,053 | B1 | 8/2004 | Lainema |
| 6,804,301 | B2 | 10/2004 | Wu et al. |
| 7,088,772 | B2 | 8/2006 | Kim et al. |
| 7,489,342 | B2 | 2/2009 | Xin et al. |
| 7,671,894 | B2 | 3/2010 | Yea et al. |
| 7,710,462 | B2 | 5/2010 | Xin et al. |
| 7,728,877 | B2 | 6/2010 | Xin et al. |
| 7,817,865 | B2 | 10/2010 | Yang |
| 7,856,148 | B2 | 12/2010 | Yang |
| 7,903,737 | B2 * | 3/2011 | Martinian et al. ....... 375/240.12 |
| 2002/0014269 | A1 | 2/2002 | Rossi et al. |
| 2002/0106191 | A1 | 8/2002 | Betz et al. |
| 2002/0146239 | A1 | 10/2002 | Hamasaka et al. |
| 2003/0043909 | A1 | 3/2003 | Akiyoshi et al. |
| 2003/0138043 | A1 | 7/2003 | Hannuksela |
| 2003/0202592 | A1 | 10/2003 | Sohn et al. |
| 2003/0202594 | A1 | 10/2003 | Lainema |
| 2004/0047415 | A1 | 3/2004 | Robert et al. |
| 2004/0120396 | A1 | 6/2004 | Yun et al. |
| 2006/0028489 | A1 | 2/2006 | Uyttendaele et al. |
| 2006/0083298 | A1 | 4/2006 | Wang et al. |
| 2006/0146141 | A1 | 7/2006 | Xin et al. |
| 2006/0146143 | A1 | 7/2006 | Xin et al. |
| 2006/0233247 | A1 | 10/2006 | Visharam et al. |
| 2006/0262856 | A1 | 11/2006 | Wu et al. |
| 2007/0064799 | A1 | 3/2007 | Ha |
| 2007/0081814 | A1 | 4/2007 | Ha et al. |
| 2007/0121722 | A1 | 5/2007 | Martinian et al. |
| 2008/0089412 | A1 | 4/2008 | Ugur et al. |
| 2008/0159638 | A1 | 7/2008 | Song et al. |
| 2009/0010323 | A1 | 1/2009 | Su et al. |
| 2009/0052529 | A1 | 2/2009 | Kim et al. |
| 2009/0116558 | A1 | 5/2009 | Chen et al. |
| 2009/0147850 | A1 | 6/2009 | Pandit |
| 2009/0168874 | A1 * | 7/2009 | Su et al. ................... 375/240.12 |
| 2009/0185616 | A1 | 7/2009 | Pandit et al. |
| 2009/0225826 | A1 | 9/2009 | Pandit et al. |
| 2009/0304068 | A1 | 12/2009 | Pandit et al. |
| 2010/0322311 | A1 | 12/2010 | Vetro et al. |

FOREIGN PATENT DOCUMENTS

| | | |
|---|---|---|
| JP | 2007-159111 | 6/2007 |
| JP | 2007-259433 | 10/2007 |
| JP | 2008-022549 | 1/2008 |
| JP | 2008-503973 | 2/2008 |
| JP | 2008-172749 | 7/2008 |
| JP | 2008-182669 | 8/2008 |
| JP | 2009-531968 | 9/2009 |
| JP | 2010-507275 | 3/2010 |
| JP | 2010-507277 | 3/2010 |
| JP | 2010-507974 | 3/2010 |
| KR | 10-2002-0032954 | 5/2002 |
| KR | 10-2003-0069207 | 8/2003 |
| KR | 10-2004-0013540 | 2/2004 |
| KR | 10-2005-0122717 | 12/2005 |
| RU | 2005131939 | 3/2006 |
| TW | 200536377 | 11/2005 |
| TW | 200620994 | 6/2006 |
| WO | WO 01/10132 | 2/2001 |
| WO | WO 03/053066 | 6/2003 |
| WO | WO 03/058978 | 7/2003 |
| WO | WO 03/093928 | 11/2003 |
| WO | WO 2004/056125 | 7/2004 |
| WO | WO 2004/080078 | 9/2004 |
| WO | WO 2004/014060 | 12/2004 |
| WO | WO 2006-001653 | 1/2006 |
| WO | WO 2006/001653 | 1/2006 |
| WO | WO 2006/062377 | 6/2006 |
| WO | WO 2006-062377 | 6/2006 |

OTHER PUBLICATIONS

Office Action for corresponding U.S. Appl. No. 12/604,718 dated Mar. 31, 2010.

Taiwan Office Action dated Jan. 28, 2011 issued in corresponding Taiwan Application No. 096122161 and English translation thereof.

Mueller et al., "Multiview Coding using AVC," Joint Video Team (JVT) of ISO/IEC MPEG & ITU-T VCEG (ISO/IEC JTC1/SC29/WG11 and ITU-T SG16 Q6), No. M12945, Jan. 11, 2006, XP030041614.

English Translation of Notice of Allowance for corresponding Korean Application No. 10-2009-7017177 dated Apr. 20, 2010.

J. Reichel et al., "Scalable Video Coding Working Draft 3," Joint Video Team (JVT) of ISO/IEC MPEG & ITU-T VCEG (ISO/IEC JTC1/SC29/WG11 and ITU-T SG16 Q6), No. JVT-P201, Jul. 29, 2005, XP030006150.

Jeong-Hyu Yang et al., "Illumination Compensation Scheme for MVC based on Intra Offset Prediction," Joint Video Team (JVT) of ISO/IEC MPEG & ITU-T VCEG (ISO/IEC JTC/SC29/WG11 and ITU-T SG16 Q6), No. M13361, Apr. 2006, XP030042030.

Jeong-Hyu Yang, "Results on CE2 in Multiview Video Coding," Joint Video Team (JVT) of ISO/IEC MPES & ITU-T VCEG (ISO/IEC JTC/SC29/WG11 and ITU-T SG16 Q6), No. M13621, Jul. 12, 2006, XP030042290.

Joaquin Lopez et al., "Block-Based Illumination Compensation and Search Techniques for Multiview Video Coding," Proceedings of the Picture Coding Symposium, Dec. 15, 2004, pp. 1-6, XP002437841.

"Survey of Algorithms used for Multi-view Video Coding (MVC)," Joint Video Team (JVT) of ISO/IEC MPEG & ITU-T VCEG (ISO/IEC JTC1/SC29/WG11 and ITU-T SG16 Q6), No. N6909, Jan. 21, 2005, XP030013629.

H-S Koo et al., "MVC Motion Skip Mode," Joint Video Team (JVT) of ISO/IEC MPEG & ITU-T VCEG (ISO/IEC JTC/SC29/WG11 and ITU-T SG16 Q6), No. JVT-W081, Apr. 19, 2007, XP030007041.

Search Report for corresponding European Application No. 07745746.3 dated Jan. 8, 2010.

Search Report for corresponding European Application No. 07745745.5 dated Jan. 20, 2010.

Search Report for corresponding European Application No. 07746998.9 dated Jan. 20, 2010.

Office Action for correspond Taiwanese Application No. 096122165 dated Dec. 27, 2010 and English translation thereof.

Office Action for corresponding U.S. Appl. No. 12/225,682 dated Sep. 1, 2011.

Office Action for corresponding U.S. Appl. No. 12/225,688 dated Nov. 4, 2011.

Office Action for corresponding Taiwanese Application No. 096131964 dated Oct. 12, 2011.

Schafer, R. et al., "MCTF and Scalability Extension of H.264/AVC and its Application to Video Transmission, Storage, and Surveillance," Visual Communications and Image Processing 2005, Proceedings of the SPIE, vol. 5960, pp. 343-354 (2005).

Sun, S. et al., "Extended Spatial Scalability with Picture-Level Adaption," Joint Video Team (JVT) of ISO/IEC MPEG & ITU-T VCEG, 15th Meeting, Korea, pp. 1-20, Apr. 16-22, 2005.

Rathgen, T. et al., "Proposal for SVC File Format Specification," ISO/IEC JTC1/SC29/WG11 MPEG2005/M12345, Jul. 2005, Poland.

Russian Notice of Allowance dated Jan. 20, 2010.

Emin Martinian et al., "V-Picture Syntax for Random Access in Multi-view Video Compression," Joint Video Team (JVT) of ISO/IEC MPEG & ITU-T VCEG (ISO/IEC JTC1/SC29/WG11 and ITU-T SG16 Q6), No. M13121, Mar. 23, 2006, xp030041790.

Emin Martinian et al., "Multiview Video Compression using V frames," Joint Video Team (JVT) of ISO/IEC MPEG & ITU-T VCEG (ISO/IEC JTC1/SC29/WG11 and ITU-T SG16 Q6), No. M12828, Jan. 11, 2006, xp030041497.

A. Ventro et al., "Joint Multiview Video Model (JFVM) 1 (Jun. 8, 2011)," Joint Video Team (JVT) of ISO/IEC MPEG & ITU-T VCEG (ISO/IEC JTC1/SC29/WG11 and ITU-T SG 16 Q6), No. JVT-T208, Aug. 17, 2006, XP03006640.

Kwanghoon Sohn et al., "H.264/avc-Compatible Multi-view Video Coding," Joint Video Team (JVT) of ISO-IEC MPEG & ITU-T VCEG (ISO/IEC JTC1/SC29/WG11 and ITU-T SG16 Q6), No. M12874, Jan. 12, 2006, XP030041543.

Sangheon Lee et al., "HR/LR Hybrid Structure for MVC," Joint Video Team (JVT) of ISO/IEC MPEG & ITU-T VCEG (ISO/IEC JTC1/SC29/WG11 and ITU-T SG16 Q6), No. M13357, Mar. 29, 2006, XP030042026.

Search Report for corresponding European Application No. 07745747.1 dated Jan. 8, 2010.
Search Report for corresponding European Application No. 07745743.0 dated Jan. 8, 2010.
International Search Report dated Dec. 21, 2007.
Notice of Allowance for corresponding Korean Application No. 10-2009-7017177 date Apr. 20, 2010.
Search Report for corresponding European Application No. 07745744.8 dated May 7, 2010.
Notice of Allowance for corresponding U.S. Appl. No. 12/225,767 dated Jul. 10, 2012.
Office Action for corresponding U.S. Appl. No. 12/588,447 dated Jan. 17, 2012.
Office Action for corresponding Korean Application No. 10-2009-7017188 dated Feb. 4, 2010.
Office Action for corresponding U.S. Appl. No. 12/308,369 dated Feb. 8, 2012.
Office Action for corresponding U.S. Appl. No. 12/805,792 dated Feb. 22, 2012.
Office Action for corresponding U.S. Appl. No. 12/585,558 dated Feb. 22, 2012.
PCT/KR2007/004115 International Search Report dated Dec. 24, 2007.
US Office Action dated Mar. 29, 2012 for corresponding U.S. Appl. No. 12/805,745.
US Office Action dated May 8, 2012 for corresponding U.S. Appl. No. 12/225,732.
PCT International Search Report dated Oct. 8, 2007 for correponding PCT Application No. PCT/KR2007/002964.
Korean Notice of Allowance dated Nov. 3, 2009 for corresponding Korean Patent Application No. 10-2008-7025375.
United States Final Office Action dated Jan. 5, 2010 for corresponding U.S. Appl. No. 12/604,718.
Office Action dated Jul. 3, 2012 for U.S. Appl. No. 12/225,728.
Office Action dated May 15, 2012 for U.S. Appl. No. 12/656,967.
Martinian, E., et al. "Extensions of H.264/AVC for Multiview Video Compression" —International Conference on Image Processing—Jun. 2006.
ITU-T Recommendation H.264—Advanced video coding for generic audiovisual services. May 2003. International Telecommunication Union.
Vetro A. et al., "Joint Draft 1.0 on Multiview Video Coding" —Joint Video Team (JVT) of ISO/IEC MPEG & ITU-T VCEG (ISO/IEC JTC1/SC29/WG11 and ITU-T SG16 Q.6); 21$^{st}$ Meeting: Hangzhou, China, Oct. 2006; JVT-U209.

Chen, Ying, et al. "MVC Reference Picture Management" —Joint Video Team (JVT) of ISO/IEC MPEG & ITU-T VCEG (ISO/IEC JTC1/SC29/WG11 and ITU-T SG16 Q.6); 21$^{st}$ Meeting: Hangzhou, China, Oct. 2006; JVT-U105.
Vetro, A. et al., "Comments on MVC reference picture management" —Joint Video Team (JVT) of ISO/IEC MPEG & ITU-T VCEG (ISO/IEC JTC1/SC29/WG11 and ITU-T SG16 Q.6); 21st Meeting: Hangzhou, China Oct. 2006—JVT-U062.doc.
Vetro, A. et al., "Comments on MVC reference picture management" —Joint Video Team (JVT) of IS0/IEC MPEG & ITU-T VCEG (ISO/IEC JTC1/SC29/WG11 and ITU-T SG16 Q.6); 21$^{st}$ Meeting: Hangzhou, China Oct. 2006—JVT-U062r1.doc.
Chen, Y. et al., "On MVC reference picture list construction" Joint Video Team (JVT) of ISO/IEC MPEG & ITU-T VCEG (ISO/IEC JTC1/SC29/WG11 and ITU-T SG16 Q.6); 22nd Meeting: Marrakech, Morocco, Jan. 2007—JVT-U043.doc.
Pandit, P. et al., "High Level Syntax changes for MVC" —Joint Video Team (JVT) of ISO/IEC MPEG & ITU-T VCEG (ISO/IEC JTC1/SC29/WG11 and ITU-T SG16 Q.6); 22nd Meeting: Marrakech, Morocco, Jan. 2006—JVT-U054.doc.
Pandit, P. et al., "High Level Syntax changes for MVC" —Joint Video Team (JVT) of ISO/IEC MPEG & ITU-T VCEG (ISO/IEC JTC1/SC29/WG11 and ITU-T SG16 Q.6); 22nd Meeting: Marrakech, Morocco, Jan. 2006—JVT-U054r1.doc.
Pandit, P. et al., "On MVC High-Level Syntax for Picture Management" —Joint Video Team (JVT) of ISO/IEC MPEG & ITU-T VCEG (ISO/IEC JTC1/SC29/WG11 and ITU-T SG16 Q.6); 20th Meeting: Klagenfurt, Austria, Jul. 2006—JVT-T131.doc.
Chen, Y, et al., "On MCV reference picture marking" —Pandit, P. et al. "High Level Syntax changes for MVC" —Joint Video Team (JVT) of ISO/IEC MPEG & ITU-T VCEG (ISO/IEC JTC1/SC29/WG11 and ITU-T SG16 Q.6); 22nd Meeting: Marrakech, Morocco, Jan. 2006—JVT-U044.doc.
wftp3.itu.int— / av-arch/jvt-site/ 2006_07_ Klagenfurt/.
wftp3.itu.int— / av-arch/jvt-site/ 2006_10_ Hangzhou/.
wftp3.itu.int — / av-arch/jvt-site/ 2007_01_ Marrakech/ .
Notice of Allowance for U.S. Appl. No. 12/308,369 dated Jul. 26, 2012.
Guo, X. et al., "Inter-View direct Mode for Multiview Video Coding" —IEEE Transactions on Circuits and Systems for Video Technology, vol. 16, No. 12, Dec. 2006.
Guo and Huang, et al., "Multiview Video Coding Based on Global Motion Model" - Department of Computer Science and Technology, Harbin Institute of Technology, Harbin, China; PCM 2004.

\* cited by examiner

Reference picture list construction

FIG. 17

| | C | Descriptor |
|---|---|---|
| ref_pic_list_reordering( ) { | | |
|   if( slice_type != I && slice_type != SI ) { | | |
| (S1)     ref_pic_list_reordering_flag_l0 | 2 | u(1) |
|     if( ref_pic_list_reordering_flag_l0 ) | | |
|       do { | | |
| (S2)         reordering_of_pic_nums_idc | 2 | ue(v) |
|         if( reordering_of_pic_nums_idc == 0 \|\| | | |
| (S3)           reordering_of_pic_nums_idc == 1 ) | | |
|         abs_diff_pic_num_minus1 | 2 | ue(v) |
| (S4)         else if( reordering_of_pic_nums_idc == 2 ) | | |
|         long_term_pic_num | 2 | ue(v) |
| (S5)       } while( reordering_of_pic_nums_idc != 3 ) | | |
|   } | | |
|   if( slice_type == B ) { | | |
| (S6)     ref_pic_list_reordering_flag_l1 | 2 | u(1) |
|     if( ref_pic_list_reordering_flag_l1 ) | | |
|       do { | | |
| (S7)         reordering_of_pic_nums_idc | 2 | ue(v) |
|         if( reordering_of_pic_nums_idc == 0 \|\| | | |
| (S8)           reordering_of_pic_nums_idc == 1 ) | | |
|         abs_diff_pic_num_minus1 | 2 | ue(v) |
| (S9)         else if( reordering_of_pic_nums_idc == 2 ) | | |
|         long_term_pic_num | 2 | ue(v) |
| (S10)       } while( reordering_of_pic_nums_idc != 3 ) | | |
|   } | | |
| } | | |

FIG. 18

| | | | |
|---|---|---|---|
| (S11) { | if(nal_unit_type = = MVC_NAL) {<br>  if( slice_type != I && slice_type != SI ) { | | |
| (S12) { |     ref_view_list_reordering_flag_l0<br>    if( ref_view_list_reordering_flag_l0 )<br>      do { | 2 | u(1) |
| (S13) { |         reordering_of_view_nums_flag<br>        if( reordering_of_view_nums_flag) | 2 | u(1) |
| (S14) { |           diff_view_num_minus1<br>      } while( reordering_of_view_nums_flag )<br>  } | 2 | se(v) |
| |   if( slice_type = = B ) { | | |
| (S15) { |     ref_view_list_reordering_flag_l1<br>    if( ref_view_list_reordering_flag_l1 )<br>      do { | 2 | u(1) |
| (S16) { |         reordering_of_view_nums_flag<br>        if( reordering_of_view_nums_flag ) | 2 | u(1) |
| (S17) { |           diff_view_num_minus1<br>      } while( reordering_of_view_nums_flag )<br>    }<br>  } | 2 | se(v) |
| | } | | |

FIG. 19

| | C | Descriptor |
|---|---|---|
| slice_header( ) {<br>...<br>   ref_pic_list_reordering( ) | | |
| (S21)   if(nal_unit_type == MVC_NAL)<br>     ref_view_list_reordering( ) | | |
| ...<br>} | | |

| | C | Descriptor |
|---|---|---|
| ref_view_list_reordering( ) {<br>  if( slice_type != I && slice_type != SI ) { | | |
| (S22)     ref_view_list_reordering_flag_l0<br>    if( ref_view_list_reordering_flag_l0 )<br>     do { | 2 | u(1) |
| (S23)       reordering_of_view_nums_flag<br>      if( reordering_of_view_nums_flag) | 2 | u(1) |
| (S24)         diff_view_num_minus1<br>     } while( reordering_of_view_nums_flag )<br>  } | 2 | se(v) |
| (S25)   if( slice_type == B ) {<br>    ref_view_list_reordering_flag_l1<br>    if( ref_view_list_reordering_flag_l1 )<br>     do { | 2 | u(1) |
| (S26)       reordering_of_view_nums_flag<br>      if( reordering_of_view_nums_flag ) | 2 | u(1) |
| (S27)         diff_view_num_minus1<br>     } while( reordering_of_view_nums_flag )<br>  }<br>} | 2 | se(v) |

| | Slice types | allowed collective macroblock types |
|---|---|---|
| 2810 | VP (View_P) | I, P, VP |
| 2820 | VB (View_B) | I, P, B, VP, VB |
| 2830 | Mixed | I, P, B, VP, VB, Mixed |

FIG. 29

```
pred_weight_table( )
{
    if( slice_type != VP || slice_type != VB)
    {
        luma_log2_weight_denom
        chroma_log2_weight_denom
        for( i = 0; i <= num_ref_idx_l0_active_minus1; i++ ) {
            luma_weight_l0_flag
            if( luma_weight_l0_flag ) {
                luma_weight_l0[i]
                luma_offset_l0[i]
            }
            chroma_weight_l0_flag
            if( chroma_weight_l0_flag )
                for( j =0; j < 2; j++ ) {
                    chroma_weight_l0[i] [j]
                    chroma_offset_l0[i] [j]
                }
        }
    }                                                           ~ 2910 if(slice_type==B|| slice_type==Mixed)
    {
        for( i = 0; i <= num_ref_idx_l1_active_minus1; i++ )
        {
            luma_weight_l1_flag
            if( luma_weight_l1_flag ) {
                luma_weight_l1[i]
                luma_offset_l1[i]
            }
            chroma_weight_l1_flag
            if( chroma_weight_l1_flag )
                for( j = 0; j < 2; j++ ) {
                    chroma_weight_l1[i] [j]
                    chroma_offset_l1[i] [j]
                }
        }
    }                                                           ~ 2920
}
```

FIG. 30

```
if(slice_type != P || slice_type != B)
{
    luma_log2_view_weight_denom
    chroma_log2_view_weight_denom
    for( i = 0; i <= num_ref_idx_View10_active_minus1; i++ ) {
        luma_weight_View10_flag
        if( luma_weight_View10_flag ) {
            luma_weight_View10[i]
            luma_offset_View10 luma_offset_View10[i]
        }
    }
    chroma_weight_View10_flag
    if( chroma_weight_View10_flag )
        for( j =0; j < 2; j++ ) {
            chroma_weight_View10[i] [j]
            chroma_offset_View10[i] [j]
        }
    }
}
```
~ 2930

```
if(slice_type==VB||slice_type==Mixed)
{
    for( i = 0; i <= num_ref_idx_View11_active_minus1; i++ )
    {
        luma_weight_View11_flag
        if( luma_weight_View11_flag ) {
            luma_weight_View11[i]
            luma_offset_View11[i]
        }
        chroma_weight_View11_flag
        if( chroma_weight_View11_flag )
            for( j = 0; j < 2; j++ ) {
                chroma_offset_View11 chroma_weight_View11[i] [j]
                chroma_offset_View11[i] [j]
            }
        }
    }
}
```
~ 2940

| VP slice | view_weigthed_pred_flag == 0 : not used<br>view_weighted_pred_flag == 1 : explicit mode |
|---|---|
| VB slice | view_weighted_bipred_idc == 0 : not used<br>view_weighted_bipred_idc == 1 : explicit mode<br>view_weighted_bipred_idc == 2 : implicit mode |

FIG. 33

```
If ((( weighted_pred_flag && (slice_type == P || slice_type = SP )) ||
            ( weighted_bipred_idc == 1 && slice_type == B ) ||
( view_weighted_pred_flag && (slice_type == VP )) ||
            ( view_weighted_bipred_idc == 1 && slice_type == VB ))
```

FIG. 35

```
pred_weight_table(?) {
    luma_log2_weight_denom
    chroma_log2_weight_denom
    for( i = 0; i <= num_ref_idx_l0_active_minus1; i++ ) {
        luma_weight_l0_flag
        if( luma_weight_l0_flag ) {
            luma_weight_l0[i]
            luma_offset_l0[i]
        }
        chroma_weight_l0_flag
        if( chroma_weight_l0_flag )
            for( j =0; j < 2; j++ ) {
                chroma_weight_l0[i] [j]
                chroma_offset_l0[i] [j]
            }
    }
}                                                              ~3510 if ( nal_unit_for_MVC) {
        luma_view_log2_weight_denom
        chroma_view_log2_weight_denom
        for( i = 0; i < num_multiview_refs_for_list0; i++ ) {
            luma_view_weight_l0_flag
            if( luma_view_weight_l0_flag ) {
                luma_view_weight_l0[i]
                luma_view_offset_l0[i]
            }
            chroma_view_weight_l0_flag
            if( chroma_view_weight_l0_flag )
                for( j =0; j < 2; j++ ) {
                    chroma_view_weight_l0[i] [j]
                    chroma_view_offset_l0[i] [j]
                }
        }
    }                                                          ~3520
```

FIG. 36

```
if( slice_type == B ) {
  for( i = 0; i <= num_ref_idx_l1_active_minus1; i++ ) {
    luma_weight_l1_flag
    if( luma_weight_l1_flag ) {
      luma_weight_l1[i]
      luma_offset_l1[i]
    }
    chroma_weight_l1_flag
    if( chroma_weight_l1_flag )
      for( j = 0; j < 2; j++ ) {
        chroma_weight_l1[i] [j]
        chroma_offset_l1[i] [j]
      }
  }
}
```
~3530

```
if (nal_unit_for_MVC) {
  for( i = 0; i < num_multiview_refs_for_list1; i++ ) {
    luma_view_weight_l1_flag
    if( luma_weight_l1_flag ) {
      luma_view_weight_l1[i]
      luma_view_offset_l1[i]
    }
    chroma_view_weight_l1_flag
    if( chroma_view_weight_l1_flag )
      for( j = 0; j < 2; j++ ) {
        chroma_view_weight_l1[i] [j]
        chroma_view_offset_l1[i] [j]
      }
  }
}
```
~3540

FIG. 39

| mb_pred_mode | description |
|---|---|
| 0 | Only temporal prediction is used for the macroblock<br>List0/List1 shall be used for temporal prediction |
| 1 | Only inter-view prediction is used for the macroblock<br>ViewList0/ViewList1 shall be used for inter-view prediction |
| 2 | Both temporal and inter-view prediction is used for the macroblock<br>List0/List1 and ViewList0/ViewList1 shall be used for both prediction |

(a)

| mb_pred_mode | description | mb_type |
|---|---|---|
| 0 | Only temporal prediction<br>List0 / List1 | dependent to slice_type |
| 1 | Only inter-view prediction<br>ViewList0 / ViewList1 | dependent to view_slice_type which is similar with a slice_type for a temporal prediction |
| 2 | Mixed prediction<br>(temporal + inter-view)<br>List0 / List1 / ViewList0 / ViewList1 | Dependent to slice_type and view_slice_type |

| slice_layer_in_mvc_extension_rbsp( ) { | Descriptor |
|---|---|
| slice_header_in_mvc_extension( ) | |
| slice_data_in_mvc_extension( ) | |
| .... | |

| slice_header_in_mvc_extension( ) { | Descriptor |
|---|---|
| .... | |
| slice_type | ue(v) |
| view_slice_type | ue(v) |
| .... | |

| slice_data_in_mvc_extension( ) { | Descriptor |
|---|---|
| .... | |
| macroblock_layer_in_mvc_extension( ) | |
| .... | |

| Macroblock_layer_in_mvc_extension( ) { | Descriptor |
|---|---|
| mb_pred_mode | u(2) |
| mb_type | ue(v)\| ae(v) |
| if(mb_pred_mode == 2) { | |
| mb_type | ue(v)\| ae(v) |
| } | |
| .... | |

| slice_layer_in_mvc_extension_rbsp( ) { | Descriptor |
|---|---|
| slice_header_in_mvc_extension( ) | |
| slice_data_in_mvc_extension( ) | |
| .... | |

| slice_header_in_mvc_extension( ) { | Descriptor |
|---|---|
| .... | |
| slice_type | ue(v) |
| .... | |

| slice_data_in_mvc_extension( ) { | Descriptor |
|---|---|
| .... | |
| macroblock_layer_in_mvc_extension( ) | |
| .... | |

| Macroblock_layer_in_mvc_extension( ) { | Descriptor |
|---|---|
| mb_pred_mode | u(2) |
| mb_type | ue(v)\| ae(v) |
| if(mb_pred_mode == 2) { | |
| mb_type | ue(v)\| ae(v) |
| } | |
| .... | |

| slice_type | Name of slice type |
|---|---|
| 0 | P |
| 1 | B |
| 2 | I |
| 3 | SP |
| 4 | SI |
| 5 | P |
| 6 | B |
| 7 | I |
| 8 | SP |
| 9 | SI |
| 10 | VP |
| 11 | VB |
| 12 | Mixed |

(b)

| slice_type | Name of slice type |
|---|---|
| 0 | VB |
| 1 | VP |
| 2 | Mixed |

(c)

| slice_type | Name of slice type |
|---|---|
| 0 | EB(B slice in scalable extension) |
| 1 | EP(P slice in scalable extension) |
| 2 | EI(I slice in scalable extension) |
| 3 | PR(Progressive refinement slice) |
| 4 | VB |
| 5 | VP |
| 6 | Mixed |

FIG. 44

| Slice types | Description | allowed collective macroblock types |
|---|---|---|
| VP (View_P) | Each macroblock or macroblock partition is predicted from 'a picture in current view' or 'a picture in different view' | I, P, VP |
| VB (View_B) | Each macroblock or macroblock partition is predicted from 'a picture /pictures in current view' or 'a picture/ pictures in different view' | I, P, B, VP, VB |
| Mixed | Each macroblock or macroblock partition is predicted from a picture/pictures from current view or a picture/pictures in different view/views or 'a picture/pictures in current view' and 'a picture/pictures in different view/views' | I, P, B, VP, VB, Mixed |

FIG. 45
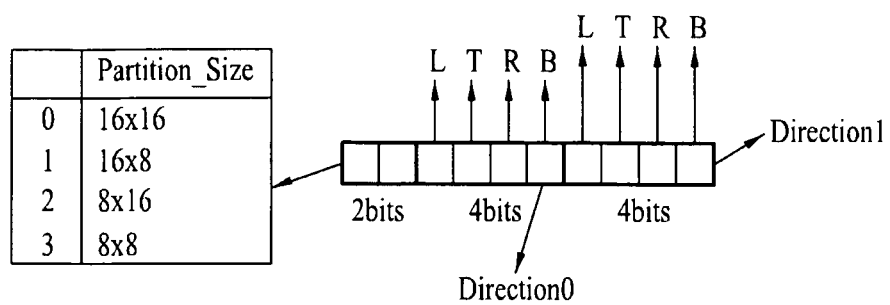
(a)
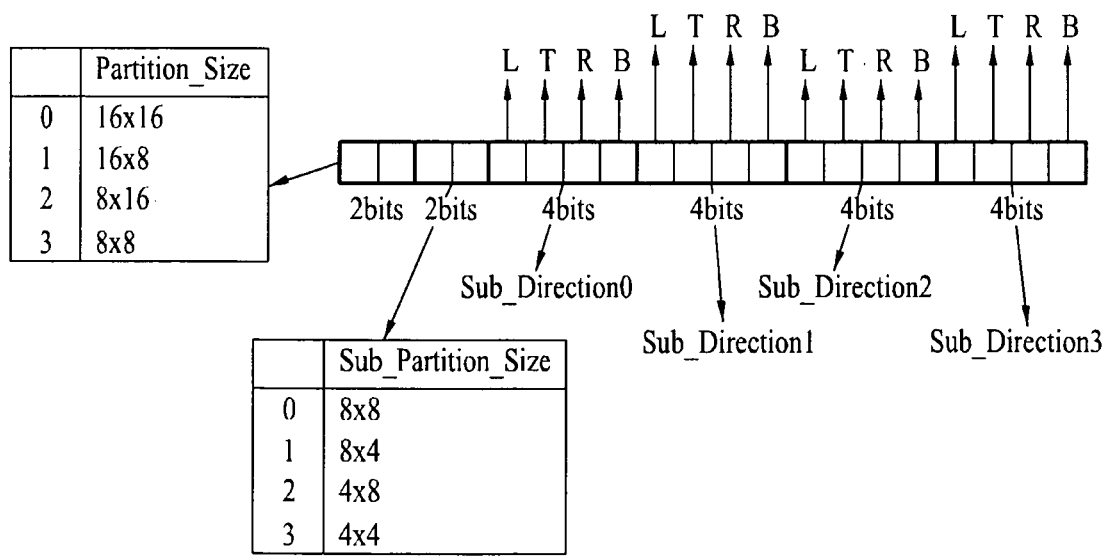
(b)

FIG. 46

| | |
|---|---|
| L | 1000 |
| T | 0100 |
| R | 0010 |
| B | 0001 |
| LT | 1100 |
| LR | 1010 |
| LB | 1001 |
| TR | 0110 |
| TB | 0101 |
| RB | 0011 |
| LTR | 1110 |
| LTB | 1101 |
| LRB | 1011 |
| TRB | 0111 |
| LTRB | 1111 |

(c)

METHOD AND APPARATUS FOR DECODING/ENCODING A VIDEO SIGNAL

PRIORITY INFORMATION

This application is a continuation of application Ser. No. 12/225,688 filed on Jul. 31, 2009 which claims priority from PCT international Application No. PCT/KR2007/001581 filed on Mar. 30, 2007, which claims priority on U.S. provisional application Nos. 60/787,171; 60/801,398; 60/810,642; 60/830,601; 60/832,153; 60/837,925; 60/840,032; and 60/842,152; filed on Mar. 30, 2006, May 19, 2006, Jun. 5, 2006, Jul. 14, 2006, Jul. 21, 2006, Aug. 16, 2006, Aug. 25, 2006, and Sep. 5, 2006. The entire contents of ball of these applications are incorporated herein by reference.

BACKGROUND

Related Art

Compression encoding means a series of signal processing techniques for transmitting digitalized information via communication circuit or storing digitalized information in a form suitable for a storage medium. Objects for the compression encoding include audio, video, text, and the like. In particular, a technique for performing compression encoding on a sequence is called video sequence compression. The video sequence is generally characterized in having spatial redundancy and temporal redundancy.

SUMMARY

The present invention is related to encoding and/or decoding a video signal.

In one embodiment, video data of views other than a current view are used to encode video data and/or decode video data.

In one embodiment, the method includes the steps of receiving the multiview video data stream including a random access picture including a random access slice, the random access slice referencing only slice corresponding to a same time and a different view of the random access picture, obtaining initialization information of a reference picture list for the random access slice, the initialization information representing a reference relation for a single direction or a bi-direction between a plurality of views with view number information and view identification information, obtaining type information indicating whether the random access slice is predicted for a single direction or a bi-direction, initializing the reference picture list using the view number information and the view identification information according to the type information, obtaining modification information for the intitialized reference picture list from a multi-view video data stream, the modification information representing how to assign an inter-view reference index in the initialized reference picture list, determining an assignment modification value for modifying the inter-view reference index in the initialized reference picture list according to the modification information, modifying the initialized reference picture list for inter-view prediction using the determined assignment modification value, determining a prediction value of a macroblock in the random access picture based on the modified reference picture list, and decoding the macroblock using the prediction value, wherein the initialization information is obtained from an extension area of a sequence header.

In another embodiment, the view number information indicates a number of reference views of the random access picture, and the view identification information provides a view identifier of each reference view for the random access picture.

In another embodiment, the multi-view video data includes video data of a base view independent of other views, the base view being a view decoded without using inter-view prediction.

In another embodiment, the type information for a single directional prediction represents a P-slice type and the type information for a bi-directional prediction represents a B-slice type.

In another embodiment, the reference picture list is respectively initialized for the bi-direction when the type information represents a B-slice type.

In another embodiment, the type information is obtained from a slice header.

In another embodiment, the inter-view reference index is assigned by performing a subtraction operation or an addition operation according to the modification information.

In another embodiment, the modification information is obtained from a slice header.

In another embodiment, the determined assignment modification value is used to assign an inter-view reference index to the random access picture in the initialized reference picture list.

In another embodiment, the assignment modification value represents a variable associated with a view identifier of an inter-view reference picture in the initialized reference picture list.

In another embodiment, the position of any other remaining pictures are shifted to later in the intialized reference picture list.

BRIEF DESCRIPTION OF THE DRAWINGS

FIG. 17 and FIG. 18 are diagrams of syntax for reference picture list reordering according to one embodiment of the present invention.

FIG. 19 is a diagram of syntax for reference picture list reordering according to another embodiment of the present invention.

FIG. 29 and FIG. 30 are diagrams of syntax for executing a weighted prediction according to a newly defined slice type according to one embodiment of the present invention.

FIG. 32 is a diagram to explain a weighted prediction method according to flag information indicating whether to execute a weighted prediction using information for a picture in a view different from that of a current picture according to one embodiment of the present invention.

FIG. 33 is a diagram of syntax for executing a weighted prediction according to a newly defined flag information according to one embodiment of the present invention.

FIG. 35 and FIG. 36 are diagrams of syntax for executing a weighted prediction in case that a NAL unit type is for multi-view video coding according to one embodiment of the present invention.

FIG. 39 is a diagram of a macroblock prediction mode according to one embodiment of the present invention.

FIG. 40 and FIG. 41 are diagrams of syntax having slice type and macroblock mode applied thereto according to the present invention.

FIG. 42 is a diagram of embodiments to which the slice types in FIG. 41 are applied.

FIG. 44 is a diagram of a macroblock allowable for a mixed slice type by prediction of two mixed predictions according to one embodiment of the present invention.

FIGS. 45 to 47 are diagrams of a macroblock type of a macroblock existing in a mixed slice by prediction of two mixed predictions according to one embodiment of the present invention.

DETAIL DESCRIPTION OF EXAMPLE EMBODIMENTS

Figure 1:
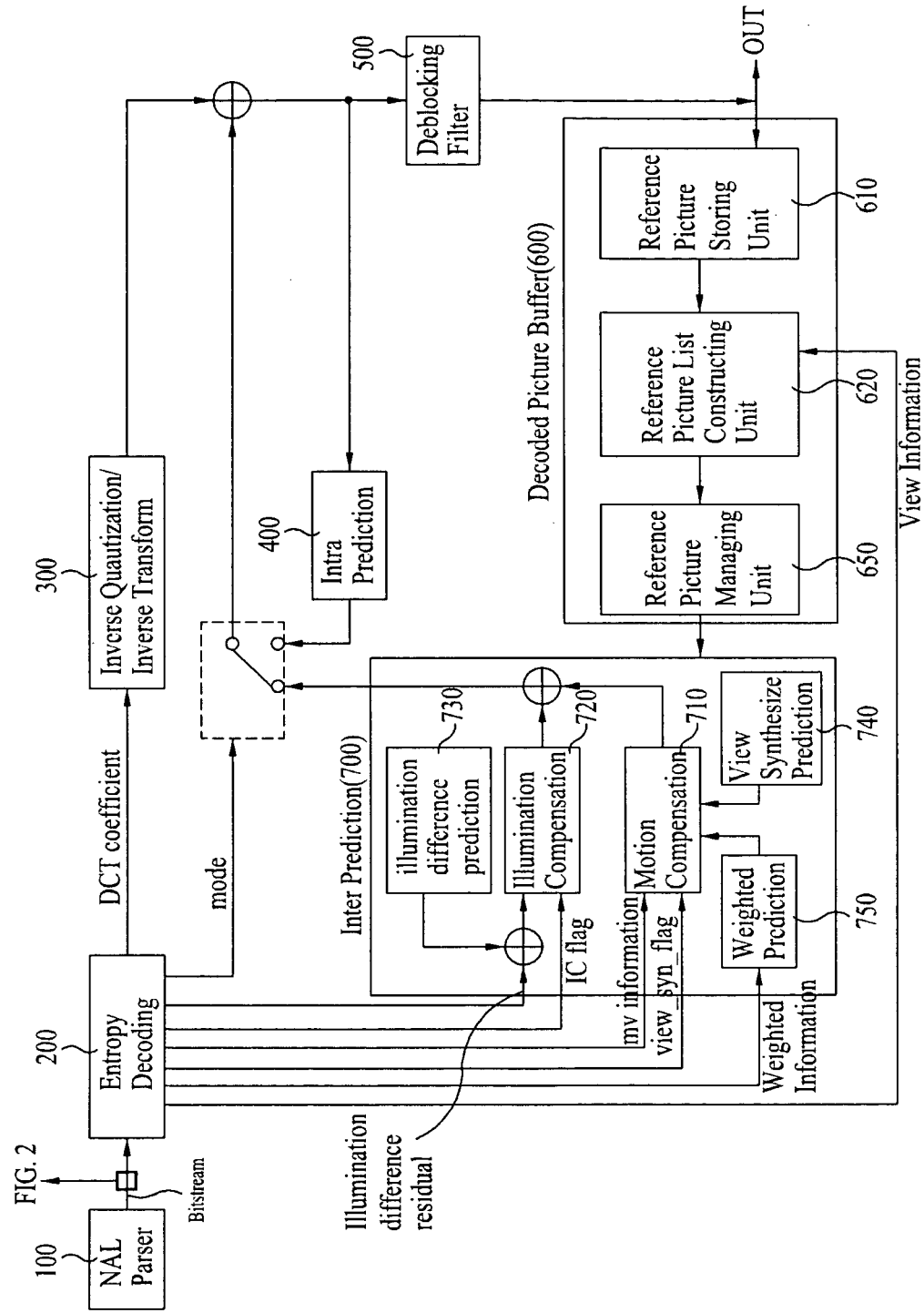
FIG. 1 is a schematic block diagram of an apparatus for decoding a video signal according to an embodiment.

Example embodiments will now be described more fully with reference to the accompanying drawings. However, example embodiments may be embodied in many different forms and should not be construed as being limited to the example embodiments set forth herein. Example embodiments are provided so that this disclosure will be thorough, and will fully convey the scope to those who are skilled in the art. In some example embodiments, well-known processes, well-known device structures, and well-known technologies are not described in detail to avoid the unclear interpretation of the example embodiments. Throughout the specification, like reference numerals in the drawings denote like elements.

The technique of compressing and encoding video signal data considers spatial redundancy, temporal redundancy, scalable redundancy, and inter-view redundancy. And, it is also able to perform a compression coding by considering a mutual redundancy between views in the compression encoding process. The technique for the compression coding, which considers the inter-view redundancy, is just an embodiment of the present invention. And, the technical ideas of the embodiments of the present invention are applicable to temporal redundancy, scalable redundancy, etc.

Looking into a configuration of a bit stream in H.264/AVC, there exists a separate layer structure called a NAL (network abstraction layer) between a VCL (video coding layer) dealing with a moving picture encoding process itself and a lower system that transports and stores encoded information. An output from an encoding process is VCL data and is mapped by NAL units prior to transport or storage. Each NAL unit includes compressed video data or RBSP (raw byte sequence payload: result data of moving picture compression) that is the data corresponding to header information.

Figure 2:
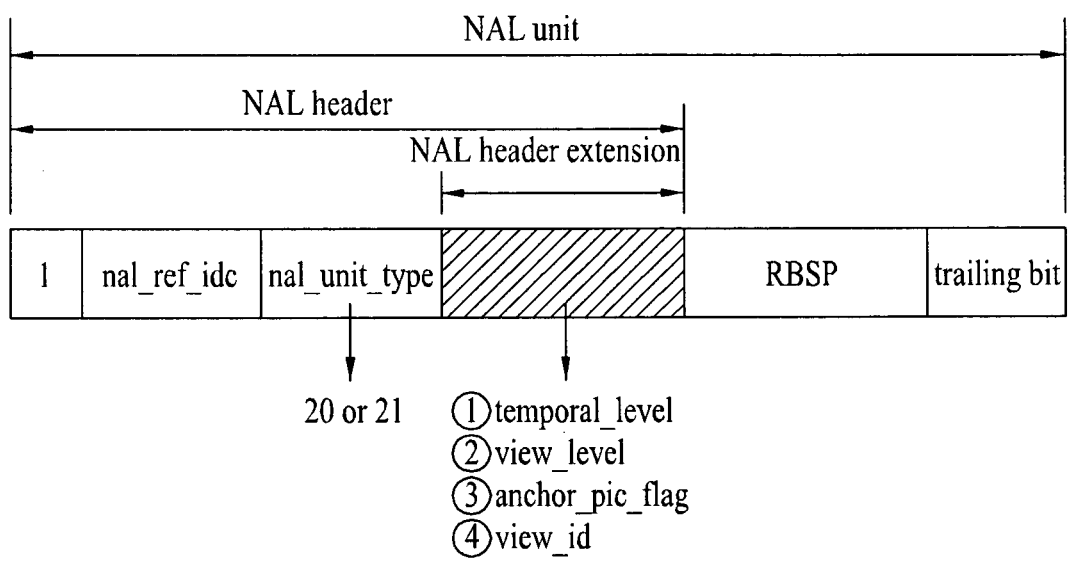
FIG. 2 is a diagram of configuration information for a multi-view video addable to a multi-view video coded bit stream according to an embodiment of the present invention.

As shown in FIG. 2, the NAL unit basically includes a NAL header and an RBSP. The NAL header includes flag information (nal_ref_idc) indicating whether a slice as a reference picture of the NAL unit is included and an identifier (nal_unit_ type) indicating a type of the NAL unit. Compressed original data is stored in the RBSP. And, RBSP trailing bits are added to a last portion of the RBSP to represent a length of the RBSP as an 8-bit multiplication. As the type of the NAL unit, there is IDR (instantaneous decoding refresh) picture, SPS (sequence parameter set), PPS (picture parameter set), SEI (supplemental enhancement information), or the like.

Typically, restrictions for various profiles and levels are set to enable implementation of a target product with an appropriate cost. In this case, a decoder should meet the restriction decided according the corresponding profile and level. Thus, two concepts, 'profile' and 'level' are defined to indicate a function or parameter for representing how far the decoder can cope with a range of a compressed sequence. And, a profile indicator (profile_idc) can identify that a bit stream is based on a prescribed profile. The profile indicator means a flag indicating a profile on which a bit stream is based. For instance, in H.264/AVC, if a profile indicator is 66, it means that a bit stream is based on a baseline profile. If a profile indicator is 77, it means that a bit stream is based on a main profile. If a profile indicator is 88, it means that a bit stream is based on an extended profile. And, the profile identifier can be included in a sequence parameter set.

So, in order to deal with a multi-view video, whether a profile of an inputted bit stream is a multi-view profile is identified. If the profile of the inputted bit stream is the multi-view profile, it is desirable to add syntax to enable at least one additional information for multi-view to be transmitted. In this case, the multi-view profile indicates a profile mode handling multi-view video as an amendment technique of H.264/AVC. In MVC, it may be more efficient to add syntax as additional information for an MVC mode rather than as unconditional syntax. For instance, when a profile indicator of AVC indicates a multi-view profile, information for a multi-view video may be added to enhance encoding efficiency.

A sequence parameter set indicates header information, which contains information covering coding of an overall sequence such as a profile, a level, and the like. A whole compressed moving picture (i.e., a sequence) should begin at a sequence header. So, a sequence parameter set corresponding to header information should arrive at a decoder before data referring to the parameter set arrives. Namely, the sequence parameter set RBSP plays a role as the header information for the result data of the moving picture compression. Once a bit stream is inputted, a profile indicator identifies on which one of a plurality of profiles that the inputted bit stream is based. So, by adding a part for deciding whether an inputted bit stream relates to a multi-view profile (e.g., 'If (profile_idc==MULTI_VIEW_PROFILE)') to the syntax, it may be decided whether the inputted bit stream relates to the multi-view profile. Various kinds of configuration information may be added only if the inputted bit stream is determined as relating to the multi-view profile. For instance, a number of total views, a number of inter-view reference pictures (List0/1) in case of an inter-view picture group, a number of inter-view reference pictures. (List0/1) in case of a non-inter-view picture group, and/or the like may be added. And, various information for views are usable for generation and management of a reference picture list in a decoded picture buffer.

FIG. 1 is a schematic block diagram of an apparatus for decoding a video signal according to an embodiment of the present invention.

Referring to FIG. 1, the apparatus for decoding a video signal includes a NAL parser 100, an entropy decoding unit 200, an inverse quantization/inverse transform unit 300, an intra-prediction unit 400, a deblocking filter unit 500, a decoded picture buffer unit 600, an inter-prediction unit 700, and/or the like.

Figure 3:
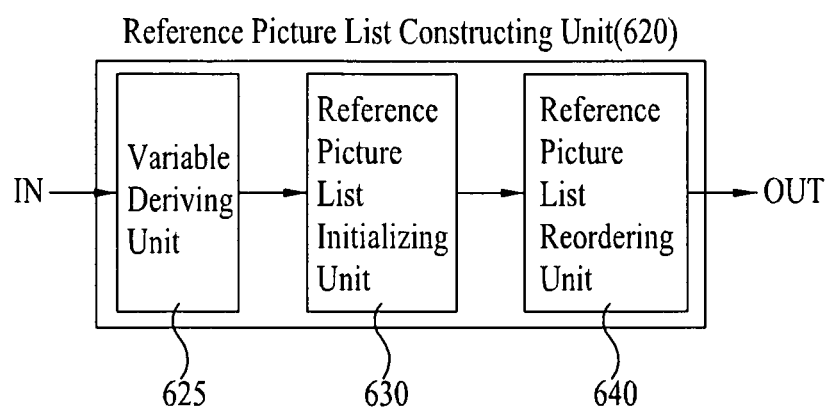
FIG. 3 is an internal block diagram of a reference picture list constructing unit 620 according to an embodiment of the present invention.

The decoded picture buffer unit 600 includes a reference picture storing unit 610, a reference picture list constructing unit 620, a reference picture managing unit 650, and/or the like. And, the reference picture list constructing unit 620 includes, as shown in FIG. 3, a variable deriving unit 625, a reference picture list initializing unit 630, and/or a reference picture list reordering unit 640.

Returning the FIG. 1, the inter-prediction unit 700 includes a motion compensation unit 710, an illumination compensation unit 720, an illumination difference prediction unit 730, a view synthesis prediction unit 740, and/or the like.

The NAL parser 100 carries out parsing by NAL units to decode a received video sequence. In general, at least one sequence parameter set and at least one picture parameter set are transferred to a decoder before a slice header and slice data are decoded. In this case, various kinds of configuration information may be included in a NAL header area or an extension area of a NAL header. Since MVC is an amendment technique for a conventional AVC technique, it may be more efficient to only add the configuration information if the bit stream is an MVC bit stream, rather than unconditional addition. For instance, flag information for identifying a presence or non-presence of an MVC bit stream may be added at the encoder in the NAL header area or the extension area of the NAL header. Only if an inputted bit stream is a multi-view video coded bit stream according to the flag information, is the addition of configuration information for a multi-view video permitted. For instance, the configuration information may include temporal level information, view level information, inter-view picture group identification information, view identification information, and/or the like. This is explained in detail with reference to FIG. 2 as follows.

FIG. 2 is a diagram of configuration information for a multi-view video addable to a multi-view video coded bit stream according to one embodiment of the present invention. Details of configuration information for a multi-view video are explained in the following description.

Temporal level information may indicate information for a hierarchical structure to provide temporal scalability from a video signal (①). Through the temporal level information, it is possible to provide a user with sequences on various time zones.

View level information indicates information for a hierarchical structure to provide view scalability from a video signal (②). In a multi-view video, it is desirable to define a level for a time and a level for a view to provide a user with various temporal and view sequences. In defining the above level information, temporal scalability and view scalability may be used. Hence, a user is able to select a sequence at a specific time and view, or a selected sequence may be restricted by a condition.

The level information may be set in various ways according to a specific condition. For instance, the level information may be set differently according to camera location or camera alignment. And, the level information may be determined by considering view dependency. For instance, a level for a view having an I-picture in an inter-view picture group is set to 0, a level for a view having a P-picture in the inter-view picture group is set to 1, and a level for a view having a B-picture in the inter-view picture group is set to 2. Moreover, the level information may be randomly set not based on a special condition. The view level information will be explained in detail with reference to FIG. 4 and FIG. 5 later.

Inter-view picture group identification information indicates information for identifying whether a coded picture of a current NAL unit is an inter-view picture group (③). In this case, the inter-view picture group means a coded picture in which all slices reference only slices with the same picture order count. For instance, the inter-view picture group means a coded picture that refers to slices in a different view only without referring to slices in a current view. In a decoding process of a multi-view video, an inter-view random access may be desired. The inter-view picture group identification information may be used to realize an efficient random access. And, inter-view reference information may be used for inter-view prediction. So, inter-view picture group identification information can be used to obtain the inter-view reference information. Moreover, the inter-view picture group identification information can be used to add reference pictures for inter-view prediction in constructing a reference picture list. Besides, the inter-view picture group identification information can be used to manage the added reference pictures for the inter-view prediction. For instance, the reference pictures may be classified into inter-view picture groups and non-inter-view picture groups, and the classified reference pictures can then be marked that the reference pictures failing to be used for the inter-view prediction shall not be used. Meanwhile, the inter-view picture group identification information is applicable to a hypothetical reference decoder. Details of the inter-view picture group identification information will be explained with reference to FIG. 6 later.

The view identification information means information for discriminating a picture in a current view from a picture in a different view (④). In coding a video signal, POC (picture order count) or 'frame_num' may be used to identify each picture. In case of a multi-view video sequence, inter-view prediction can be executed. So, identification information to discriminate a picture in a current view from a picture in another view is desired. So, it is possible to define view identification information "view_id" for identifying a view of a picture. The view identification information can be obtained from a header area of a video signal. For instance, the header area can be a NAL header area, an extension area of a NAL header, or a slice header area. Information for a picture in a view different from that of a current picture is obtained using the view identification information and it is possible to decode the video signal using the information of the picture in the different view. This will be described in greater, detail below. The view identification information is applicable to an overall encoding/decoding process of the video signal. And, the view identification information can be applied to multi-view video coding using the 'frame_num' that considers a view instead of considering a specific view identifier.

Meanwhile, the entropy decoding unit 200 carries out entropy decoding on a parsed bit stream, and a coefficient of each macroblock, a motion vector, and the like are then extracted. The inverse quantization/inverse transform unit 300 obtains a transformed coefficient value by multiplying a received quantized value by a constant and then transforms the coefficient value inversely to reconstruct a pixel value. Using the reconstructed pixel value, the intra-prediction unit 400 performs an intra prediction from a decoded sample within a current picture. Meanwhile, the deblocking filter unit 500 is applied to each coded macroblock to reduce block distortion. A filter smoothes a block edge to enhance an image quality of a decoded frame. A selection of a filtering process depends on boundary strength and gradient of an image sample around a boundary. Pictures through filtering are outputted or stored in the decoded picture buffer unit 600 to be used as reference pictures.

The decoded picture buffer unit 600 plays a role in storing or opening the previously coded pictures to perform an inter prediction. In this case, to store the pictures in the decoded picture buffer unit 600 or to open the pictures, 'frame_num' and POC (picture order count) of each picture are used. So, since there exist pictures in a view different from that of a current picture among the previously coded pictures, view information for identifying a view of a picture may be usable together with the 'frame_num' and the POC. The decoded picture buffer unit 600 includes the reference picture storing unit 610, the reference picture list constructing unit 620, and/or the reference picture managing unit 650. The reference picture storing unit 610 may store pictures that will be referred to for the coding of the current picture. The reference picture list constructing unit 620 may construct a list of reference pictures for the inter-picture prediction. In multi-view video coding, inter-view prediction may be desired. So, if a current picture refers to a picture in another view, it may be possible to construct a reference picture list for inter-view prediction. In this case, the reference picture list constructing unit 620 can use information for view in generating the reference picture list for the inter-view prediction. Details of the reference picture list constructing unit 620 will be explained with reference to FIG. 3 later.

FIG. 3 is an internal block diagram of a reference picture list constructing unit 620 according to an embodiment of the present invention.

The reference picture list constructing unit 620 includes the variable deriving unit 625, the reference picture list initializing unit 630, and the reference list reordering unit 640.

The variable deriving unit 625 derives variables used for reference picture list initialization. For instance, the variable may be derived using 'frame_num' indicating a picture identification number. In particular, variables FrameNum and FrameNumWrap may be usable for each short-term reference picture. First of all, the variable FrameNum is equal to a value of the syntax element frame_num discussed above. The variable FrameNumWrap may be used for the decoded picture buffer unit 600 to assign a small number to each reference picture. And, the variable FrameNumWrap may be derived from the variable FrameNum. A variable PicNum may be derived using the derived variable FrameNumWrap. A variable PicNum may mean an identification number of a picture used by the decoded picture buffer unit 600. In case of indicating a long-term reference picture, a variable LongTermPicNum can be usable.

In order to construct a reference picture list for inter-view prediction, a first variable (e.g., ViewNum) may be derived to construct a reference picture list for inter-view prediction. For instance, a second variable (e.g., ViewId) may be derived using 'view_id' for identifying a view of a picture. First of all, the second variable ViewId may be equal to a value of the syntax element 'view_id'. And, a third variable (e.g., ViewIdWrap) can be used for the decoded picture buffer unit 600 to assign a small view identification number to each reference picture and can be derived from the second variable. A first variable ViewNum may mean a view identification number of picture used by the decoded picture buffer unit 600. Yet, since a number of reference pictures used for inter-view prediction in multi-view video coding may be relatively smaller than that used for temporal prediction, another variable to indicate a view identification number of a long-term reference picture may not be defined.

The reference picture list initializing unit 630 initializes a reference picture list using the above-mentioned variables. In this case, an initialization process for the reference picture list may differ according to a slice type. For instance, in case of decoding a P-slice, a reference index based on a decoding order may be assigned. In case of decoding a B-slice, a reference index based on a picture output order may be assigned. In case of initializing a reference picture list for inter-view prediction, an index may be assigned to a reference picture based on the first variable ViewNum, i.e., the variable derived from view information.

The reference picture list reordering unit 640 plays a role in enhancing a compression efficiency by assigning a smaller index to a picture frequently referred to in the initialized reference picture list. This is because a small bit is assigned if a reference index for encoding gets smaller.

Figure 12:
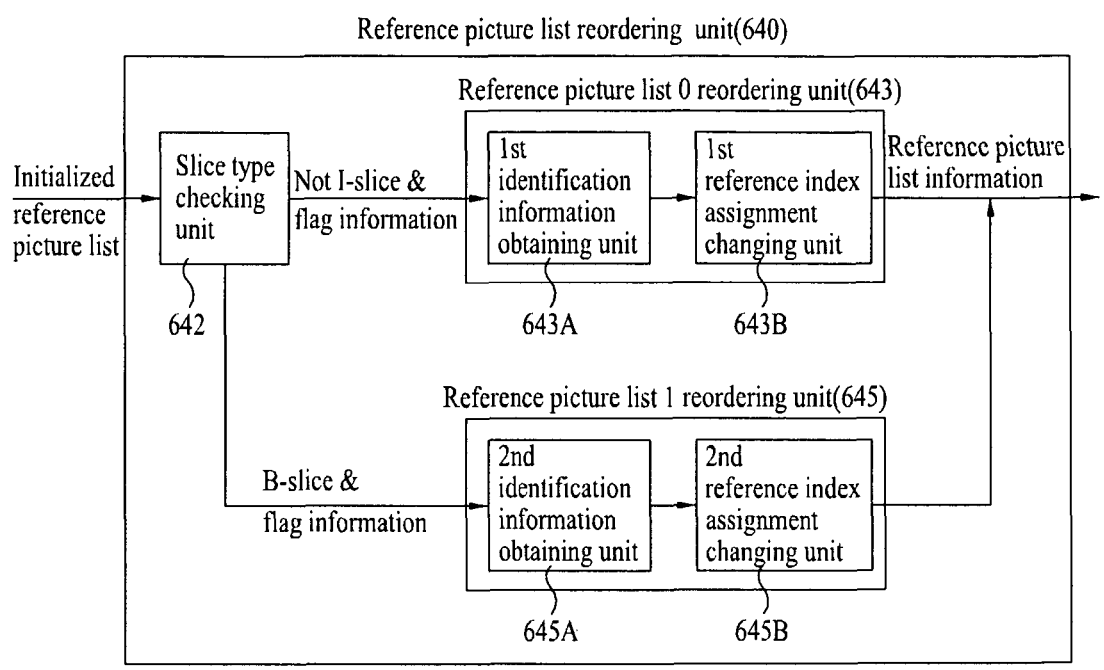
FIG. 12 is an internal block diagram of the reference picture list reordering unit shown in FIG. 3 according to an embodiment of the present invention.

As shown in FIG. 12, the reference picture list reordering unit 640 includes a slice type checking unit 642, a reference picture list-0 reordering unit 643, and/or a reference picture list-1 reordering unit 645. If an initialized reference picture list is inputted, the slice type checking unit 642 checks a type of a slice to be decoded and then decides whether to reorder a reference picture list-0 or a reference picture list-1. So, the reference picture list-0/1 reordering unit 643,645 performs reordering of the reference picture list-0 if the slice type is not an I-slice and also performs reordering of the reference picture list-1 additionally if the slice type is a B-slice. Thus, after an end of the reordering process, a reference picture list is constructed.

The reference picture list 0/1 reordering units 643, 645 includes an identification information obtaining unit 643A, 645A and a reference index assignment changing unit 643B, 645B respectively. The identification information obtaining unit 643A,645A receives identification information (reordering_of_pic_nums_idc) indicating an assigning method of a reference index if reordering of a reference picture list is carried out according to flag information (e.g., set by the encoder and included in the header syntax) indicating whether to execute the reordering of the reference picture list. And, the reference index assignment changing unit 643B, 645B reorders the reference picture list by changing an assignment of a reference index according to the identification information.

And, the reference picture list reordering unit 640 is operable by another method. For instance, reordering can be executed by checking a NAL unit type transferred prior to passing through the slice type checking unit 642 and then classifying the NAL unit type into a case of MVC NAL and a case of non-MVC NAL.

Returning to FIG. 1, the reference picture managing unit 650 manages reference pictures to execute inter prediction more flexibly. For instance, a memory management control operation method and a sliding window method are usable. This is to manage a reference picture memory and a non-reference picture memory by unifying the memories into one memory and realize efficient memory management with a small memory. In multi-view video coding, since pictures in a view direction have the same picture order count, information for identifying a view of each of the pictures may be usable in marking the pictures in a view direction. And, reference pictures managed in the above manner can be used by the inter-prediction unit 700.

The inter-prediction unit 700 carries out inter prediction using reference pictures stored in the decoded picture buffer unit 600. An inter-coded macroblock can be divided into macroblock partitions. And, each of the macroblock partitions can be predicted from one or two reference pictures. The inter-prediction unit 700 includes the motion compensation unit 710, the illumination compensation unit 720, the illumination difference prediction unit 730, the view synthesis prediction unit 740, the weighted prediction unit 750, and/or the like.

The motion compensation unit 710 compensates for a motion of a current block using information transferred from the entropy decoding unit 200. Motion vectors of neighboring blocks of the current block are extracted from a video signal, and then a motion vector predictor of the current block is derived from the motion vectors of the neighboring blocks. And, the motion of the current block is compensated using the derived motion vector predictor and a differential motion vector extracted from the video signal. And, motion compensation may be performed using one reference picture or a plurality of pictures. In multi-view video coding, in case that a current picture refers to pictures in different views, motion compensation may be performed using reference picture list information for the inter-view prediction stored in the decoded picture buffer unit 600. And, motion compensation may be performed using view information for identifying a view of the reference picture.

A direct mode is a coding mode for predicting motion information of a current block from motion information for an encoded block. Since this method is able to save a number of bits required for coding the motion information, compression efficiency is enhanced. For instance, a temporal direct mode predicts motion information for a current block using a correlation of motion information in a temporal direction. Using a method like this method, embodiments of the present invention may predict motion information for a current block using correlation of motion information in a view direction.

Meanwhile, in case that an inputted bit stream corresponds to a multi-view video, since the respective view sequences are obtained by different cameras, an illumination difference is generated by internal and external factors of the cameras. To prevent this, the illumination compensation unit 720 compensates the illumination difference. In performing the illumination compensation, flag information (e.g., set by the encoder and included in the header syntax) indicating whether to perform illumination compensation on a specific layer of a video signal may be used. For instance, an illumination compensation may be performed using flag information indicating whether to perform the illumination compensation on a corresponding slice or macroblock. In performing the illumination compensation using the flag information, the illumination compensation is applicable to various macroblock types (e.g., inter 16×16 mode, B-skip mode, direct mode, etc.).

In performing illumination compensation, information for a neighboring block or information for a block in a view different from that of a current block may be used to reconstruct the current block. And, an illumination difference value of the current block may be used. In this case, if the current block refers to blocks in a different view, illumination compensation may be performed using the reference picture list information for the inter-view prediction stored in the decoded picture buffer unit 600. In this case, the illumination difference value of the current block indicates a difference between an average pixel value of the current block and an average pixel value of a reference block corresponding to the current block. For the example of using the illumination difference value, the illumination difference prediction value of the current block is obtained using neighboring blocks of the current block, and a difference value (illumination difference residual) between the illumination difference value and the illumination difference prediction value is used. Hence, the decoding unit is able to reconstruct the illumination difference value of the current block using the illumination difference residual and the illumination difference prediction value. In obtaining an illumination difference prediction value of a current block, information for a neighboring block may be used. For instance, an illumination difference value of a current block may be predicted using an illumination difference value of a neighbor block. Prior to the prediction, it may be checked whether a reference index of the current block is equal to that of the neighboring block. According to a result of the checking, it is then decided what kind of a neighboring block or a value will be used.

The view synthesis prediction unit 740 is used to synthesize pictures in a virtual view using pictures in a view neighboring a view of a current picture and to predict the current picture using the synthesized pictures in the virtual view. The decoding unit is able to decide whether to synthesize a picture in a virtual view according to an inter-view synthesis prediction identifier (view_syntheseis_pred_flag or view_synpred_flag) transferred from an encoding unit. For instance, if the view_synthesize_pred_flag=1 or view_syn_pred_flag=1, a slice or macroblock in a virtual view is synthesized. In this case, when the inter-view synthesis prediction identifier informs that a virtual view will be generated, a picture in the virtual view may be generated using view information for identifying a view of a picture. And, in predicting a current picture from the synthesized pictures in the virtual view, the view information may be used to use the picture in the virtual view as a reference picture.

The weighted prediction unit 750 is used to compensate for a phenomenon that an image quality of a sequence is considerably degraded in case of encoding the sequence of which brightness temporarily varies. In MVC, weighted prediction may be performed to compensate for a brightness difference from a sequence in a different view as well as for a sequence of which brightness temporarily varies. For instance, the weighted prediction method can be classified into explicit weighted prediction method and implicit weighted prediction method.

In particular, the explicit weighted prediction method can use one reference picture or two reference pictures. In case of using one reference picture, a prediction signal is generated from multiplying a prediction signal corresponding to motion compensation by a weight coefficient. In case of using two reference pictures, a prediction signal is generated from adding an offset value to a value resulting from multiplying a prediction signal corresponding to motion compensation by a weight coefficient.

And, the implicit weighted prediction performs a weighted prediction using a distance from a reference picture. As a method of obtaining the distance from the reference picture, the POC (picture order count) indicating a picture output order, for example, may be used. In this case, the POC may be obtained by considering identification of a view of each picture. In obtaining a weight coefficient for a picture in a different view, view information for identifying a view of a picture may be used to obtain a distance between views of the respective pictures.

In video signal coding, depth information is usable for a specific application or another purpose. In this case, the depth information may mean information capable of indicating an inter-view disparity difference. For instance, a disparity vector may be obtained by inter-view prediction. And, the obtained disparity vector should be transferred to a decoding apparatus for diparity compensation of a current block. Yet, if a depth map is obtained and then transferred to the decoding apparatus, the disparity vector can be inferred from the depth map (or disparity map) without transferring the disparity vector to the decoding apparatus. In this case, it is advantageous in that the number of bits of depth information to be transferred to the decoding apparatus can be reduced. So, by deriving the disparity vector from the depth map, a new disparity compensating method may be provided. Thus, in case of using a picture in a different view in the course of deriving the disparity vector from the depth map, view information for identifying a view of a picture can be used.

The inter-predicted or intra-predicted pictures through the above-explained process are selected according to a prediction mode to reconstruct a current picture. In the following description, various embodiments providing an efficient decoding method of a video signal are explained in detail.

Figure 4:
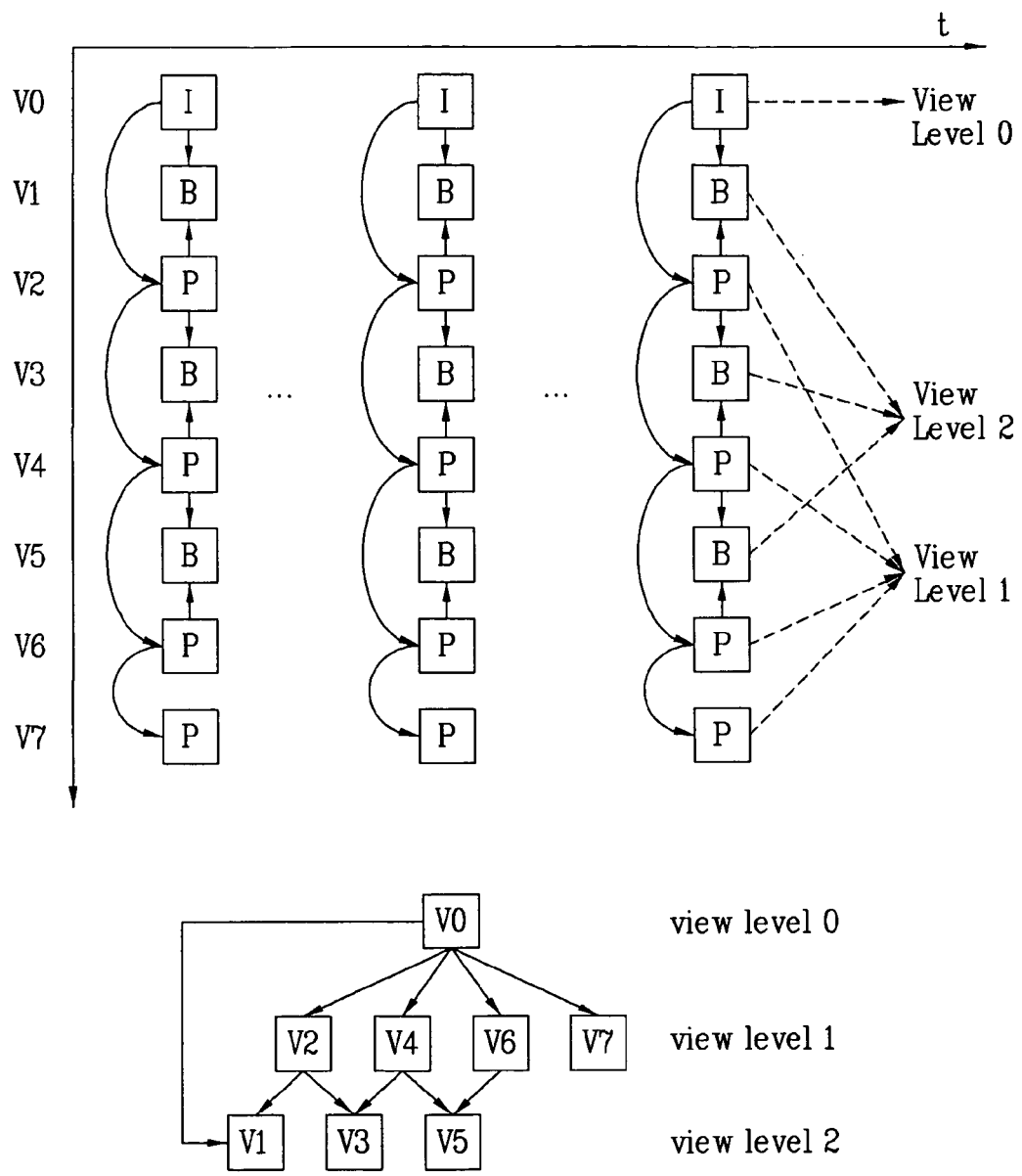
FIG. 4 is a diagram of a hierarchical structure of level information for providing view scalability of a video signal according to an embodiment of the present invention.

FIG. 4 is a diagram of a hierarchical structure of level information for providing view scalability of a video signal according to one embodiment of the present invention.

Referring to FIG. 4, level information for each view can be decided by considering inter-view reference information. For instance, since it is impossible to decode a P-picture and a B-picture without an I-picture, a 'level=0' may be assigned to a base view of which inter-view picture group is the I-picture, 'level=1' may be assigned to a base view of which inter-view picture group is the P-picture, and 'level=2' may be assigned to a base view of which inter-view picture group is the B-picture. Yet, level information may be decided randomly according to a specific standard.

Level information can be randomly decided according to a specific standard or without a standard. For instance, in case that level information is decided based on a view, a view V0 as a base view may be set to view level 0, a view of pictures predicted using pictures in one view may be set to view level 1, and a view of pictures predicted using pictures in a plurality of views may be set to view level 2. In this case, at least one view sequence to have compatibility with a conventional decoder (e.g., H.264/AVC, MPEG-2, MPEG-4, etc.) may be needed. This base view becomes a base of multi-view coding, which may correspond to a reference view for prediction of another view. A sequence corresponding to a base view in MVC (multi-view video coding) can be configured into an independent bit stream by being encoded by a conventional sequence encoding scheme (MPEG-2, MPEG-4, H.263, H.264, etc.). A sequence corresponding to a base view may be compatible with H.264/AVC or not. Yet, a sequence in a view compatible with H.264/AVC corresponds to a base view.

As can be seen in FIG. 4, a view V2 of pictures may be predicted using pictures in the view V0, a view V4 of pictures may be predicted using pictures in the view V2, a view V6 of pictures may be predicted using pictures in the view V4, and a view V7 of pictures may be predicted using pictures in the view V6 to view level 1. And, a view V1 of pictures may be predicted using pictures in the views V0 and V2 and a view V3 may be predicted in the same manner, and a view V5 may be predicted in the same manner to view level 2. So, in case that a user's decoder is unable to view a multi-view video sequence, it decodes sequences in the view corresponding to the view level 0 only. In case that the user's decoder is restricted by profile information, may decode the information of a restricted view level only. In this case, a profile means that technical elements for an algorithm in a video encoding/decoding process are standardized. In particular, the profile is a set of technical elements required for decoding a bit sequence of a compressed sequence and can be a sort of a sub- or component-standard.

According to another embodiment of the present invention, level information may vary according to a location of a camera. For instance, assuming that views V0 and V1 are sequences obtained by a camera located in front, that views V2 and V3 are sequences obtained by a camera located in rear, that views V4 and V5 are sequences obtained by a camera located to the left, and that views V6 and V7 are sequences obtained by a camera located to the right, the views V0 and V1 may be set to view level 0, the views V2 and V3 may be set to view level 1, the views V4 and V5 may be set to view level 2, and the views V6 and V7 may be set to view level 3. Alternatively, level information may vary according to camera alignment. Alternatively, level information can be randomly decided not based on a specific standard.

Figure 5:
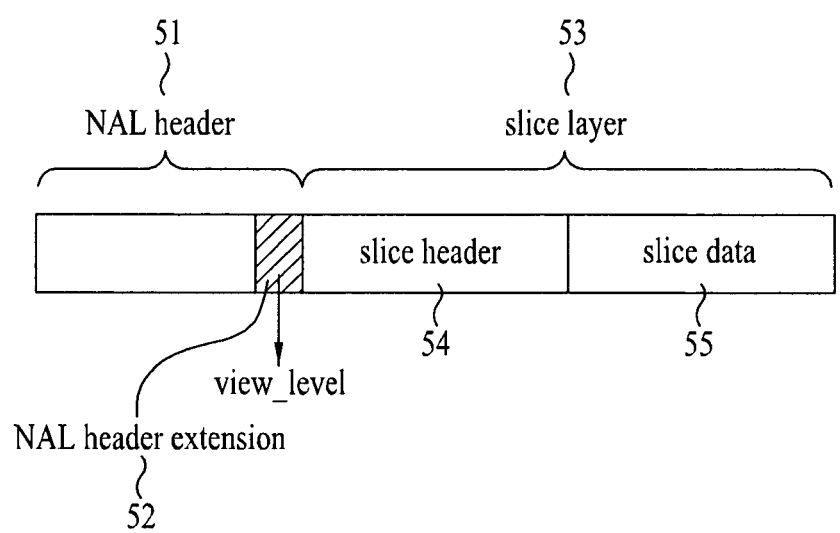
FIG. 5 is a diagram of a NAL-unit configuration including level information within an extension area of a NAL header according to one embodiment of the present invention.

FIGS. 2 and 5 are diagrams of a NAL-unit configuration including level information within an extension area of a NAL header according to one embodiment of the present invention.

Referring to FIGS. 2 and 5, a NAL unit basically includes a NAL header and an RBSP. The NAL header includes flag information (nal_ref_idc) indicating whether a slice becoming a reference picture of the NAL unit is included and an identifier (nal_unit_type) indicating a type of the NAL unit. And, the NAL header may further include level information (view_level) indicating information for a hierarchical structure to provide view scalability.

Compressed original data is stored in the RBSP, and RBSP trailing bit or bits are added to a last portion of the RBSP to represent a length of the RBSP as an 8-bit multiplication number. As the types of the NAL unit, there are IDR (instantaneous decoding refresh), SPS (sequence parameter set), PPS (picture parameter set), SEI (supplemental enhancement information), etc.

Referring to FIG. 5 the NAL header includes information for a view identifier. And, a video sequence of a corresponding view level is decoded with reference to the view identifier in the course of performing decoding according to a view level.

The NAL unit includes a NAL header 51 and a slice layer 53. The NAL header 51 includes a NAL header extension 52. And, the slice layer 53 includes a slice header 54 and a slice data 55 as the RBSP.

The NAL header 51 includes an identifier (nal_unit_type), indicating a type of the NAL unit (See FIG. 2 also). For instance, the identifier indicates the NAL unit type may be an identifier for both scalable coding and multi-view video coding. In this case, the NAL header extension 52 can include flag information discriminating whether a current NAL is the NAL for the scalable video coding or the NAL for the multi-view video coding. And, the NAL header extension 52 can include extension information for the current NAL according to the flag information. For instance, in case that the current NAL is the NAL for the multi-view video coding according to the flag information, the NAL header extension 52 can include level information (view_level) indicating information for a hierarchical structure to provide view scalability.

Figure 6:
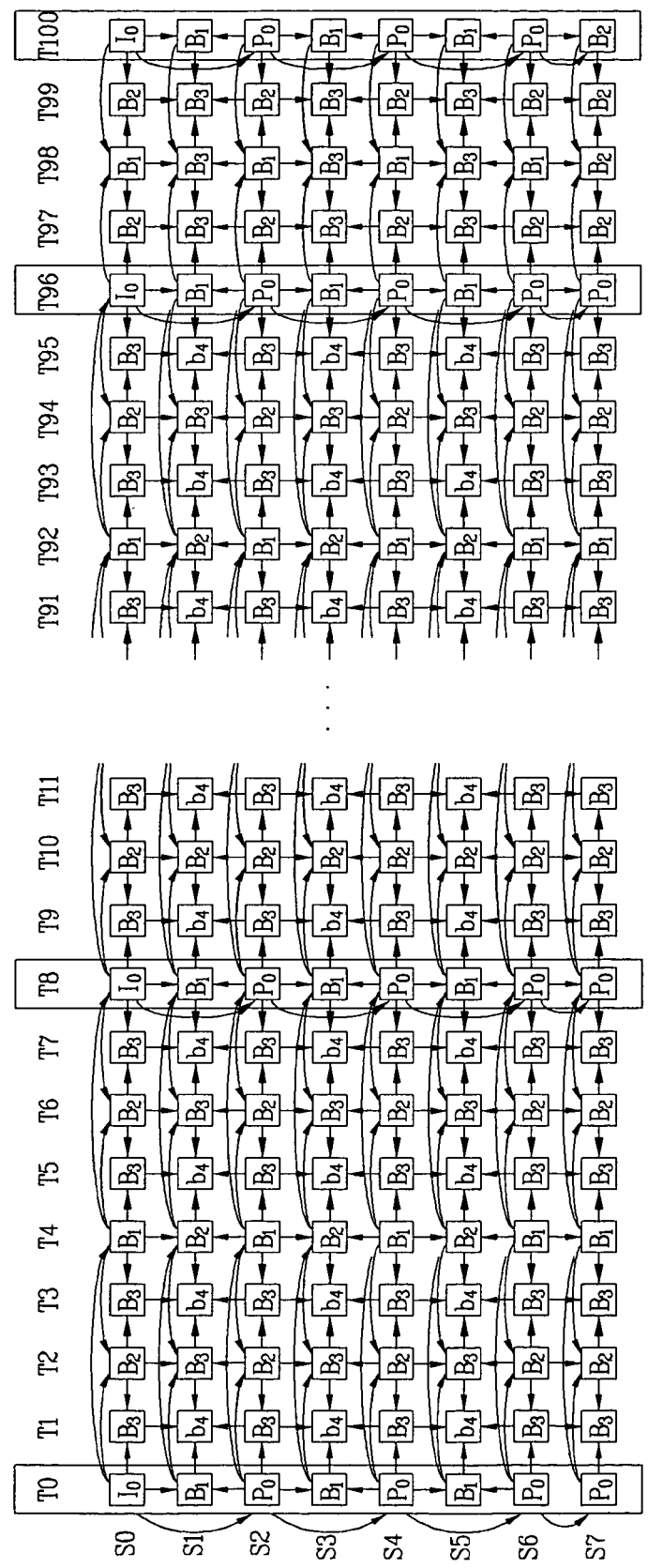
FIG. 6 is a diagram of an overall predictive structure of a multi-view video signal according to an embodiment of the present invention to explain a concept of an inter-view picture group.

FIG. 6 is a diagram of an overall predictive structure of a multi-view video signal according to one embodiment of the present invention to explain a concept of an inter-view picture group.

Referring to FIG. 6, T0 to T100 on a horizontal axis indicate frames according to time and S0 to S7 on a vertical axis indicate frames according to view. For instance, pictures at T0 mean frames captured by different cameras at the same time zone T0, while pictures at S0 mean sequences captured by a single camera at different time zones. And, arrows in the drawing indicate predictive directions and predictive orders of the respective pictures. For instance, a picture P0 in a view S2 at a time zone T0 is a picture predicted from I0, which becomes a reference picture of a picture P0 in a view S4 at the time zone T0. And, it becomes a reference picture of pictures B1 and B2 at time zones T4 and T2 in the view S2, respectively.

In a multi-view video decoding process, an inter-view random access may be needed. So, an access to a random view should be possible by minimizing the decoding effort. In this case, a concept of an inter-view picture group may be needed to realize an efficient access. The inter-view picture group means a coded picture in which all slices reference only slices with the same picture order count. For instance, the inter-view picture group means a coded picture that refers to slices in a different view only without referring to slices in a current view. In FIG. 6, if a picture I0 in a view S0 at a time zone T0 is an inter-view picture group, all pictures in different views on the same time zone, i.e., the time zone T0, become inter-view picture groups. For another instance, if a picture I0 in a view S0 at a time zone T8 is an inter-view picture group, all pictures in different views at the same time zone, i.e., the time zone T8, are inter-view picture groups. Likewise, all pictures in T16, . . . , T96, and T100 become inter-view picture groups as well.

Figure 7:
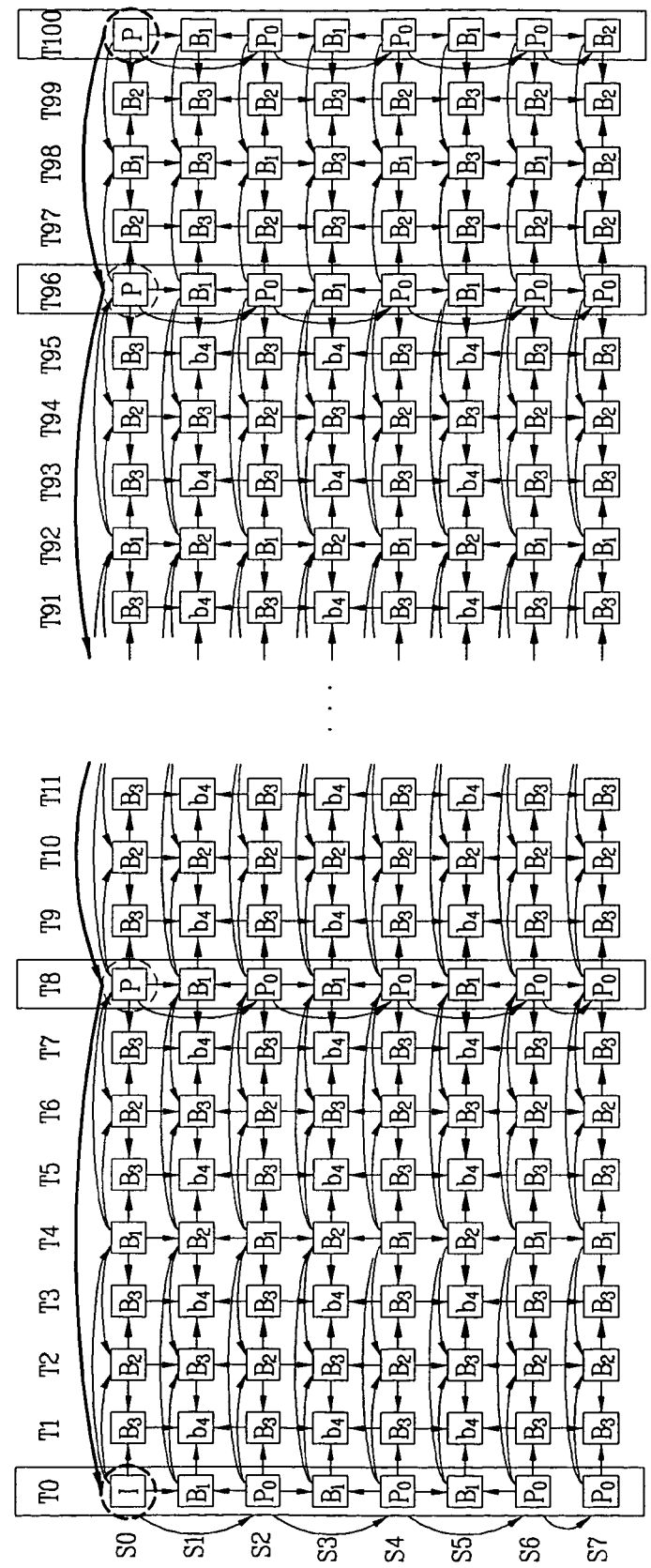
FIG. 7 is a diagram of a predictive structure according to an embodiment of the present invention to explain a concept of a newly defined inter-view picture group.

FIG. 7 is a diagram of a predictive structure according to an embodiment of the present invention to explain a concept of a newly defined inter-view picture group.

In an overall predictive structure of MVC, GOP can begin with an I-picture. And, the I-picture is compatible with H.264/AVC. So, all inter-view picture groups compatible with H.264/AVC can always become the I-picture. Yet, in case that the I-pictures are replaced by a P-picture, more efficient coding is enabled. In particular, more efficient coding is enabled using the predictive structure enabling GOP to begin with the P-picture compatible with H.264/AVC.

In this case, if the inter-view picture group is re-defined, all slices become encoded pictures capable of referring to not only a slice in a frame on a same time zone but also to a slice in the same view on a different time zone. Yet, in case of referring to a slice on a different time zone in a same view, it can be restricted to the inter-view picture group compatible with H.264/AVC only. For instance, a P-picture on a timing point T8 in a view S0 in FIG. 6 can become a newly defined inter-view picture group. Likewise, a P-picture on a timing point T96 in a view S0 or a P-picture on a timing point T100 in a view S0 can become a newly defined inter-view picture group. And, the inter-view picture group can be defined only if it is a base view.

After the inter-view picture group has been decoded, all of the sequentially coded pictures are decoded from pictures decoded ahead of the inter-view picture group in an output order without inter-prediction.

Considering the overall coding structure of the multi-view video shown in FIG. 6 and FIG. 7, since inter-view reference information of an inter-view picture group differs from that of a non-inter-view picture group, the inter-view picture group and the non-inter-view picture group may be discriminated from each other according to the inter-view picture group identification information.

The inter-view reference information means the information capable of recognizing a predictive structure between inter-view pictures. This can be obtained from a data area of a video signal. For instance, it can be obtained from a sequence parameter set area. And, the inter-view reference information can be recognized using the number of reference pictures and view information for the reference pictures. For instance, the number of total views is obtained and the view information for identifying each view can be then obtained based on the number of the total views. And, the number of the reference pictures for a reference direction for each view may be obtained. According to the number of the reference pictures, the view information for each of the reference pictures may be obtained. In this manner, the inter-view reference information can be obtained. And, the inter-view reference information can be recognized by discriminating an inter-view picture group and a non-inter-view picture group. This can be recognized using inter-view picture group identification information indicating whether a coded slice in a current NAL is an inter-view picture group. Details of the inter-view picture group identification information are explained with reference to FIG. 8 as follows.

Figure 8:
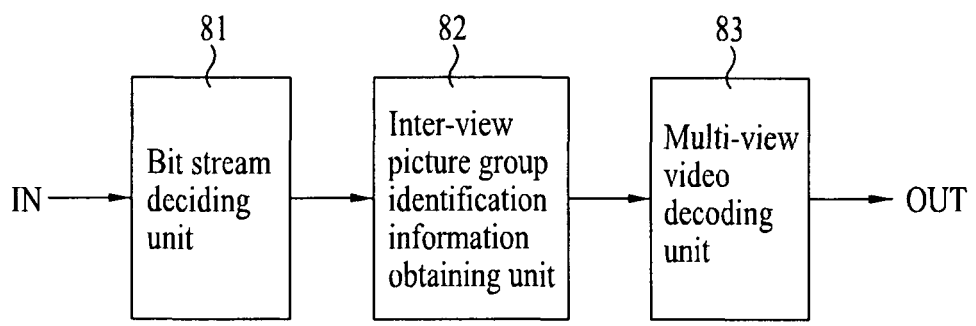
FIG. 8 is a schematic block diagram of an apparatus for decoding a multi-view video using inter-view picture group identification information according to an embodiment of the present invention.

FIG. 8 is a schematic block diagram of an apparatus for decoding a multi-view video using inter-view picture group identifying information according to one embodiment of the present invention.

Referring to FIG. 8, a decoding apparatus according to one embodiment of the present invention includes a bit stream deciding unit 81, an inter-view picture group identification information obtaining unit 82, and a multi-view video decoding unit 83.

If a bit stream is inputted, the bit stream deciding unit 81 decides whether the inputted bit stream is a coded bit stream for a scalable video coding or a coded bit stream for multi-view video coding. This can be decided by flag information included in the bit stream.

The inter-view picture group identification information obtaining unit 82 is able to obtain inter-view picture group identification information if the inputted bit stream is the bit stream for a multi-view video coding as a result of the decision. If the obtained inter-view picture group identification information is 'true', it means that a coded slice of a current NAL is an inter-view picture group. If the obtained inter-view picture group identification information is 'false', it means that a coded slice of a current NAL is a non-inter-view picture group. The inter-view picture group identification information can be obtained from an extension area of a NAL header or a slice layer area.

The multi-view video decoding unit 83 decodes a multi-view video according to the inter-view picture group identification information. According to an overall coding structure of a multi-view video sequence, inter-view reference information of an inter-view picture group differs from that of a non-inter-view picture group. So, the inter-view picture group identification information may be used in adding reference pictures for inter-view prediction to generate a reference picture list, for example. And, the inter-view picture group identification information may be used to manage the reference pictures for the inter-view prediction. Moreover, the inter-view picture group identification information is applicable to a hypothetical reference decoder.

As another example of using the inter-view picture group identification information, in case of using information in a different view for each decoding process, inter-view reference information included in a sequence parameter set is usable. In this case, information for discriminating whether a current picture is an inter-view picture group or a non-inter-view picture group, i.e., inter-view picture group identification information may be required. So, it is able to use different inter-view reference information for each decoding process.

Figure 9:
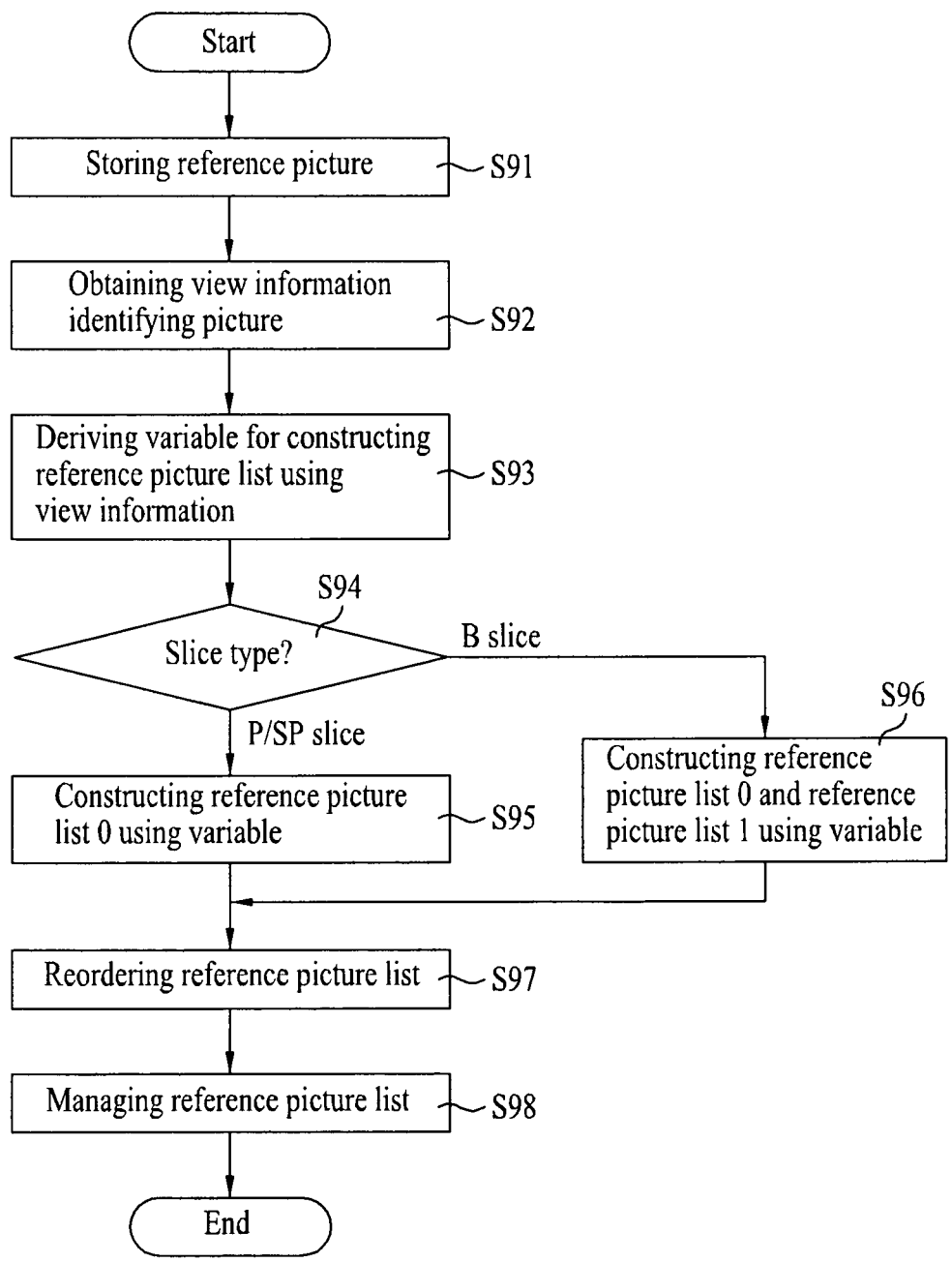
FIG. 9 is a flowchart of a process for constructing a reference picture list according to an embodiment of the present invention.

FIG. 9 is a flowchart of a process for generating a reference picture list according to an embodiment of the present invention.

Referring to FIG. 9, the decoded picture buffer unit 600 plays a role in storing or opening previously coded pictures to perform inter-picture prediction.

First of all, pictures coded prior to a current picture are stored in the reference picture storing unit 610 to be used as reference pictures (S91).

In multi-view video coding, since some of the previously coded pictures are in a view different from that of the current picture, view information for identifying a view of a picture can be used to utilize these pictures as reference pictures. So, the decoder should obtain view information for identifying a view of a picture (S92). For instance, the obtained view information can include 'view_id' for identifying a view of a picture.

The decoded picture buffer unit 600 derives a variable used therein to generate a reference picture list. Since inter-view prediction may be required for multi-view video coding, if a current picture refers to a picture in a different view, a reference picture list may be generated for inter-view prediction. In this case, the decoded picture buffer unit 600 derives a variable used to generate the reference picture list for the inter-view prediction using the obtained view information (S93).

A reference picture list for temporal prediction or a reference picture list for inter-view prediction can be generated by different methods according to a slice type of a current slice (S94). For instance, if a slice type is a P/SP slice, a reference picture list 0 is generated (S95). In case that a slice type is a B-slice, a reference picture list 0 and a reference picture list 1 are generated (S96). In this case, the reference picture list 0 or 1 can include the reference picture list for the temporal prediction only or both of the reference picture list for the temporal prediction and the reference picture list for the inter-view prediction. This will be explained in detail with reference to FIG. 8 and FIG. 9 later.

The initialized reference picture list undergoes a process for assigning a smaller number to a frequently referred to pictures to further enhance a compression rate (S97). And, this can be called a reordering process for a reference picture list, which will be explained in detail with reference to FIGS. 12 to 19 later. The current picture is decoded using the reordered reference picture list and the decoded picture buffer unit 600 manages the decoded reference pictures to operate a buffer more efficiently (S98). The reference pictures managed by the above process are read by the inter-prediction unit 700 to be used for inter-prediction. In multi-view video coding, the inter-prediction can include inter-view prediction. In this case, the reference picture list for the inter-view prediction is usable.

Detailed examples for a method of generating a reference picture list according to a slice type are explained with reference to FIG. 10 and FIG. 11 as follows.

Figure 10:
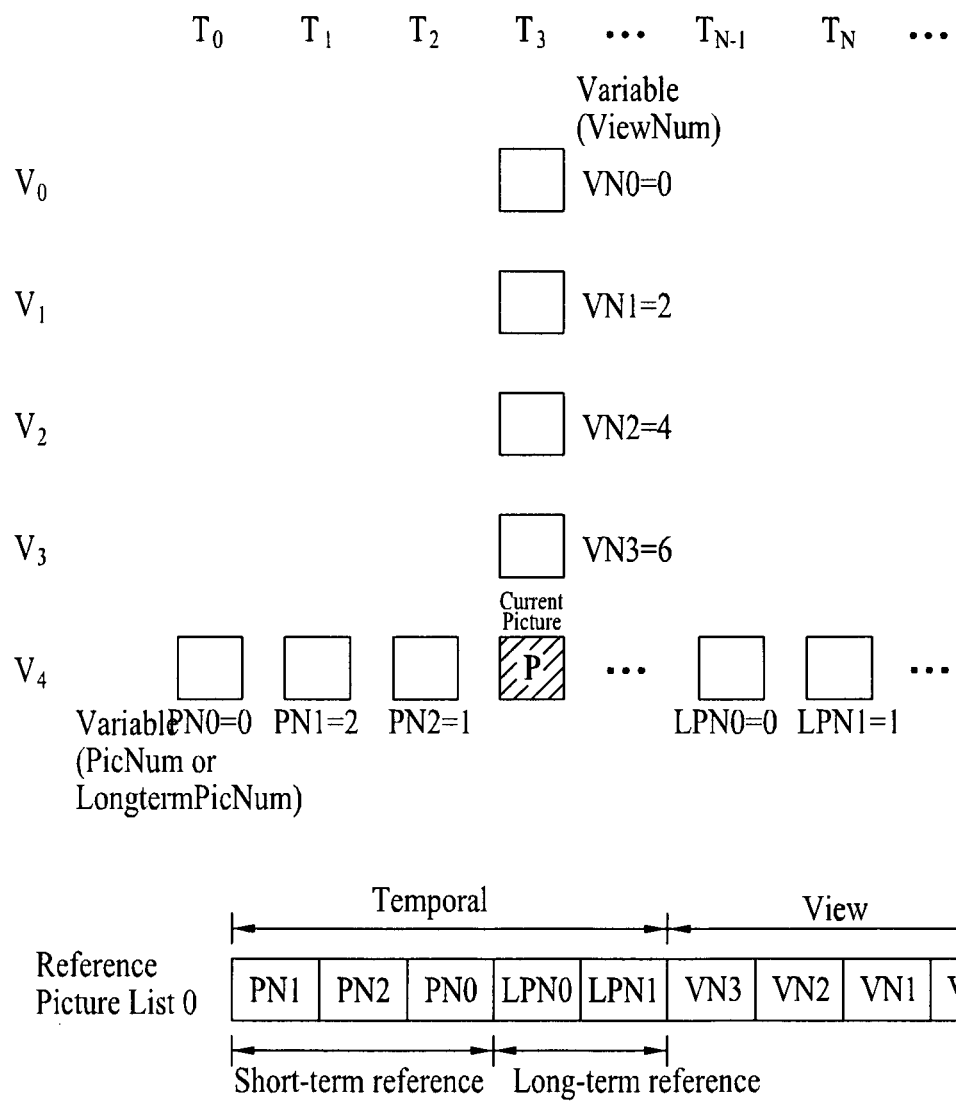
FIG. 10 is a diagram to explain a method of initializing a reference picture list when a current slice is a P-slice according to one embodiment of the present invention.

FIG. 10 is a diagram to explain a method of initializing a reference picture list when a current slice is a P-slice according to one embodiment of the present invention.

Referring to FIG. 10, a time is indicated by T0, T1, ..., TN, while a view is indicated by V0, V1, ..., V4. For instance, a current picture indicates a picture at a time T3 in a view V4. And, a slice type of the current picture is a P-slice. 'PN' is an abbreviation of a variable PicNum, 'LPN' is an abbreviation of a variable LongTermPicNum, and 'VN' is an abbreviation of a variable ViewNum. A numeral attached to an end portion of each of the variables indicates an index indicating a time of each picture (for PN or LPN) or a view of each picture (for VN). This is applicable to FIG. 11 in the same manner.

A reference picture list for temporal prediction or a reference picture list for inter-view prediction can be generated in a different way according to a slice type of a current slice. For instance, a slice type in FIG. 10 is a P/SP slice. In this case, a reference picture list 0 is generated. In particular, the reference picture list 0 can include a reference picture list for temporal prediction and/or a reference picture list for inter-view prediction. In the present embodiment, it is assumed that a reference picture list includes both a reference picture list for temporal prediction and a reference picture list for inter-view prediction.

There are various methods for ordering reference pictures. For instance, reference pictures can be aligned in order of decoding or picture output. Alternatively, reference pictures can be aligned based on a variable derived using view information. Alternatively, reference pictures can be aligned according to inter-view reference information indicating an inter-view prediction structure.

In case of a reference picture list for temporal prediction, short-term reference pictures and long-term reference pictures can be aligned based on a decoding order. For instance, they can be aligned according to a value of a variable PicNum or LongTermPicNum derived from a value indicating a picture identification number (e.g., frame_num or Longtermframeidx). First of all, short-term reference pictures can be initialized prior to long-term reference pictures. An order of aligning the short-term reference pictures can be set from a reference picture having a highest value of variable PicNum to a reference picture having a lowest variable value. For instance, the short-term reference pictures can be aligned in order of PN1 having a highest variable, PN2 having an intermediate variable, and PN0 having a lowest variable among PN0 to PN2. An order of aligning the long-term reference pictures can be set from a reference picture having a lowest value of variable LongTermPicNum to a reference picture having a highest variable value. For instance, the long-term reference pictures can be aligned in order of LPN0 having a highest variable and LPN1 having a lowest variable.

In case of a reference picture list for inter-view prediction, reference pictures can be aligned based on a first variable ViewNum derived using view information. In particular, reference pictures can be aligned in order of a reference picture having a highest first variable (ViewNum) value to a reference picture having a lowest first variable (ViewNum) value. For instance, reference pictures can be aligned in order of VN3 having a highest variable, VN2, VN1, and VN0 having a lowest variable among VN0, VN1, VN2, and VN3.

Thus, the reference picture list for the temporal prediction and the reference picture list for the inter-view prediction can be managed as one reference picture list. Alternatively, the reference picture list for the temporal prediction and the reference picture list for the inter-view prediction can be managed as separate reference picture lists, respectively. In case of managing the reference picture list for the temporal prediction and the reference picture list for the inter-view prediction as one reference picture list, they can be initialized according to an order or simultaneously. For instance, in case of initializing the reference picture list for the temporal prediction and the reference picture list for the inter-view prediction according to an order, the reference picture list for the temporal prediction may be initialized first and the reference picture list for the inter-view prediction is then initialized. This concept is applicable to FIG. 11 as well.

A case that a slice type of a current picture is a B-slice is explained with reference to FIG. 11 as follows.

Figure 11:
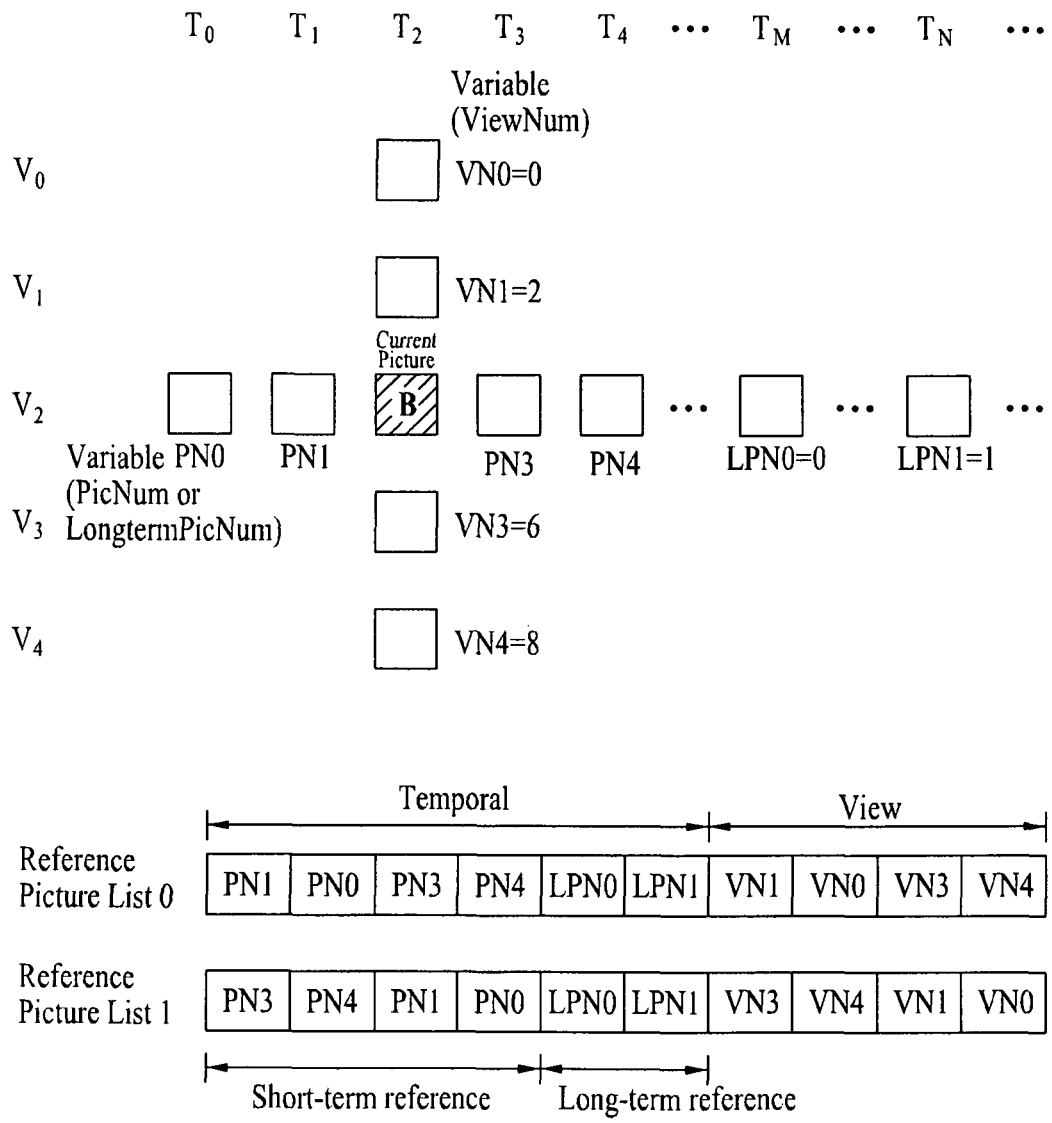
FIG. 11 is a diagram to explain a method of initializing a reference picture list when a current slice is a B-slice according to one embodiment of the present invention.

FIG. 11 is a diagram to explain a method of initializing a reference picture list when a current slice is a B-slice according to one embodiment of the present invention.

Referring to FIG. 9, in case that a slice type is a B-slice, a reference picture list 0 and a reference picture list 1 are generated. In this case, the reference picture list 0 or the reference picture list 1 can include a reference picture list for temporal prediction only or both a reference picture list for temporal prediction and a reference picture list for inter-view prediction.

In case of the reference picture list for temporal prediction, a short-term reference picture aligning method may differ from a long-term reference picture aligning method. For instance, in case of short-term reference pictures, reference pictures can be aligned according to a picture order count (hereinafter abbreviated POC). In case of long-term reference pictures, reference pictures can be aligned according to a variable (LongtermPicNum) value. And, the short-term reference pictures can be initialized prior to the long-term reference pictures.

In order of aligning short-term reference pictures of the reference picture list 0, reference pictures may be aligned from a reference picture having a highest POC value to a reference picture having a lowest POC value among reference pictures having POC values smaller than that of a current picture, and then aligned from a reference picture having a lowest POC value to a reference picture having a highest POC value among reference pictures having POC values greater than that of the current picture. For instance, reference pictures can be aligned from PN1, having a highest POC value out of reference pictures PN0 and PN1 having POC values smaller than that of a current picture, to PN0. Then, reference pictures may be aligned from PN3, having a lowest POC value out of reference pictures PN3 and PN4 having a POC value smaller than that of a current picture, to PN4.

In order of aligning long-term reference pictures of the reference picture list 0, reference pictures are aligned from a reference picture having a lowest variable LongtermPicNum to a reference picture having a highest variable. For instance, reference pictures are aligned from LPN0, having a lowest value out of LPN0 and LPN1, to LPN1 having a second lowest variable.

In case of the reference picture list for the inter-view prediction, reference pictures can be aligned based on a first variable ViewNum derived using view information. For instance, in case of the reference picture list 0 for the inter-view prediction, reference pictures can be aligned from a reference picture having a highest first variable value among reference pictures having first variable values lower than that of a current picture to a reference picture having a lowest first variable value. The reference pictures are then aligned from a reference picture having a lowest first variable value among reference pictures having first variable values greater than that of the current picture to a reference picture having a highest first variable value. For instance, reference pictures may be aligned from VN1, having a highest first variable value out of VN0 and VN1 having first variable values smaller than that of a current picture, to VN0 having a lowest first variable value. Then aligned from VN3, having a lowest first variable value out of VN3 and VN4 having first variable values greater than that of the current picture, to VN4 having a highest first variable value.

In case of the reference picture list 1, the above-explained aligning method of the reference list 0 is similarly applicable to reference picture list 1.

First of all, in case of the reference picture list for the temporal prediction, in order of aligning short-term reference pictures of the reference picture list 1, reference pictures may be aligned from a reference picture having a lowest POC value to a reference picture having a highest POC value among reference pictures having POC values greater than that of a current picture. Then the reference pictures may be aligned from a reference picture having a highest POC value to a reference picture having a lowest POC value among reference pictures having POC values smaller than that of the current picture. For instance, reference pictures may be aligned from PN3, having a lowest POC value out of reference pictures PN3 and PN4 having POC values greater than that of a current picture, to PN4. Then the reference picture may be aligned from PN1, having a highest POC value out of reference pictures PN0 and PN1 having POC values greater than that of the current picture, to PN0.

In order of aligning long-term reference pictures of the reference picture list 1, reference pictures are aligned from a reference picture having a lowest variable LongtermPicNum to a reference picture having a highest variable. For instance, reference pictures are aligned from LPN0, having a lowest value out of LPN0 and LPN1, to LPN1 having a lowest variable.

In case of the reference picture list for the inter-view prediction, reference pictures can be aligned based on a first variable ViewNum derived using view information. For instance, in case of the reference picture list 1 for the inter-view prediction, reference pictures can be aligned from a reference picture having a lowest first variable value among reference pictures having first variable values greater than that of a current picture to a reference picture having a highest first variable value. The reference pictures may then be aligned from a reference picture having a highest first variable value among reference pictures having first variable values smaller than that of the current picture to a reference picture having a lowest first variable value. For instance, reference pictures may be aligned from VN3, having a lowest first variable value out of VN3 and VN4 having first variable values greater than that of a current picture, to VN4 having a highest first variable value. Then the reference pictures may be aligned from VN1, having a highest first variable value out of VN0 and VN1 having first variable values smaller than that of the current picture, to VN0 having a lowest first variable value.

The reference picture list initialized by the above process is transferred to the reference picture list reordering unit 640. The initialized reference picture list is then reordered for more efficient coding. The reordering process is to reduce a bit rate by assigning a small number to a reference picture having highest probability of being selected as a reference picture. Various methods of reordering a reference picture list are explained with reference to FIGS. 12 to 19 as follows.

FIG. 12 is an internal block diagram of the reference picture list reordering unit 640 according to one embodiment of the present invention.

Referring to FIG. 12, the reference picture list reordering unit 640 basically includes a slice type checking unit 642, a reference picture list 0 reordering unit 643, and/or a reference picture list 1 reordering unit 645.

In particular, the reference picture list 0 reordering unit 643 includes a first identification information obtaining unit 643A, and a first reference index assignment changing unit 643B. And, the reference picture list 1 reordering unit 645 includes a second identification obtaining unit 645A and a second reference index assignment changing unit 645B.

The slice type checking unit 642 checks a slice type of a current slice. It is then decided whether to reorder a reference picture list 0 and/or a reference picture list 1 according to the slice type. For instance, if a slice type of a current slice is an I-slice, both the reference picture list 0 and the reference picture list 1 are not reordered. If a slice type of a current slice is a P-slice, the reference picture list 0 is reordered only. If a slice type of a current slice is a B-slice, both the reference picture list 0 and the reference picture list 1 are reordered.

The reference picture list 0 reordering unit 643 is activated if flag information (ref_pic_list_reordering_flag_l0 or ref_view_list_reordering_flag_l0 of FIG. 17), received from the encoder, for executing reordering of the reference picture list 0 is 'true' and if the slice type of the current slice is not the I-slice. The first identification information obtaining unit 643A obtains identification information (reordering_of_pic_nums_idc in FIG. 17), indicating a reference index assigning method. The first reference index assignment changing unit 643B changes a reference index assigned to each reference picture of the reference picture list 0 according to the identification information.

Likewise, the reference picture list 1 reordering unit 645 is activated if flag information (ref_pic_list_reordering_flag_l1 or ref_view_list_reordering_flag_l1 of FIG. 17), received from the encoder, for executing reordering of the reference picture list 1 is 'true' and if the slice type of the current slice is the B-slice. The second identification information obtaining unit 645A obtains identification information (reordering_of_pic_nums_idc of FIG. 17) indicating a reference index assigning method. The second reference index assignment changing unit 645B changes a reference index assigned to each reference picture of the reference picture list 1 according to the identification information.

So, reference picture list information used for actual inter-prediction is generated through the reference picture list 0 reordering unit 643 and the reference picture list 1 reordering unit 645.

A method of changing a reference index assigned to each reference picture by the first or second reference index assignment changing unit 643B or 645B is explained with reference to FIG. 13 as follows.

Figure 13:
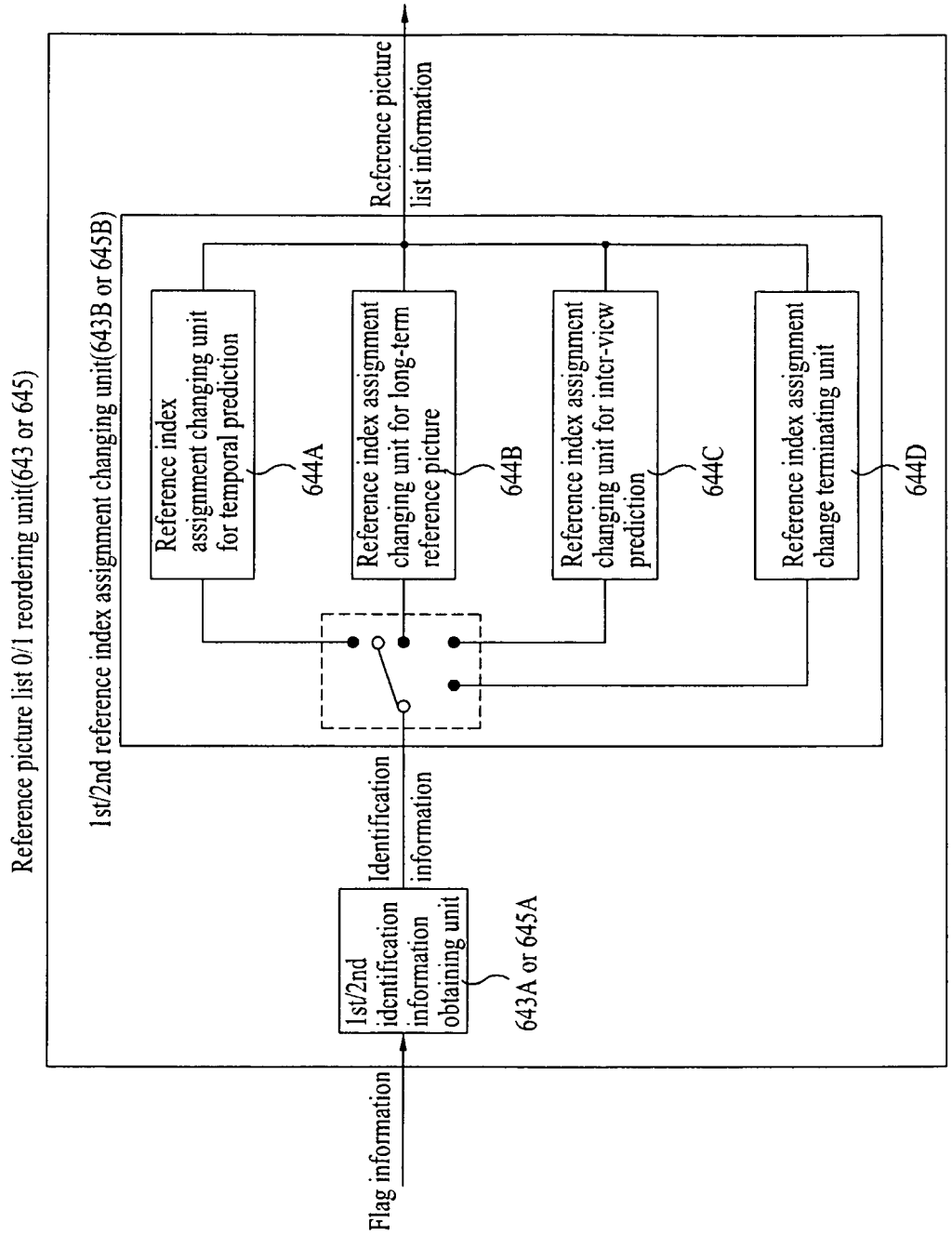
FIG. 13 is an internal block diagram of a reference index assignment changing unit shown in FIG. 12 according to one embodiment of the present invention.

FIG. 13 is an internal block diagram of a reference index assignment changing unit 643B or 645B according to one embodiment of the present invention. In the following description, the reference picture list 0 reordering unit 643 and the reference picture list 1 reordering unit 645 shown in FIG. 12 are explained together. Furthermore, for FIGS. 12 and 13, the flags and identification information may be the same as or analogous to that described in detail with respect to FIGS. 15-19.

Referring to FIG. 13, each of the first and second reference index assignment changing units 643B and 645B includes a reference index assignment changing unit for temporal prediction 644A, a reference index assignment changing unit for long-term reference picture 644B, a reference index assignment changing unit for inter-view prediction 644C, and a reference index assignment change terminating unit 644D. According to identification information obtained by the first and second identification information obtaining units 643A and 645A, parts within the first and second reference index assignment changing units 643B and 645B are activated, respectively. And, the reordering process keeps being executed until identification information for terminating the reference index assignment change is inputted.

For instance, if identification information for changing assignment of a reference index for temporal prediction is received from the first or second identification information obtaining unit 643A or 645A, the reference index assignment changing unit for temporal prediction 644A is activated. The reference index assignment changing unit for temporal prediction 644A obtains a picture number difference according to the received identification information. In this case, the picture number difference means a difference between a picture number of a current picture and a predicted picture number. And, the predicted picture number may indicate a number of a reference picture assigned right before. So, it is able to change the assignment of the reference index using the obtained picture number difference. In this case, the picture number difference can be added/subtracted to/from the predicted picture number according to the identification information.

For another instance, if identification information for changing assignment of a reference index to a designated long-term reference picture is received, the reference index assignment changing unit for a long-term reference picture 644B is activated. The reference index assignment changing unit for a long-term reference picture 644B obtains a long-term reference picture number of a designated picture according to the identification number.

For another instance, if identification information for changing assignment of a reference index for inter-view prediction is received, the reference index assignment changing unit for inter-view prediction 644C is activated. The reference index assignment changing unit for inter-view prediction 644C obtains a view information difference according to the identification information. In this case, the view information difference means a difference between a view number of a current picture and a predicted view number. And, the predicted view number may indicate a view number of a reference picture assigned right before. So, it is able to change assignment of a reference index using the obtained view information difference. In this case, the view information difference can be added/subtracted to/from the predicted view number according to the identification information.

For another instance, if identification information for terminating a reference index assignment change is received, the reference index assignment change terminating unit 644D is activated. The reference index assignment change terminating unit 644D terminates an assignment change of a reference index according to the received identification information. So, the reference picture list reordering unit 640 generates reference picture list information.

Thus, reference pictures used for inter-view prediction can be managed together with reference pictures used for temporal prediction. Alternatively, reference pictures used for inter-view prediction can be managed separate from reference pictures used for temporal prediction. For this, new information for managing the reference pictures used for the inter-view prediction may be required. This will be explained with reference to FIGS. 15 to 19 later.

Details of the reference index assignment changing unit for inter-view prediction 644C are explained with reference to FIG. 14 as follows.

Figure 14:
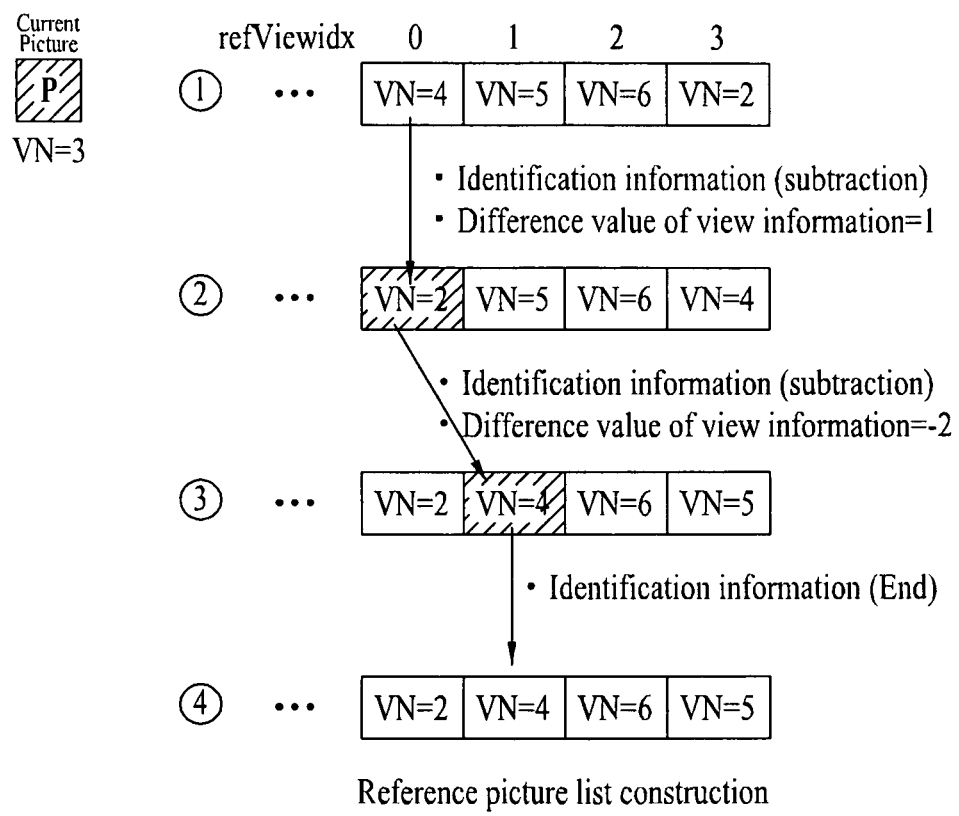
FIG. 14 is a diagram to explain a process for reordering a reference picture list using view information according to one embodiment of the present invention.

FIG. 14 is a diagram to explain a process for reordering a reference picture list using view information according to one embodiment of the present invention.

Referring to FIG. 14, for a view number VN of a current picture is 3, a size of a decoded picture buffer DPBsize is 4 and a slice type of a current slice is a P-slice, a reordering process for a reference picture list 0 is explained as follows.

First of all, an initially predicted view number is '3'—that is the view number of the current picture. And, an initial alignment of the reference picture list 0 for inter-view prediction is '4, 5, 6, 2' (①). In this case, if identification information for changing assignment of a reference index for inter-view prediction by subtracting a view information difference is received, '1' is obtained as the view information difference according to the received identification information. For example, diff_view_num_minus1 in FIG. 18 is 1. A newly predicted view number (=2) is calculated by subtracting the view information difference (=1) from the predicted view number (=3). In particular, a first index of the reference picture list 0 for the inter-view prediction is assigned to a reference picture having the view number 2. And, a picture previously assigned to the first index can be moved to a most rear part of the reference picture list 0. So, the reordered reference picture list 0 is '2, 5, 6, 4' (②). Subsequently, if identification information for changing assignment of a reference index for inter-view prediction by subtracting the view information difference is received, '−2' is obtained as the view information difference according to the identification information. A newly predicted view number (=4) is then calculated by subtracting the view information difference (=−2) from the predicted view number (=2). In particular, a second index of the reference picture list 0 for the inter-view prediction is assigned to a reference picture having a view number 4. Hence, the reordered reference picture list 0 is '2, 4, 6, 5' (③). Subsequently, if identification information for terminating the reference index assignment change is received, the reference picture list 0 having the reordered reference picture list 0 as an end is generated according to the received identification information (④). Hence, the order of the finally generated reference picture list 0 for the inter-view prediction is '2, 4, 6, 5'.

For another instance of reordering the rest of the pictures after the first index of the reference picture list 0 for the inter-view prediction has been assigned, a picture assigned to each index can be moved to a position right behind that of the corresponding picture. In particular, a second index is assigned to a picture having a view number 4, a third index is assigned to a picture (view number 5) to which the second index was assigned, and a fourth index is assigned to a picture (view number 6) to which the third index was assigned. Hence, the reordered reference picture list 0 becomes '2, 4, 5, 6'. And, a subsequent reordering process can be executed in the same manner.

The reference picture list generated by the above-explained process is used for inter-prediction. Both the reference picture list for the inter-view prediction and the reference picture list for the temporal prediction can be managed as one reference picture list. Alternatively, each of the reference picture list for the inter-view prediction and the reference picture list for the temporal prediction can be managed as a separate reference picture list. This is explained with reference to FIGS. 15 to 19 as follows.

Figure 15:
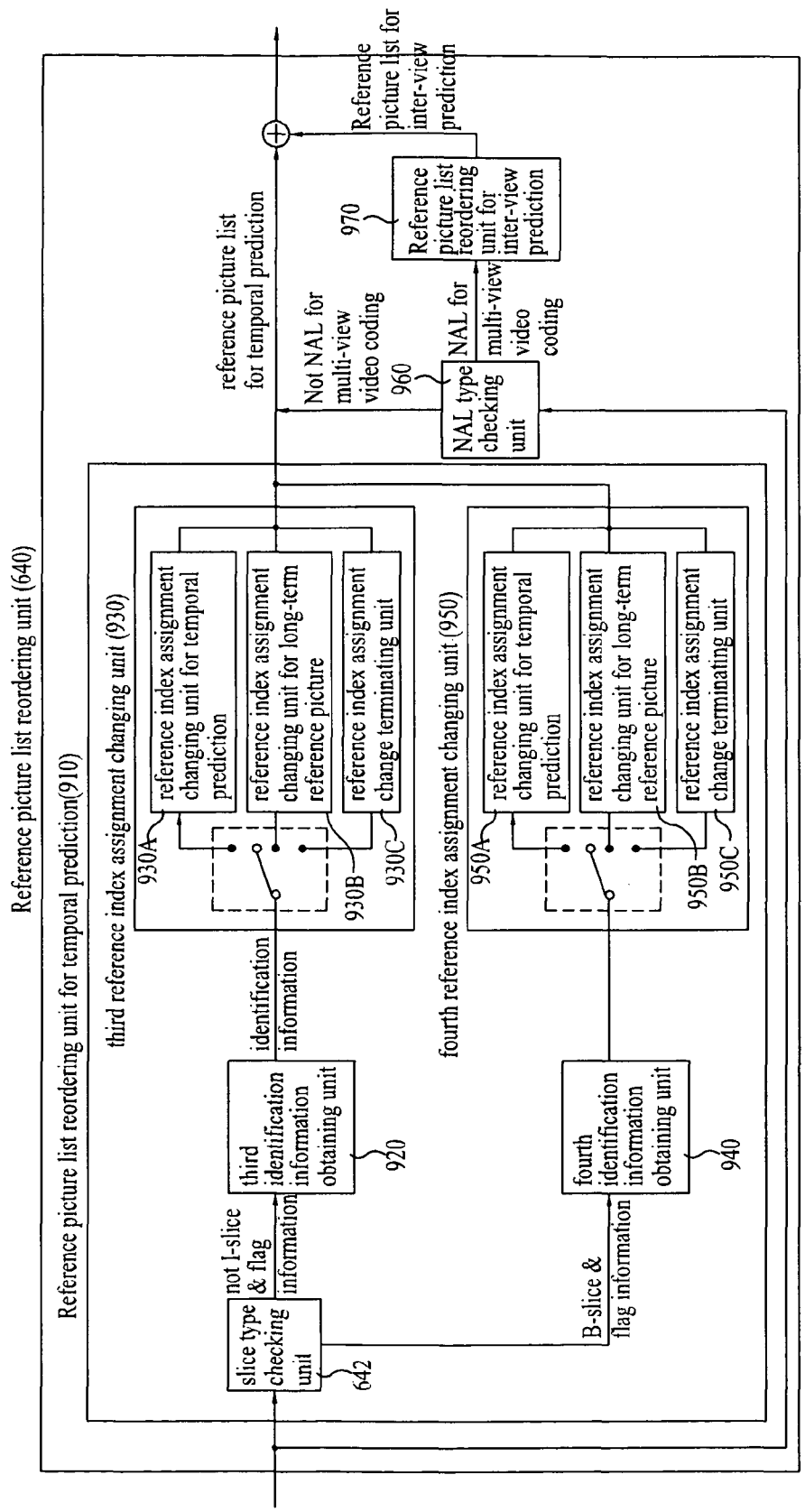
FIG. 15 is an internal block diagram of a reference picture list reordering unit shown in FIG. 3 according to another embodiment of the present invention.

FIG. 15 is an internal block diagram of a reference picture list reordering unit 640 according to another embodiment of the present invention.

Referring to FIG. 15, in order to manage a reference picture list for inter-view prediction as a separate reference picture list, new information may be provided. For instance, a reference picture list for temporal prediction is reordered, and/or a reference picture list for inter-view prediction is then reordered in some cases.

The reference picture list reordering unit 640 basically includes a reference picture list reordering unit for temporal prediction 910, a NAL type checking unit 960, and/or a reference picture list reordering unit for inter-view prediction 970.

The reference picture list reordering unit for temporal prediction 910 includes a slice type checking unit 642, a third identification information obtaining unit 920, a third reference index assignment changing unit 930, a fourth identification information obtaining unit 940, and/or a fourth reference index assignment changing unit 950. The third reference index assignment changing unit 930 includes a reference index assignment changing unit for temporal prediction 930A, a reference index assignment changing unit for a long-term reference picture 930B, and/or a reference index assignment change terminating unit 930C. Likewise, the fourth reference index assignment changing unit 950 includes a reference index assignment changing unit for temporal prediction 950A, a reference index assignment changing unit for long-term reference picture 950B, and/or a reference index assignment change terminating unit 950C.

The reference picture list reordering unit for temporal prediction 910 reorders reference pictures used for temporal prediction. Operations of the reference picture list reordering unit for temporal prediction 910 are identical to those of the aforesaid reference picture list reordering unit 640 shown in FIG. 10 except information for the reference pictures for the inter-view prediction. So, details of the reference picture list reordering unit for temporal prediction 910 are omitted in the following description.

The NAL type checking unit 960 checks a NAL type of a received bit stream. If the NAL type is a NAL for multi-view video coding, reference pictures used for the inter-view prediction are reordered by the reference picture list reordering unit for temporal prediction 970. The generated reference picture list for the inter-view prediction are used for inter-prediction together with the reference picture list generated by the reference picture list reordering-unit for temporal prediction 910. Yet, if the NAL type is not the NAL for the multi-view video coding, the reference picture list for the inter-view prediction is not reordered. In this case, a reference picture list for temporal prediction is generated only. And, the inter-view prediction reference picture list reordering unit 970 reorders reference pictures used for inter-view prediction. This is explained in detail with reference to FIG. 16 as follows.

Figure 16:
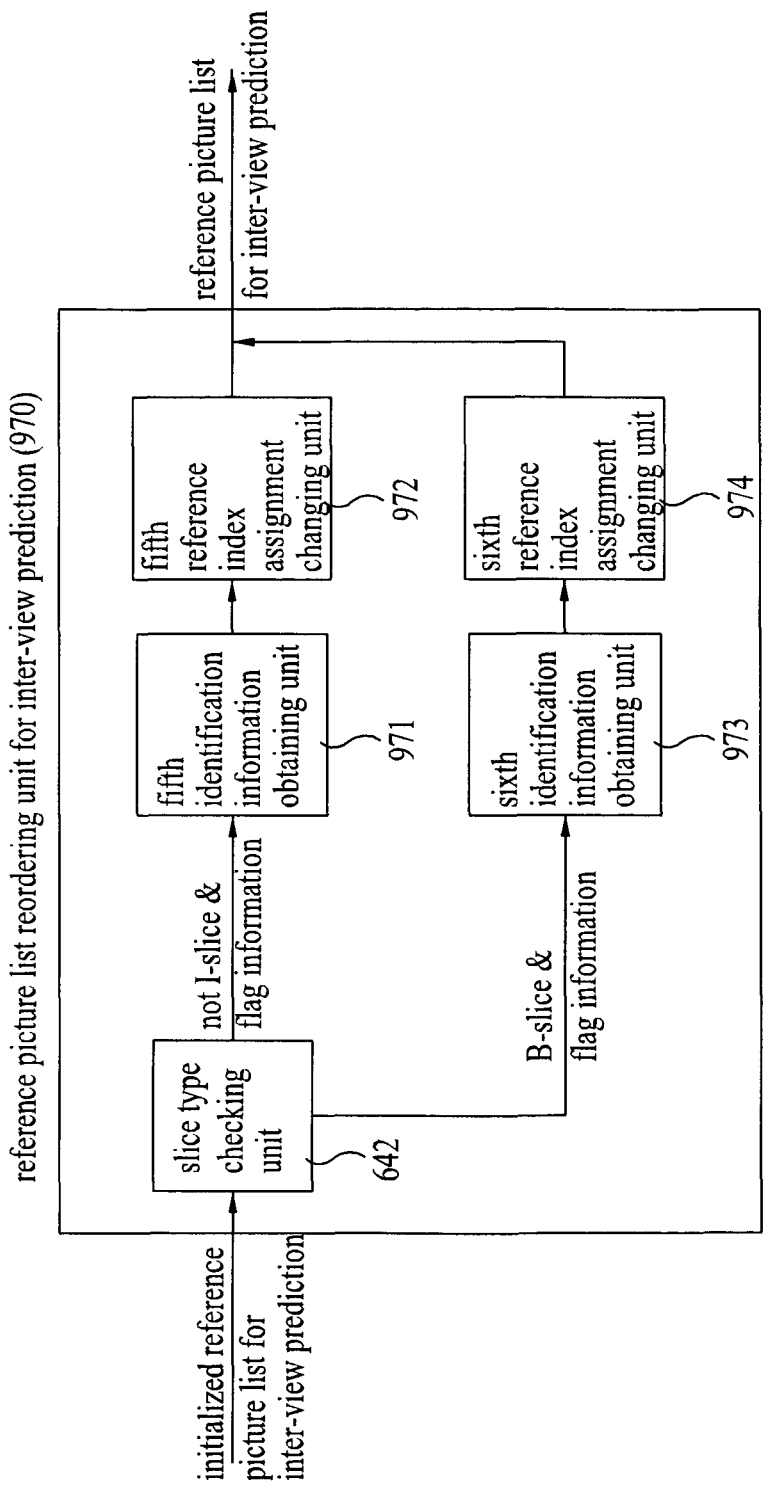
FIG. 16 is an internal block diagram of a reference picture list reordering unit shown in FIG. 15 for inter-view prediction according to an embodiment of the present invention.

FIG. 16 is an internal block diagram of the reference picture list reordering unit 970 for inter-view prediction according to one embodiment of the present invention.

Referring to FIG. 16, the reference picture list reordering unit for inter-view prediction 970 includes a slice type checking unit 642, a fifth identification information obtaining unit 971, a fifth reference index assignment changing unit 972, a sixth identification information obtaining unit 973, and/or a sixth reference index assignment changing unit 974.

The slice type checking unit 642 checks a slice type of a current slice. If so, it is then decided whether to execute reordering of a reference picture list 0 and/or a reference picture list 1 according to the slice type. Details of the slice type checking unit 642 can be understood from the previous description of FIG. 10, which are not repeated in the following description for the sake of brevity.

Each of the fifth and sixth identification information obtaining units 971 and 973 obtains identification information indicating a reference index assigning method. And, each of the fifth and sixth reference index assignment changing units 972 and 974 changes a reference index assigned to each reference picture of the reference picture list 0 and/or 1. In this case, the reference index can mean a view number of a reference picture only. And, the identification information indicating the reference index assigning method may be flag information. For instance, if the flag information is true, an assignment of a view number is changed. If the flag information is false, a reordering process of a view number can be terminated. If the flag information is true, each of the fifth and sixth reference index assignment changing units 972 and 974 can obtain a view number difference according to the flag information. In this case, the view number difference means a difference between a view number of a current picture and a view number of a predicted picture. And, the view number of the predicted picture may mean a view number of a reference picture assigned right before. It is then able to change view number assignment using the view number difference. In this case, the view number difference can be added/subtracted to/from the view number of the predicted picture according to the identification information.

Thus, to manage the reference picture list for the inter-view prediction as a separate reference picture list, a syntax structure may be defined. One embodiment of the syntax is explained with reference to FIG. 17, FIG. 18, and FIG. 19 as follows.

FIG. 17 and FIG. 18 are diagrams of syntax for reference picture list reordering according to one embodiment of the present invention.

Referring to FIG. 17, an operation of the reference picture list reordering unit for the temporal prediction 910 shown in FIG. 15 is represented as syntax. Compared to the blocks shown in FIG. 15, the slice type checking unit 642 corresponds to S1 and S6 in FIG. 17 and the fourth identification information obtaining unit 940 corresponds to S7. The internal blocks of the third reference index assignment changing unit 930 correspond to S3, S4, and S5, respectively in FIG. 17. And, the internal blocks of the fourth reference index assignment changing unit 950 correspond to S8, S9, and S10, respectively in FIG. 17.

Referring to FIG. 18, operations of the NAL type checking unit 960 and the inter-view reference picture list reordering unit 970 are represented as syntax. Compared to the respective blocks shown in FIG. 15 and FIG. 16, the NAL type checking unit 960 corresponds to S11 in FIG. 18, the slice type checking unit 642 corresponds to S13 and S16 in FIG. 18, the fifth identification information obtaining unit 971 corresponds to S14 in FIG. 18, and the sixth identification information obtaining unit 973 corresponds to S17 in FIG. 18. The fifth reference index assignment changing unit 972 corresponds to S15 in FIG. 18 and the sixth reference index assignment changing unit 974 corresponds to S18 in FIG. 18.

FIG. 19 is a diagram of syntax for reference picture list reordering according to another embodiment of the present invention.

Referring to FIG. 19, operations of the NAL type checking unit 960 and the inter-view reference picture list reordering unit 970 are represented as syntax. Compared to the respective blocks shown in FIG. 15 and FIG. 16, the NAL type checking unit 960 corresponds to S21 in FIG. 19, the slice type checking unit 642 corresponds to S22 and S25 in FIG. 19, the fifth identification information obtaining unit 971 corresponds to S23 in FIG. 19, and the sixth identification information obtaining unit 973 corresponds to S26 in FIG. 19. The fifth reference index assignment changing unit 972 corresponds to S24 in FIG. 19 and the sixth reference index assignment changing unit 974 corresponds to S27 in FIG. 19.

As mentioned in the foregoing description, the reference picture list for the inter-view prediction can be used by the inter-prediction unit 700 and is usable for performing illumination compensation as well. The illumination compensation is applicable in the course of performing motion estimation/motion compensation. In case that a current picture uses a reference picture in a different view, it is able to perform the illumination compensation more efficiently using the reference picture list for the inter-view prediction. The illumination compensations according to embodiments of the present invention are explained as follows.

Figure 20:
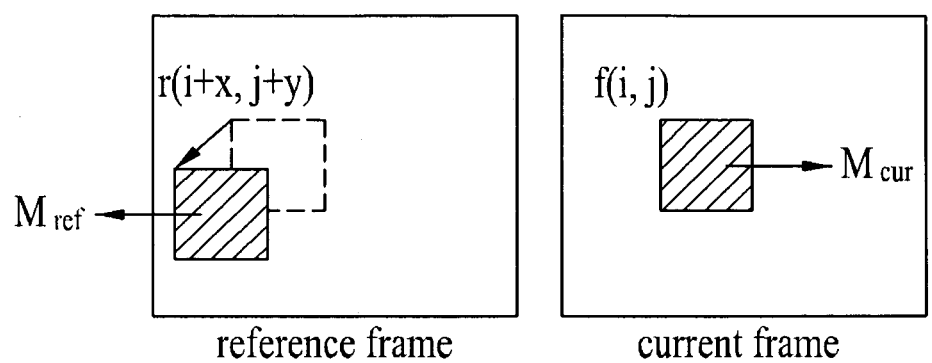
FIG. 20 is a diagram for a process for obtaining an illumination difference value of a current block according to one embodiment of the present invention.

FIG. 20 is a diagram for a process for obtaining a illumination difference value of a current block according to one embodiment of the present invention.

Illumination compensation means a process for decoding an adaptively motion compensated video signal according to illumination change. And, it is applicable to a predictive structure of a video signal, for example, inter-view prediction, intra-view prediction, and/or the like.

Illumination compensation means a process for decoding a video signal using an illumination difference residual and an illumination difference prediction value corresponding to a block to be decoded. In this case, the illumination difference prediction value can be obtained from a neighboring block of a current block. A process for obtaining an illumination difference prediction value from the neighboring block can be decided using reference information for the neighbor block, and a sequence and direction can be taken into consideration in the course of searching neighbor blocks. The neighboring block means an already decoded block and also means a block decoded by considering redundancy within the same picture for a view or time or a sequence decoded by considering redundancy within different pictures.

In comparing similarities between a current block and a candidate reference block, an illumination difference between the two blocks should be taken into consideration. In order to compensate for the illumination difference, a new motion estimation/compensation is executed. A sum of absolute difference (SAD) can be found using Formulas 1 and 2.

$$M_{curr} = \frac{1}{SXT} \sum_{i-m}^{m+S-1} \sum_{j-n}^{n+T-1} f(i, j) \quad (1)$$

$$M_{ref}(p, q) = \frac{1}{SXT} \sum_{i-p}^{p+S-1} \sum_{j-q}^{q+T-1} r(i, j)$$

$$NewSAD(x, y) = \quad (2)$$
$$\sum_{i-m}^{m+S-1} \sum_{j-n}^{n+T-1} \{f(i, j) - M_{curr}\} - \{r(i+x, j+y) - M_{ref}(m+x, n+y)\}$$

where 'Mcurr' indicates an average pixel value of a current block; and 'Mref' indicates an average pixel value of a reference block; 'f(i,j)' indicates a pixel value of a current block at coordinates (i,j); and 'r(i+x, j+y)' indicates a pixel value of a reference block at coordinates (i+x, j+y); (m,n) indicates a current position of the block; (p,q) indicates a position of a reference block; S is the horizontal size of the block; and T is the vertical size of the block. By performing motion estimation based on the new SAD according to the Formula 2, an average pixel difference value may be obtained between the current block and the reference block. And, the obtained average pixel difference value of Mcur–Mref may be called an illumination difference value (IC_offset).

In case of performing motion estimation to which illumination compensation is applied, an illumination difference value and a motion vector are generated. And, the illumination compensation is executed according to Formula 3 below using the illumination difference value and the motion vector.

$$NewR(i, j) = \{f(i, j) - M_{curr}\} - \{r(i+x', j+y') - M_{ref}(m+x', n+y')\} \quad (3)$$

$$= \left\{ \begin{array}{c} f(i, j) - \\ r(i+x', j+y') \end{array} \right\} - \{M_{curr} - M_{ref}(m+x', n+y')\}$$

$$= \{f(i, j) - r(i+x', j+y')\} - IC\_offset\}$$

where, NewR(i,j) indicates an illumination-compensated error value (residual) and (x', y') indicates a motion vector.

An illumination difference value (Mcurr–Mref) should be transferred to the decoding unit. The decoding unit carries out the illumination compensation in the following manner.

$$f'(i, j) = \left\{ \begin{array}{c} NewR''(x', y', i, j) - \\ r(i+x', j+y') \end{array} \right\} + \{M_{cur} - M_{ref}(m+x', n+y')\} \quad (4)$$

$$= \{NewR''(x', y', i, j) + r(i+x', j+y')\} + IC\_offset\}$$

where, NewR"(i,j) indicates a reconstructed illumination-compensated error value (residual) and f'(i,j) indicates a pixel value of a reconstructed current block.

In order to reconstruct a current block, an illumination difference value should be transferred to the decoding unit. Also, the illumination difference value can be predicted from information of neighboring blocks. In order to further reduce a bit number to code the illumination difference value, a difference value (RIC_offset) between the illumination difference value of the current block (IC_offset) and the illumination difference value of the neighboring block (predIC_offset) may only be sent. This is represented as Formula 5.

$$RIC\_offset = IC\_offset - predIC\_offset \quad (5)$$

Figure 21:
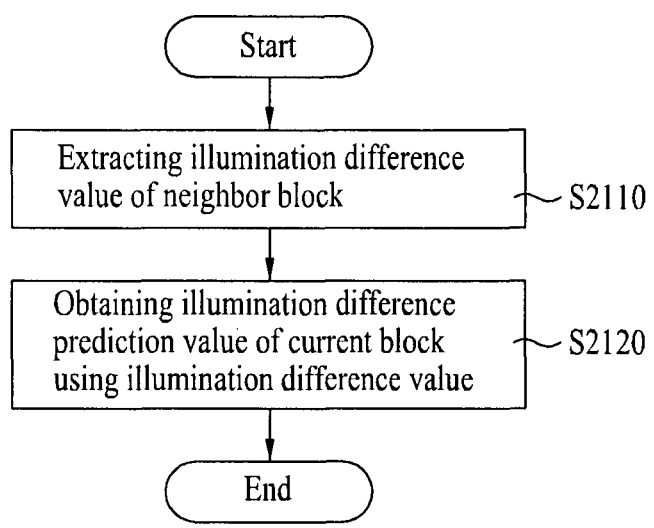
FIG. 21 is a flowchart of a process for performing illumination compensation of a current block according to an embodiment of the present invention.

FIG. 21 is a flowchart of a process for performing illumination compensation of a current block according to an embodiment of the present invention.

Referring to FIG. 21, an illumination difference value of a neighboring block indicating an average pixel difference value between the neighboring block of a current block and a block referred to by the neighbor block is extracted from a video signal (S2110).

Subsequently, an illumination difference prediction value for illumination compensation of the current block is obtained using the illumination difference value (S2120). An illumination difference value of the current block may be reconstructed using the obtained illumination difference prediction value.

In obtaining the illumination difference prediction value, various methods may be used. For instance, before the illumination difference value of the current block is predicted from the illumination difference value of the neighboring block, it is checked whether a reference index of the current block is equal to that of the neighboring block. What kind of a neighboring block or what value will be used is decided according to a result of the checking. For another instance, in obtaining the illumination difference prediction value, flag information (IC_flag) indicating whether to execute an illumination compensation of the current block can be used. And, flag information for the current block can be predicted using the information of the neighboring blocks as well. For another instance, the illumination difference prediction value may be obtained using both the reference index checking method and the flag information predicting method. These are explained in detail with reference to FIGS. 22 to 24 as follows.

Figure 22:
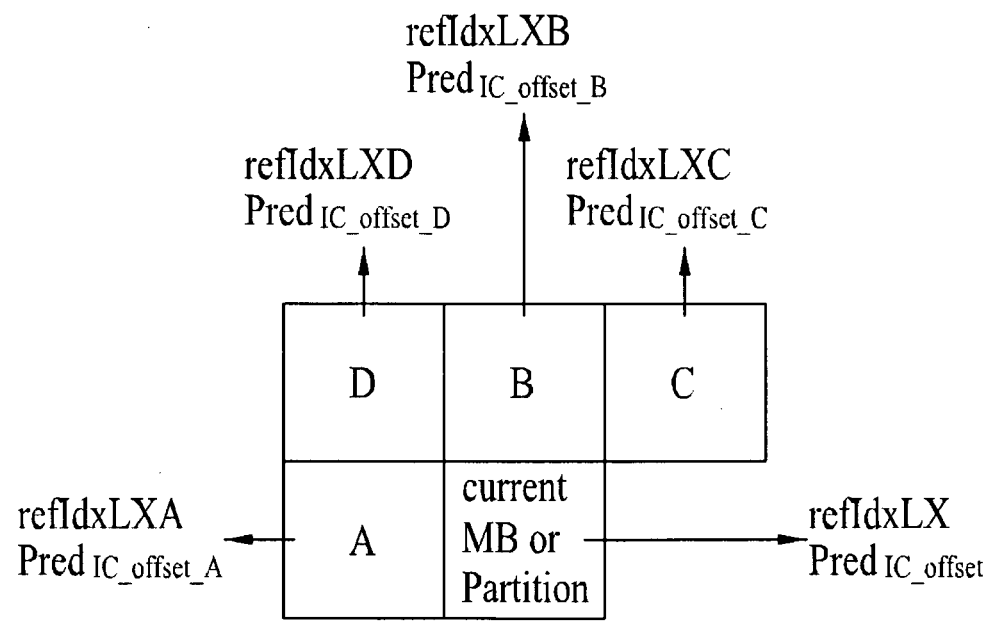
FIG. 22 is a diagram of a process for obtaining an illumination difference prediction value of a current block using information for a neighboring block according to one embodiment of the present invention.

FIG. 22 is a block diagram of a process for obtaining an illumination difference prediction value of a current block using information for a neighbor block according to one embodiment of the present invention.

Referring to FIG. 22, information for a neighboring block may be used in obtaining an illumination difference prediction value of a current block. In the present disclosure, a block can include a macroblock or a sub-macroblock. For instance, an illumination difference value of the current block my be predicted using an illumination difference value of the neighboring block. Prior to this, it is checked whether a reference index of the current block is equal to that of the neighboring block. According to a result of the checking, what kind of a neighboring block or what value will be used may be decided. In FIG. 22, 'refIdxLX' indicates a reference index of a current block, 'refIdxLXN' indicates a reference index of a block-N—both supplied by the encoder in the video signal. In this case, 'N' is a mark of a block neighboring the current block and indicates A, B, or C. And, 'PredIC_offsetN' indicates an illumination difference value for illumination compensation of a neighbor block-N. If a block-C that is located at an upper right end of the current block is unusable, a block-D instead of the block-C may be used. In particular, information for the block-D is usable as information for the block-C. If the block-B and the block-C are unusable, a block-A may be used instead. Namely, the information for the block-A may be used as the information for the block-B or the block-C.

For another instance, in obtaining the illumination difference prediction value, flag information (IC_flag) indicating whether to execute an illumination compensation of the current block may be used. Alternatively, the reference index checking method and the flag information predicting method may be used in obtaining the illumination difference prediction value. In this case, if the flag information for the neighbor block indicates that the illumination compensation is not executed, i.e., if IC_flag=0, the illumination difference value 'PredIC_offsetN' of the neighbor block is set to 0.

Figure 23:
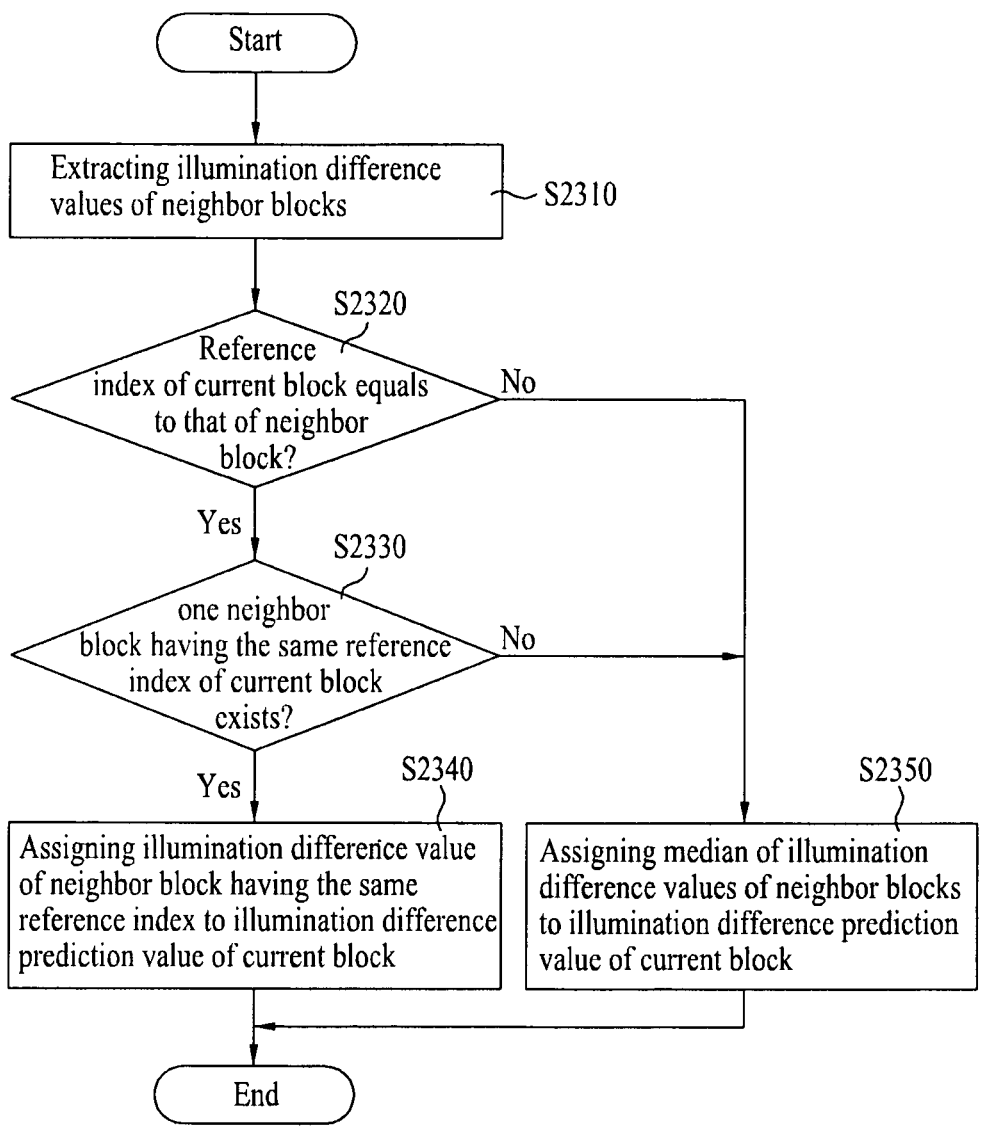
FIG. 23 is a flowchart of a process for performing illumination compensation using information for a neighboring block according to one embodiment of the present invention.

FIG. 23 is a flowchart of a process for performing illumination compensation using information for a neighbor block according to one embodiment of the present invention.

Referring to FIG. 23, the decoding unit extracts an average pixel value of a reference block, a reference index of a current block, a reference index of the reference block, and/or the like from a video signal and is then able to obtain an illumination difference prediction value of the current block using the extracted information. The decoding unit obtains a difference value (illumination difference residual) between an illumination difference value of the current block and the illumination difference prediction value and then reconstructs an illumination difference value of the current block using the obtained illumination difference residual and the illumination difference prediction value. In this case, information for a neighbor block may be used to obtain the illumination difference prediction value of the current block. For instance, an illumination difference value of the current block may be predicted using the illumination difference value of the neighbor block. Prior to this, it is checked whether a reference index of the current block is equal to that of the neighbor block. According to a result of the checking, what kind of a neighboring block or what value will be used may be decided.

In particular, an illumination difference value of a neighbor block indicating an average pixel difference value between the neighbor block of a current block and a block referred to by the neighbor block is extracted from a video signal (S2310).

Subsequently, it is checked whether a reference index of the current block is equal to a reference index of one of a plurality of neighbor blocks (S2320).

As a result of the checking step (S2320), if there exists at least one neighbor block having the same reference index as that of the current block, it is checked whether there exists one corresponding neighbor block or not (S2330).

As a result of the checking step S2330, if there exists only one neighbor block having the same reference index of the current block, an illumination difference value of the neighbor block having the same reference index of the current block is assigned to an illumination difference prediction value of the current block (S2340). In particular, it is 'PredIC_offset=PredIC_offsetN'.

If the neighbor block having the same reference index as that of the current block fails to exist as a result of the checking step S2320 or if there exist at least two neighbor blocks having the same reference index as that of the current block as a result of the checking step S2330, a median of illumination difference values (PredIC_offsetN, N=A, B, or C) of the neighbor blocks is assigned to an illumination difference prediction value of the current block (S650). In particular, it is 'PredIC_offset=Median(PredIC_offsetA, PredIC_offsetB, PredIC_offsetC)'.

Figure 24:
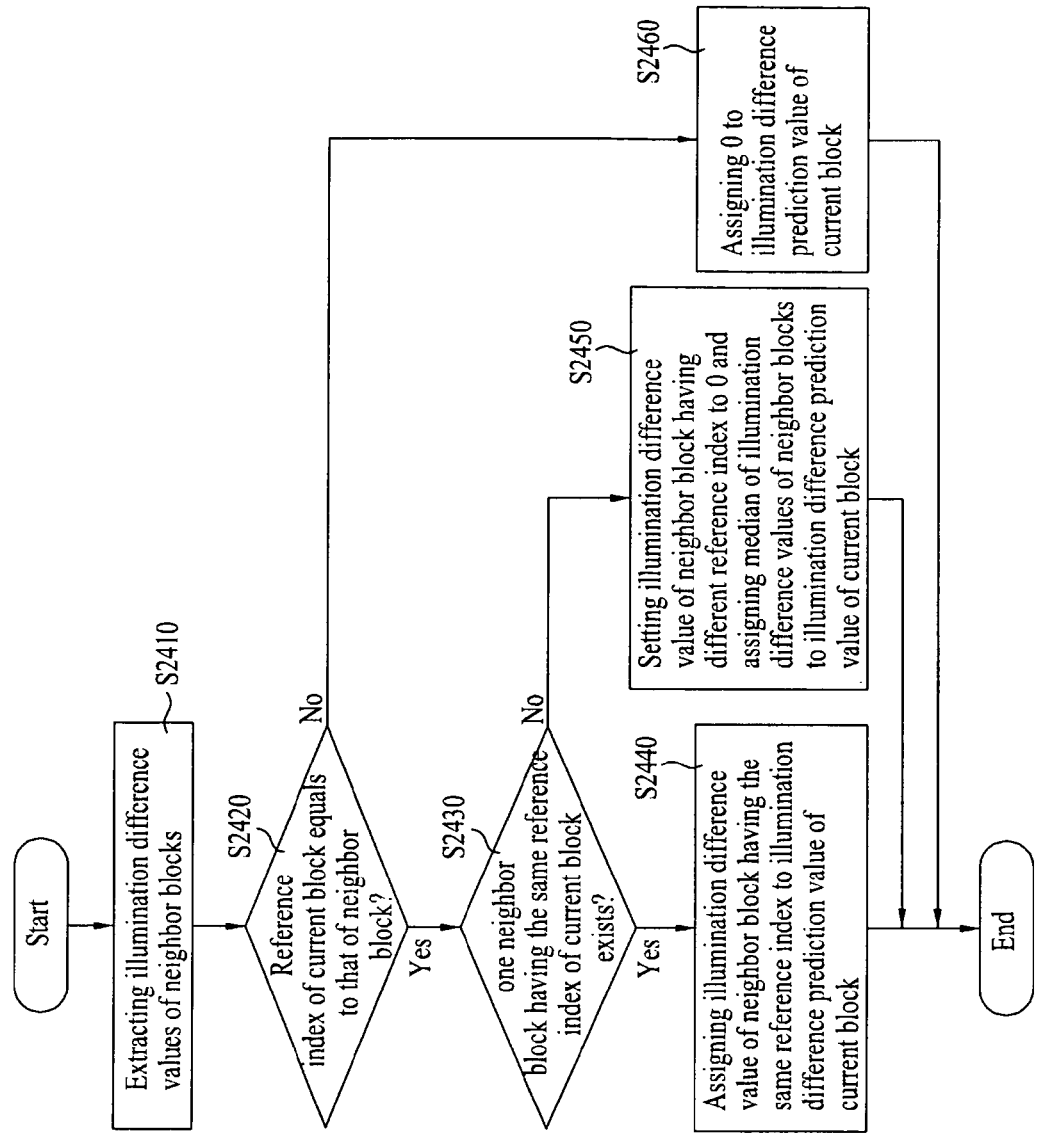
FIG. 24 is a flowchart of a process for performing illumination compensation using information for a neighboring block according to another embodiment of the present invention.

FIG. 24 is a flowchart of a process for performing illumination compensation using information for a neighbor block according to another embodiment of the present invention.

Referring to FIG. 24, a decoding unit has to reconstruct an illumination difference value of a current block to carry out illumination compensation. In this case, information for a neighbor block may be used to obtain an illumination difference prediction value of the current block. For instance, an illumination difference value of the current block may be predicted using the illumination difference value of the neighbor block. Prior to this, it is checked whether a reference index of the current block is equal to that of the neighbor block. According to a result of the checking, what kind of a neighboring block or what value will be used may be decided.

In particular, an illumination difference value of a neighbor block indicating an average pixel difference value between the neighbor block of a current block and a block referred to by the neighbor block is extracted from a video signal (S2410).

Subsequently, it is checked whether a reference index of the current block is equal to a reference index of one of a plurality of neighbor blocks (S2420).

As a result of the checking step S2420, if there exists at least one neighbor block having the same reference index as that of the current block, it is checked whether there exist only one such corresponding neighbor block or not (S2430).

As a result of the checking step S2430, if there exists only one neighbor block having the same reference index as that of the current block, an illumination difference value of the neighbor block having the same reference index as that of the current block is assigned to an illumination difference prediction value of the current block (S2440). In particular, it is 'PredIC_offset=PredIC_offsetN'.

If the neighbor block having the same reference index as that of the current block fails to exist as a result of the checking step S2420, the illumination difference prediction value of the current block is set to 0 (S2460). In particular, it is 'PredIC_offset=0'.

If there exist at least two neighbor blocks having the same reference index as that of the current block as a result of the checking step S2430, the neighbor block having a reference index different from that of the current block is set to 0 and a median of illumination difference values of the neighbor blocks including the value set to 0 is assigned to the illumination difference prediction value of the current block (S2450). In particular, it is 'PredIC_offset=Median(PredI- C_offsetA, PredIC_offsetB, PredIC_offsetC)'. Yet, in case that there exists the neighbor block having the reference index different from that of the current block, the value '0' can be included in PredIC_offsetA, PredIC_offsetB, or PredIC_offsetC.

Meanwhile, view information for identifying a view of a picture and a reference picture list for inter-view prediction are applicable to synthesizing a picture in a virtual view. In a process for synthesizing a picture in a virtual view, a picture in a different view may be referred to. So, if the view information and the reference picture list for the inter-view prediction are used, a picture in a virtual view may be synthesized more efficiently. In the following description, methods of synthesizing a picture in a virtual view according to embodiments of the present invention are explained.

Figure 25:
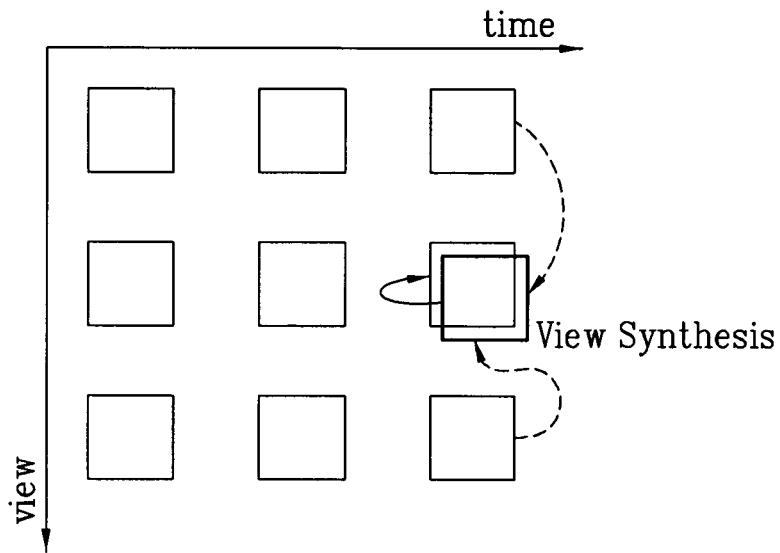
FIG. 25 is a diagram of a process for predicting a current picture using a picture in a virtual view according to one embodiment of the present invention.

FIG. 25 is a block diagram of a process for predicting a current picture using a picture in a virtual view according to one embodiment of the present invention.

Referring to FIG. 25, in performing inter-view prediction in multi-view video coding, a current picture may be predicted using a picture in a view different from that of the current view as a reference picture. Yet, a picture in a virtual view is obtained using pictures in a view neighboring that of a current picture, and the current picture is then predicted using the obtained picture in the virtual view. If so, the prediction can be more accurately performed. In this case, a view identifier indicating a view of a picture can be used to utilize pictures in neighbor views or pictures in a specific view. In case that the virtual view is generated, there must exist specific syntax for indicating whether to generate the virtual view. If the syntax indicates that the virtual view shall be generated, the virtual view may be generated using the view identifier. The pictures in the virtual view obtained by the view synthesis prediction unit 740 are usable as reference pictures. In this case, the view identifier can be assigned to the pictures in the virtual view. In a process for performing motion vector prediction to transfer a motion vector, neighbor blocks of a current block can refer to the pictures obtained by the view synthesis prediction unit 740. In this case, to use the picture in the virtual view as the reference picture, a view identifier indicating a view of a picture can be utilized.

Figure 26:
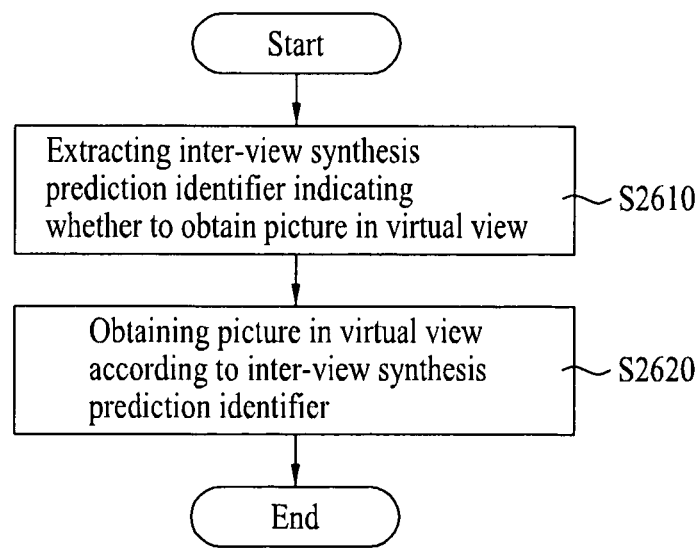
FIG. 26 is a flowchart of a process for synthesizing a picture in a virtual view in performing an inter-view prediction in MVC according to an embodiment of the present invention.

FIG. 26 is a flowchart of a process for synthesizing a picture of a virtual view in performing inter-view prediction in MVC according to an embodiment of the present invention.

Referring to FIG. 26, a picture in a virtual view is selectively synthesized using pictures in a view neighboring that of a current picture. The current picture is then predicted using the synthesized picture in the virtual view. If so, a more accurate prediction may be achieved. In step S2610, a specific syntax indicating whether to execute a prediction of a current picture by synthesizing the picture in the virtual view is extracted from the video signal. If it is decided whether to execute the prediction of the current picture, more efficient coding is possible. The specific syntax is defined as an inter-view synthesis prediction identifier, which is set by the encoder and explained below. For instance, at a slice layer the syntax 'view_synthesize_pred_flag' may indicate whether to execute a prediction of a slice in a current picture using a virtual view. And, at a macroblock layer, the syntax 'view_syn_pred_flag' may indicate whether to execute a prediction of a macroblock in a current picture using a virtual view. Based on the inter-view synthesis prediction identifier, a virtual view is obtained in step S2620. For example, if 'view_synthesize_pred_flag=1', a current slice synthesizes a slice in a virtual view using a slice in a view neighbor to that of the current slice. The current slice may be predicted using the synthesized slice. If 'view_synthesize_pred_flag=0', a slice in a virtual view is not synthesized. Likewise, if 'view_syn_pred_flag=1', a current macroblock synthesizes a macroblock in a virtual view using a macroblock in a view neighbor to that of the current macroblock. The current macroblock may then be predicted using the synthesized macroblock. If 'view_syn_pred_flag=0', a macroblock in a virtual view is not synthesized. Hence, in an embodiment of the present invention, the inter-view synthesis prediction identifier indicating whether to obtain a picture in a virtual view is extracted from a video signal. The picture in the virtual view may then be obtained using the inter-view synthesis prediction identifier.

As mentioned in the foregoing description, view information for identifying a view of a picture and a reference picture list for inter-view prediction can be used by the inter-prediction unit 700. And, they can be used in performing weighted prediction as well. The weighted prediction is applicable to a process for performing motion compensation. In doing so, if a current picture uses a reference picture in a different view, the weighted prediction may be performed more efficiently using the view information and the reference picture list for the inter-view prediction. Weighted prediction methods according to embodiments of the present invention are explained as follows.

Figures 27, 28:
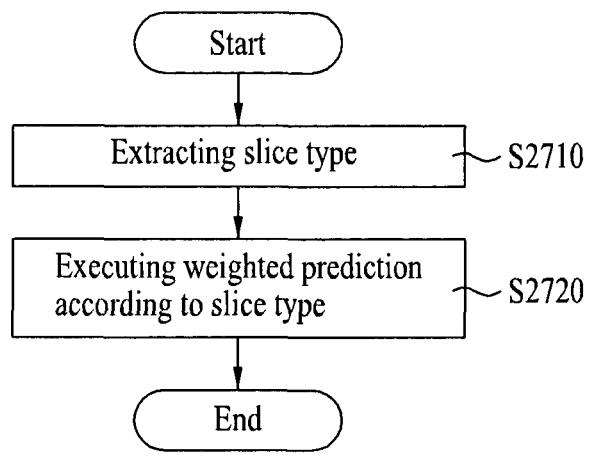
FIG. 27 is a flowchart of a method of executing a weighted prediction according to a slice type in video signal coding according to the present invention.
FIG. 28 is a diagram of macroblock types allowable in a slice type in video signal coding according to the present invention.

FIG. 27 is a flowchart of a method of executing weighted prediction according to a slice type in video signal coding according to an embodiment of the present invention.

Referring to FIG. 27, weighted prediction is a method of scaling a sample of motion compensated prediction data within a P-slice or B-slice macroblock. A weighted prediction method includes an explicit mode for performing weighted prediction for a current picture using weighted coefficient information obtained from information for reference pictures and an implicit mode for performing weighted prediction for a current picture using weighted coefficient information obtained from information for a distance between the current picture and one of the reference pictures. The weighted prediction method can be differently applied according to a slice type of a current macroblock. For instance, in the explicit mode, the weighted coefficient information can be varied according to whether a current macroblock, on which weighted prediction is performed, is a macroblock of a P-slice or a macroblock of a B-slice. And, the weighted coefficient of the explicit mode can be decided by an encoder and can be transferred by being included in a slice header. On the other hand, in the implicit mode, a weighted coefficient can be obtained based on a relatively temporal position of List 0 and List 1 reference pictures. For instance, if a reference picture is temporally close to a current picture, a large weight coefficient is applicable. If a reference picture is temporally distant from a current picture, a small weight coefficient is applicable.

First of all, a slice type of a macroblock to apply weighted prediction thereto is extracted from a video signal (S2710).

Subsequently, weighted prediction can be performed on a macroblock according to the extracted slice type (S2720).

In this case, the slice type can include a macroblock to which inter-view prediction is applied. Inter-view prediction means that a current picture is predicted using information from a picture in a view different from that of the current picture. For instance, the slice type can include a macroblock to which temporal prediction, (prediction using information from a picture in a same view as that of a current picture) is applied; a macroblock to which the inter-view prediction is applied; and a macroblock to which both of temporal prediction and inter-view prediction are applied. And, the slice type can include a macroblock to which temporal prediction is applied only, a macroblock to which inter-view prediction is applied only, or a macroblock to which both temporal prediction and inter-view prediction are applied. Moreover, the slice type can include two of the macroblock types or all three macroblock types. This will be explained in detail with reference to FIG. 28 later. Thus, in case that a slice type including an inter-view prediction applied macroblock is extracted from a video signal, weighted prediction is performed using information for a picture in a view different from that of a current picture. In doing so, a view identifier for identifying a view of a picture can be utilized to use information for a picture in a different view.

FIG. 28 is a diagram of macroblock types allowable in a slice type in video signal coding according to one embodiment of the present invention.

Referring to FIG. 28, if a P-slice type by inter-view prediction is defined as VP (View_P), an intra-macroblock I, a macroblock P predicted from one picture in a current view, or a macroblock VP predicted from one picture in a different view is allowable for the VP-slice type by inter-view prediction (2810).

A B-slice type by inter-view prediction is defined as VB (View_B), and a macroblock P or B predicted from at least one picture in a current view or a macroblock VP or VB predicted from at least one picture in a different view is allowable (2820).

A slice type, on which prediction is performed using temporal prediction, inter-view prediction, or both temporal prediction and inter-view prediction, is defined as 'Mixed'. An intra-macroblock I, a macroblock P or B predicted from at least one picture in a current view, a macroblock VP or VB predicted from at least one picture in a different view, or a macroblock 'Mixed' predicted using both a picture in the current view and a picture in the different view is allowable for the mixed slice type (2830). In this case, in order to use the picture in the different view, a view identifier for identifying a view of a picture may be used.

FIG. 29 and FIG. 30 are diagrams of syntax for executing weighted prediction according to a newly defined slice type according to one embodiment of the present invention.

As mentioned in the foregoing description of FIG. 28, if the slice type is decided as VP, VB, or Mixed, the syntax for performing the conventional weighted prediction (e.g., H.264) can be modified into FIG. 29 or FIG. 30. For instance, a part 'if(slice_type!=VP∥slice_type!=VB)' may be added (2910), and if a slice type is a B-slice the if-statement can be modified into 'if(slice_type==B∥slice_type==Mixed)' (2920).

By newly defining a VP slice type and a VB slice type, a format as shown in FIG. 30 can be newly added (2930, 2940). In this case, since information for a view is added, syntax elements include 'view' parts, respectively. For example, there is 'luma_log 2_view_weight_denom, chroma_log 2_view_weight_denom'.

Figure 31:
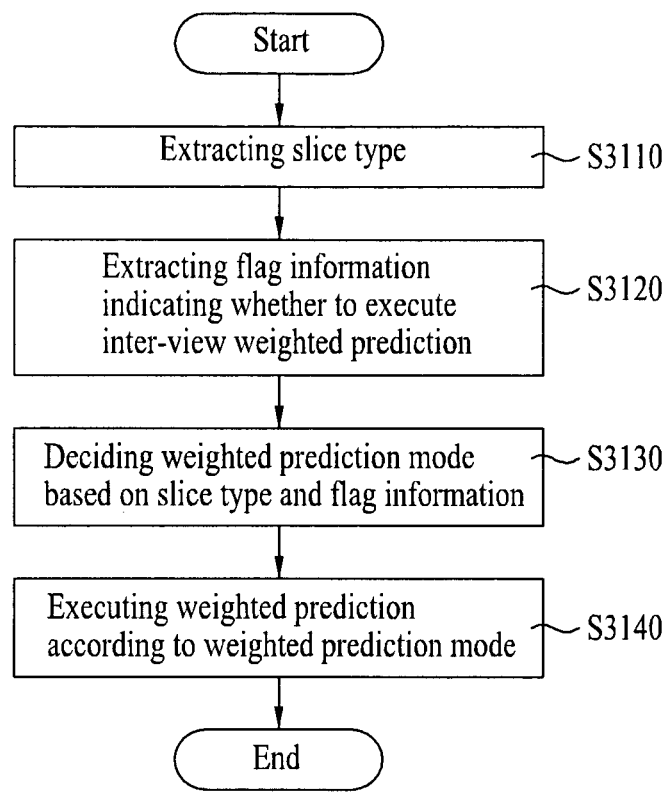
FIG. 31 is a flowchart of a method of executing a weighted prediction using flag information indicating whether to execute inter-view weighted prediction in video signal coding according to the present invention.

FIG. 31 is a flowchart of a method of executing weighted prediction using flag information indicating whether to execute inter-view weighted prediction in video signal coding according to the present invention.

Referring to FIG. 31, in video signal coding to which the present invention is applied, in case of using flag information indicating whether weighted prediction will be executed, more efficient coding may be enabled.

The flag information can be defined based on a slice type. For instance, there can exist flag information indicating whether weighted prediction will be applied to a P-slice or a SP-slice or flag information indicating whether weighted prediction will be applied to a B-slice.

In particular, the flag information can be defined as 'weighted_pred_flag' or 'weighted_bipred_idc' in the video signal; and in particular, the slice header of a slice. If 'weighted_pred_flag=0', it indicates that weighted prediction is not applied to the P-slice and the SP-slice. If 'weighted_pred_flag=1', it indicates that weighted prediction is applied to the P-slice and the SP-slice. If 'weighted_bipred_idc=0', it indicates that default weighted prediction is applied to the B-slice. If 'weighted_bipred_idc=1', it indicates that explicit weighted prediction is applied to the B-slice. If 'weighted_bipred_idc=2', it indicates that implicit weighted prediction is applied to the B-slice.

In multi-view video coding, flag information indicating whether weighted prediction will be executed using information for an inter-view picture can be defined based on a slice type.

First of all, a slice type and flag information indicating whether inter-view weighted prediction will be executed are extracted from a video signal (S3110, S3120). In this case, the slice type can include a macroblock to which temporal prediction for performing prediction using information for a picture in a same view as that of a current picture is applied and a macroblock to which inter-view prediction for performing prediction using information for a picture in a view different from that of a current picture is applied.

A weighted prediction mode may be decided based on the extracted slice type and the extracted flag information (S3130).

Subsequently, weighted prediction according to the decided weighted prediction mode may be performed (S3140). In this case, the flag information can include flag information indicating whether weighted prediction will be executed using information for a picture in a view different from that of a current picture as well as the aforesaid 'weighted_pred_flag' and 'weighted_bipred_idc'. This will be explained in detail with reference to FIG. 32 later.

Hence, in case that a slice type of a current macroblock is a slice type permitting a macroblock to which inter-view prediction is applied, more efficient coding is enabled rather than a case of using flag information indicating whether weighted prediction will be executed using information for a picture in a different view.

FIG. 32 is a diagram to explain a weight predicting method according to flag information indicating whether to execute weighted prediction using information for a picture in a view different from that of a current picture according to one embodiment of the present invention.

Referring to FIG. 32, for example, flag information indicating whether weighted prediction will be executed using information for a picture in a view different from that of a current picture can be defined as 'view_weighted_pred_flag' or 'view_weighted_bipred_flag'.

If 'view_weighted_pred_flag=0', it indicates that weighted prediction is not applied to a VP-slice. If 'view_weighted_pred_flag=1', explicit weighted prediction is applied to a VP-slice. If 'view_weighted_bipred_flag=0', it indicates that default weighted prediction is applied to a VB-slice. If 'view_weighted_bipred_flag=1', it indicates that explicit weighted prediction is applied to a VB-slice. If 'view_weighted_bipred_flag=2', it indicates that implicit default weighted prediction is applied to a VB-slice.

In case that implicit weighted prediction is applied to a VB-slice, a weight coefficient can be obtained from a relative distance between a current view and a different view. In case that implicit weighted prediction is applied to a VB-slice, weighted prediction can be performed using a view identifier identifying a view of a picture or a picture order count (POC) rendered by considering discrimination of each view.

The above flag information can be included in a picture parameter set (PPS). In this case, the picture parameter set (PPS) means header information indicating an encoding mode of all pictures (e.g., entropy encoding mode, quantization parameter initial value by picture unit, etc.). Yet, the picture parameter set is not attached to all of the pictures. If a picture parameter set does not exist, a previous picture parameter set existing right before may be used.

FIG. 33 is a diagram of syntax for executing weighted prediction according to newly defined flag information according to one embodiment of the present invention.

Referring to FIG. 33, in multi-view video coding to which the present invention is applied, in case that a slice type including a macroblock applied to inter-view prediction and flag information indicating whether weighted prediction will be executed using information for a picture in a view different from that of a current picture are defined, what kind of weighted prediction to execute may be decided according to a slice type.

For instance, if a slice type, as shown in FIG. 33, extracted from a video signal is a P-slice or a SP-slice, weighted prediction can be executed if 'weighted_pred_flag=1'. In case that a slice type is a B-slice, weighted prediction can be executed if 'weighted_bipred_flag=1'. In case that a slice type is a VP-slice, weighted prediction can be executed if 'view_weighted_pred_flag=1'. In case that a slice type is a VB-slice, weighted prediction can be executed if 'view_weighted_bipred_flag=1'.

Figure 34:
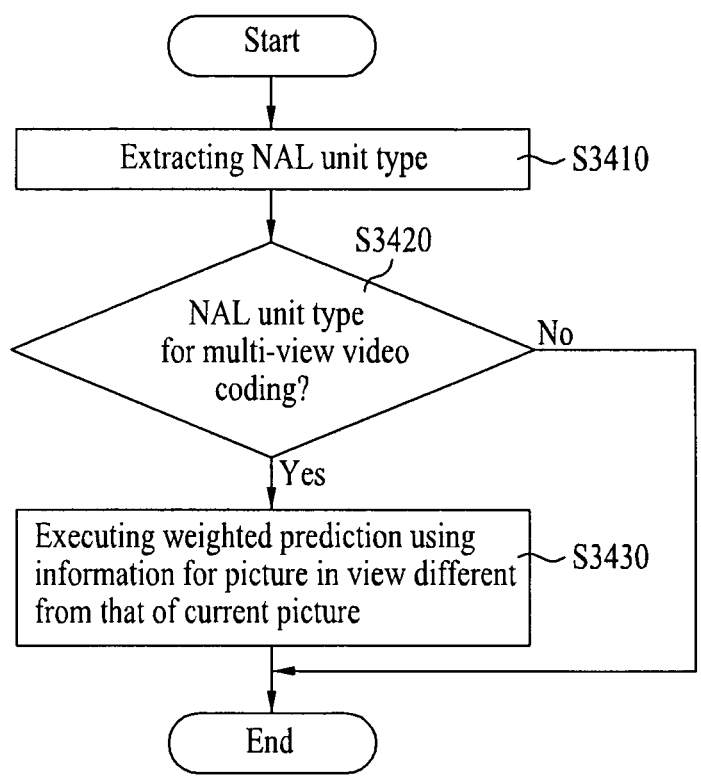
FIG. 34 is a flowchart of a method of executing a weighted prediction according to a NAL (network abstraction layer) unit type according to an embodiment of the present invention.

FIG. 34 is a flowchart of a method of executing weighted prediction according to a NAL (network abstraction layer) unit according to an embodiment of the present invention.

Referring to FIG. 34, first of all, a NAL unit type (nal_unit_type) is extracted from a video signal (S910). In this case, the NAL unit type means an identifier indicating a type of a NAL unit. For instance, if 'nal_unit_type=5', a NAL unit is a slice of an IDR picture. And, the IDR (instantaneous decoding refresh) picture means a head picture of a video sequence.

Subsequently, it is checked whether the extracted NAL unit type is a NAL unit type for multi-view video coding (S3420).

If the NAL unit type is the NAL unit type for multi-view video coding, weighted prediction is carried out using information for a picture in a view different from that of a current picture (S3430). The NAL unit type can be a NAL unit type applicable to both scalable video coding and multi-view video coding or a NAL unit type for multi-view video coding only. Thus, if the NAL unit type is for multi-view video coding, the weighted prediction should be executed using the information for the picture in the view different from that of the current picture. A new syntax may be defined in view of the above. This will be explained in detail with reference to FIG. 35 and FIG. 36 as follows.

FIG. 35 and FIG. 36 are diagrams of syntax for executing weighted prediction in case that a NAL unit type is for multi-view video coding according to one embodiment of the present invention.

First of all, if a NAL unit type is a NAL unit type for multi-view video coding, syntax for executing conventional weighted prediction (e.g., H.264) can be modified into the syntax shown in FIG. 35 or FIG. 36. For instance, a reference number 3510 indicates a syntax part for performing conventional weighted prediction and a reference number 3520 indicates a syntax part for performing weighted prediction in multi-view video coding. So, the weighted prediction is performed by the syntax part 3520 only if the NAL unit type is the NAL unit type for multi-view video coding. In this case, since information for a view is added, each syntax element includes a 'view' portion. For instance, there is 'luma_view_log 2_weight_denom, chroma_view_log 2_weight_denom' or the like. And, a reference number 3530 in FIG. 36 indicates a syntax part for performing conventional weighted prediction and a reference number 3540 in FIG. 36 indicates a syntax part for performing weighted prediction in multi-view video coding. So, the weighted prediction is performed by the syntax part 3540 only if the NAL unit type is the NAL unit type for multi-view video coding. Likewise, since information for a view is added, each syntax element includes a 'view' portion. For instance, there is 'luma_view_weight_l1_flag, chroma_view_weight_l1_flag' or the like. Thus, if a NAL unit type for multi-view video coding is defined, more efficient coding is enabled un a manner of performing weighted prediction using information for a picture in a view different from that of a current picture.

Figure 37:
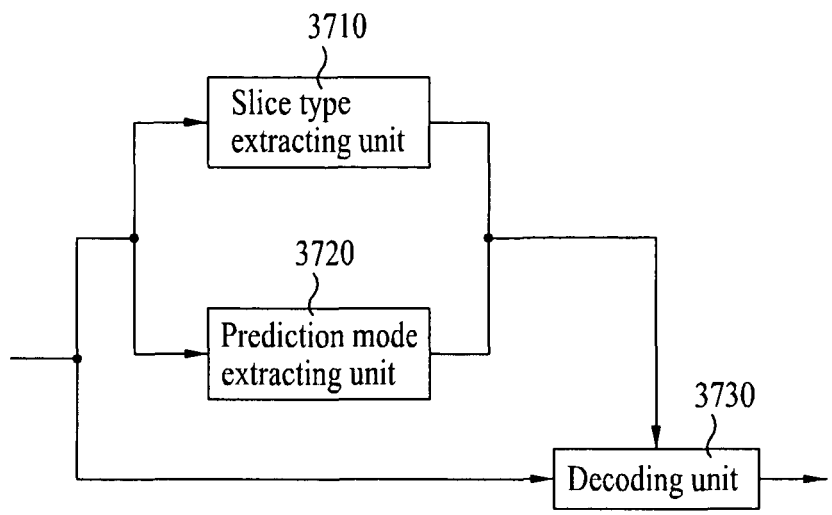
FIG. 37 is a partial block diagram of a video signal decoding apparatus according to a newly defined slice type according to an embodiment of the present invention.

FIG. 37 is a block diagram of an apparatus for decoding a video signal according to an embodiment of the present invention.

Referring to FIG. 37, an apparatus for decoding a video signal according to the present invention includes a slice type extracting unit 3710, a prediction mode extracting unit 3720 and a decoding unit 3730.

Figure 38:
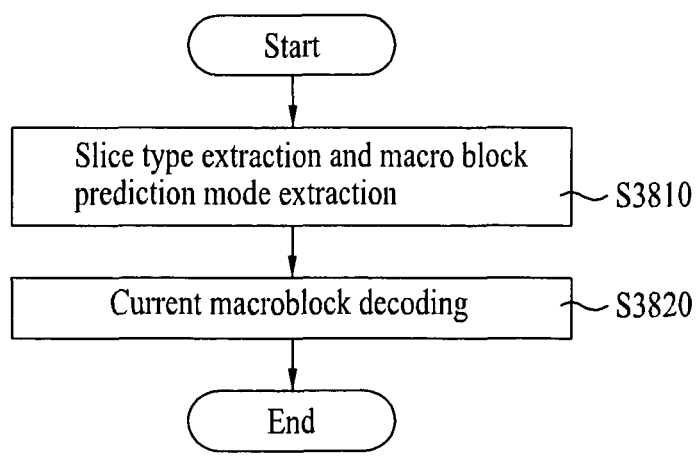
FIG. 38 is a flowchart to explain a method of decoding a video signal in the apparatus shown in FIG. 37 according to the present invention.

FIG. 38 is a flowchart of a method of decoding a video signal in the decoding apparatus shown in FIG. 37 according to one embodiment of the present invention.

Referring to FIG. 38, a method of decoding a video signal according to one embodiment of the present invention includes a step S3810 of extracting a slice type and a macroblock prediction mode, and a step S3820 of decoding a current macroblock according to the slice type and/or macroblock prediction mode.

First, a prediction scheme used by an embodiment of the present invention is explained to help in the understanding of the present invention. The prediction scheme may be classified into an intra-view prediction (e.g., prediction between pictures in a same view) and an inter-view prediction (e.g., prediction between pictures in different views). And, the intra-view prediction can be the same prediction scheme as a general temporal prediction.

According to the present invention, the slice type extracting unit 3710 extracts a slice type of a slice including a current macroblock (S3810).

In this case, a slice type field (slice_type) indicating a slice type for intra-view prediction and/or a slice type field (view_slice_type) indicating a slice type for inter-view prediction may be provided as part of the video signal syntax to provide the slice type. This will be described in greater deal below with respect to FIGS. 40 and 41. And, each of the slice type (slice_type) for intra-view prediction and the slice type (view_slice_type) for inter-view prediction may indicate, for example, an I-slice type (I_SLICE), a P-slice type (P_SLICE), or a B-slice type (B_SLICE).

For instance, if 'slice_type' of a specific slice is a B-slice and 'view_slice_type' is a P-slice, a macroblock in the specific slice is decoded by a B-slice (B_SLICE) coding scheme in an intra-view direction (i.e., a temporal direction) and/or by a P-slice (P_SLICE) coding scheme in a view direction.

Meanwhile, the slice type is able to include a P-slice type (VP) for inter-view prediction, a B-slice type (VB) for inter-view prediction and a mixed slice type. (Mixed) by prediction resulting from mixing both prediction types. Namely, the mixed slice type provides for prediction using a combination of intra-view and inter-view prediction.

In this case, a P-slice type for inter-view prediction means a case that each macroblock or macroblock partition included in a slice is predicted from one picture in a current view or one picture in a different view. A B-slice type for inter-view prediction means a case that each macroblock or macroblock partition included in a slice is predicted from 'one or two pictures in a current view' or 'one picture in a different view or two pictures in different views, respectively'. And, a mixed slice type for prediction resulting from mixing both predictions means a case that each macroblock or macroblock partition included in a slice is predicted from 'one or two pictures in a current view', 'one picture in a different view or two pictures in different views, respectively', or 'one or two pictures in a current view and one picture in a different view or two pictures in different views, respectively'.

In other words, a referred picture and allowed macroblock type differ in each slice type, which will be explained in detail with reference to FIG. 43 and FIG. 44 later.

And, the syntax among the aforesaid embodiments of the slice type will be explained in detail with reference to FIG. 40 and FIG. 41 later.

The prediction mode extracting unit 3720 may extract a macroblock prediction mode indicator indicating whether the current macroblock is a macroblock by intra-view prediction, a macroblock by inter-view prediction or a macroblock by prediction resulting from mixing both types of prediction (S3820). For this, the present invention defines a macroblock prediction mode (mb_pred_mode). One embodiment of the macroblock prediction modes will be explained in detail with reference to FIGS. 39,40 and FIG. 41 later.

The decoding unit 3730 decodes the current macroblock according to the slice type and/or the macroblock prediction mode to receive/produce the current macroblock (S3820). In this case, the current macroblock can be decoded according to the macroblock type of the current macroblock decided from the macroblock type information. And, the macroblock type can be decided according to the macroblock prediction mode and the slice type.

In case that the macroblock prediction mode is a mode for intra-view prediction, the macroblock type is decided according to a slice type for intra-view prediction and the current macroblock is then decoded by intra-view prediction according to the decided macroblock type.

In case that the macroblock prediction mode is a mode for inter-view prediction, the macroblock type is decided according to a slice type for inter-view prediction and the current macroblock is then decoded by the inter-view prediction according to the decided macroblock type.

In case that the macroblock prediction mode is a mode for prediction resulting from mixing both predictions, the macroblock type is decided according to a slice type for intra-view prediction and a slice type for inter-view prediction, and the current macroblock is then decoded by the prediction resulting from mixing both predictions according to each of the decided macroblock types.

In this case, the macroblock type depends on a macroblock prediction mode and a slice type. In particular, a prediction scheme to be used for a macroblock type may be determined from a macroblock prediction mode, and a macroblock type is then decided from macroblock type information by a slice type according to the prediction scheme. Namely, one of or both of the extracted slice_type and view_slice_type are selected based on the macroblock prediction mode.

For instance, if a macroblock prediction mode is a mode for inter-view prediction, a macroblock type may be decided from a macroblock table of slice types (I, P, B) corresponding to a slice type (view_slice_type) for inter-view prediction. The relation between a macroblock prediction mode and a macroblock type will be explained in detail with reference to FIGS. 39,40 and FIG. 41 later.

FIG. 39 is a diagram of a macroblock prediction modes according to example embodiments of the present invention.

In FIG. 39(a), a table corresponding to one embodiment of macroblock prediction modes (mb_pred_mode) according to the present invention is shown.

In case that intra-view prediction, i.e., temporal prediction is used for a macroblock only, '0' is assigned to a value of the 'mb_pred_mode'. In case that inter-view prediction is used for a macroblock only, '1' is assigned to a value of the 'mb_pred_mode'. In case that both temporal and inter-view prediction is used for a macroblock, '2' is assigned to a value of the 'mb_pred_mode'.

In this case, if a value of the 'mb_pred_mode' is '1', i.e., if the 'mb_pred_mode' indicates the inter-view prediction, view direction List0 (ViewList0) or view direction List1 (ViewList1) is defined as a reference picture list for the inter-view prediction.

In FIG. 39(b), the relation between a macroblock prediction mode and a macroblock type according to another embodiment is shown.

If a value of 'mb_pred_mode' is '0', temporal prediction is used only. And, a macroblock type is decided according to a slice type (slice_type) for intra-view prediction.

If a value of 'mb_pred_mode' is '1', inter-view prediction is used only. And, a macroblock type is decided according to a slice type (view_slice_type) for inter-view prediction.

If a value of 'mb_pred_mode' is '2', mixed prediction of both temporal and intra-view prediction is used. And, two macroblock types are decided according to a slice type (slice_type) for intra-view prediction and a slice type (view_slice_type) for inter-view prediction.

Based on the macroblock prediction mode, the macroblock type is given based on the slice type as shown in tables 1-3 below.

In other words, in this embodiment, a prediction scheme used for a macroblock and a slice type referred to are decided by a macroblock prediction mode. And, a macroblock type is decided according to the slice type.

FIG. 40 and FIG. 41 are diagrams of example embodiments of the syntax of a portion of the video signal received by the apparatus for decoding the video signal. As shown, the syntax has slice type and macroblock prediction mode information according to an embodiment of the present invention.

In FIG. 40, an example syntax is shown. In the syntax, the field 'slice_type' and the field 'view_slice_type' provide slice types and the field 'mb_pred_mode' provides a macroblock prediction mode.

According to the present invention, the 'slice_type' field provides a slice type for intra-view prediction and the 'view_slice_type' field provides a slice type for inter-view prediction. Each slice type can become I-slice type, P-slice type or B-slice type. If a value of the 'mb_pred_mode' is '0' or '1', one macroblock type is decided. Yet, in case that a value of the 'mb_pred_mode' is '2', it can be seen that another macroblock type (or two types) is further decided. In other words, the syntax shown in (a) of FIG. 40 indicates that 'view_slice_type' is added to further apply the conventional slice types (I, P, B) to multi-view video coding.

In FIG. 41, another example syntax is shown. In the syntax, a 'slice_type' field is employed to provide a slice type and a 'mb_pred_mode' field is employed to provide a macroblock prediction mode.

According to the present invention, the 'slice_type' field may include, among others, a slice type (VP) for inter-view prediction, a slice type-B (VB) for inter-view prediction and a mixed slice type (Mixed) for prediction resulting from mixing both intra-view and inter-view predictions.

If a value in the 'mb_pred_mode' field is '0' or '1', one macroblock type is decided. Yet, in case that a value of the 'mb_pred_mode' field is '2', it can be seen that an additional (i.e., total of two) macroblock type is decided. In this embodiment, the slice type information exists in a slice header, which will be explained in detail with respect to FIG. 42. In other words, the syntax shown in FIG. 41 indicates that VP, VB and Mixed slice types are added to the conventional slice type (slice_type).

FIG. 42 provides diagrams of examples for applying the slice types shown in FIG. 41.

The diagram in FIG. 42(a) shows that a P-slice type (VP) for inter-view prediction, a B-slice type (VB) for inter-view prediction and a mixed slice type (Mixed) for prediction resulting from mixing both predictions may exist as the slice type, in addition to other slice types, in a slice header. In particular, the slice types VP, VR and Mixed according to an example embodiment are added to the slice types that may exist in a general slice header.

The diagram in FIG. 42(b) shows that a P-slice type (VP) for inter-view prediction, a B-slice type (VB) for inter-view prediction and a mixed slice type (Mixed) for prediction resulting from mixing both predictions may exist as the slice type in a slice header for multi-view video coding (MVC). In particular, the slice types according to an example embodiment are defined in a slice header for multi-view video coding.

The diagram in FIG. 42(c) shows that a slice type (VP) for inter-view prediction, a B-slice type (VB) for inter-view prediction and a mixed slice type (Mixed) for prediction resulting from mixing both predictions may exist as the slice type, in addition to existing slice type for scalable video coding, in a slice header for scalable video coding (SVC). In particular, the slice types VP, VB and Mixed according to an example embodiment are added to slice types that may exist in a slice header of the scalable video coding (SVC) standard.

Figure 43:
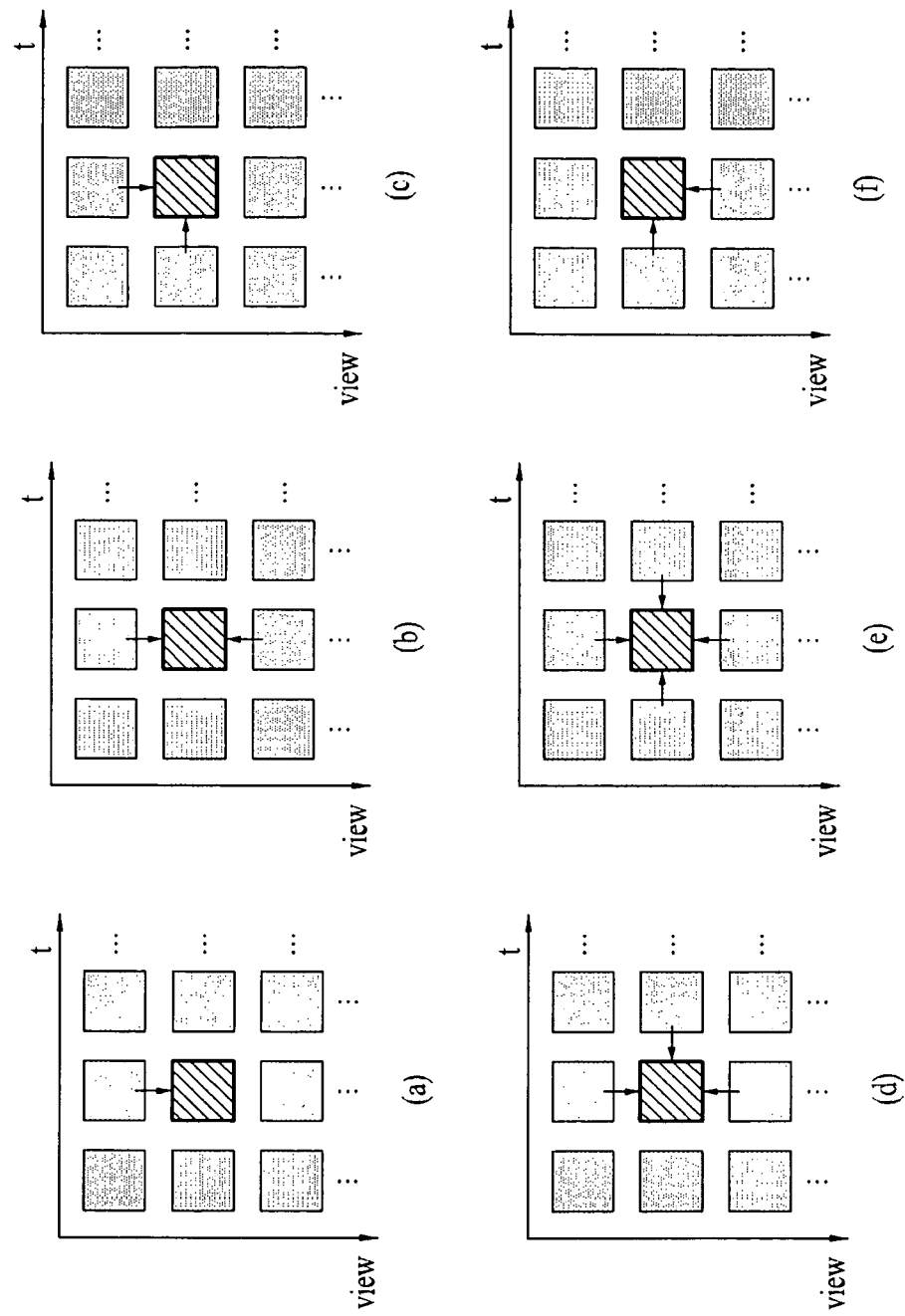
FIG. 43 is a diagram of various embodiments of the slice type included in the slice types shown in FIG. 41.

FIG. 43 shows diagrams of various slice type examples included in the slice type shown in FIG. 41.

In FIG. 43(a), a case that a slice type is predicted from one picture in a different view is shown. So, a slice type becomes a slice type (VP) for inter-view prediction.

In FIG. 43(b), a case that a slice type is predicted from two pictures in different views, respectively is shown. So, a slice type becomes a B-slice type (VB) for inter-view prediction.

In FIGS. 43(c) and 43(f), a case that a slice type is predicted from one or two pictures in a current view and one picture in a different view is shown. So, a slice type becomes a mixed slice type (Mixed) for prediction resulting from mixing both predictions. Also, in FIGS. 43(d) and 43(e), a case that a slice type is predicted from one or two pictures in a current view and two pictures in different views is shown. So, a slice type also becomes a mixed slice type (Mixed).

FIG. 44 is a diagram of a macroblock allowed for the slice types shown in FIG. 41.

Referring to FIG. 44, an intra macroblock (I), a macroblock (P) predicted from one picture in a current view or a macroblock (VP) predicted from one picture in a different view is allowed for a P-slice type (VP) by inter-view prediction.

An intra macroblock (I), a macroblock (P or B) predicted from one or two pictures in a current view or a macroblock VP or VB predicted from one picture in a different view or two pictures in different views, respectively, are allowed for a B-slice type (VB) by inter-view prediction.

And, an intra macroblock (I); a macroblock (P or B) predicted from one or two pictures in a current view; a macroblock (VP or VB) predicted from one picture in a different view or two pictures in different views, respectively, or a macroblock (Mixed) predicted from one or two pictures in a current view, one picture in a different view or two pictures in different views, respectively, are allowed for a mixed slice type (Mixed).

Figure 47:
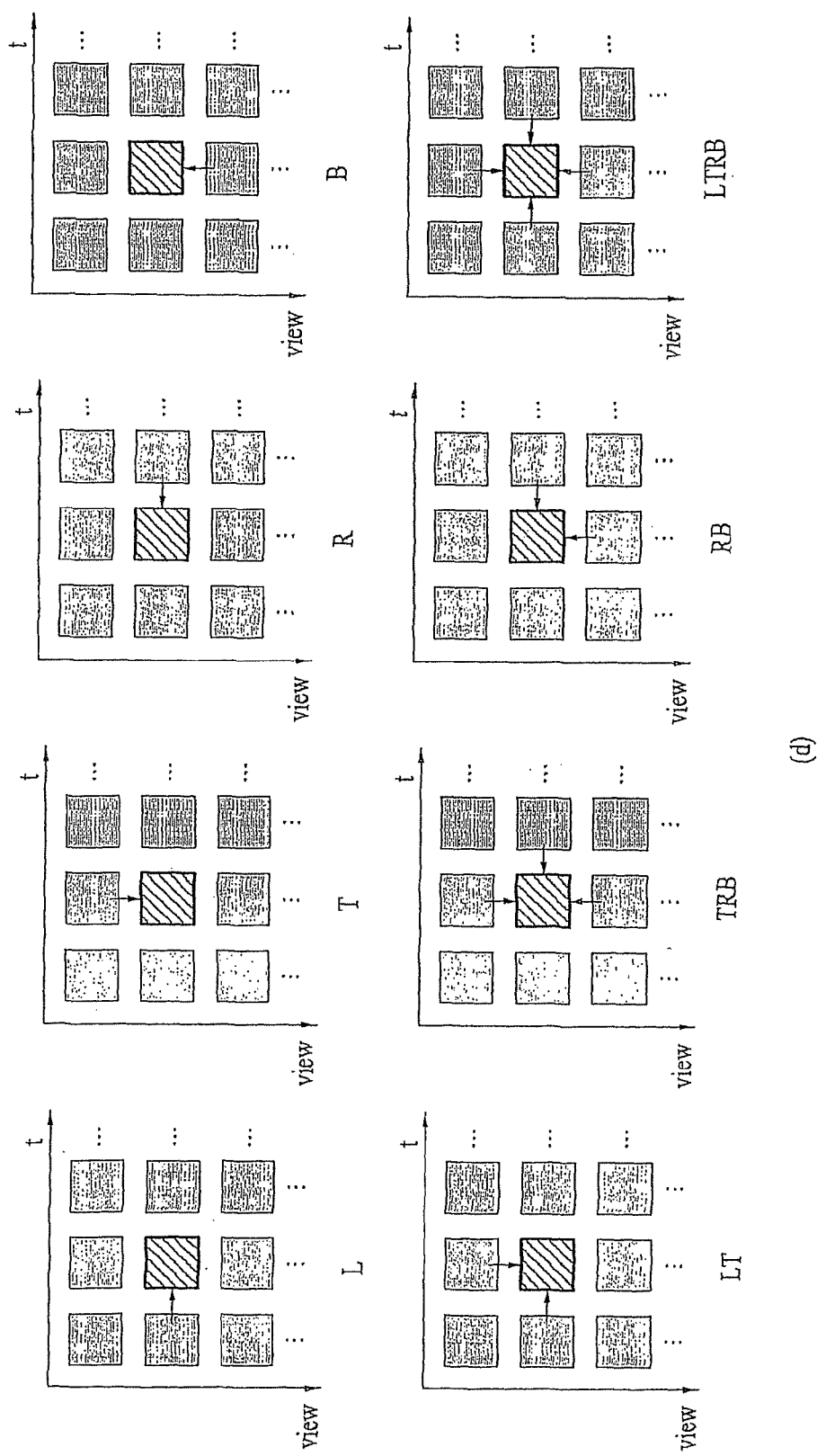

FIGS. 45-47 are diagrams of a macroblock type of a macroblock existing in a mixed slice type (Mixed) according to embodiments of the present invention.

In FIGS. 45(a) and 45(b), configuration schemes for a macroblock type (mb_type) and sub-macroblock type (sub_mb_type) of a macroblock existing in a mixed slice are shown, respectively.

In FIGS. 46 and 47, binary representation of predictive direction(s) of a macroblock existing in a mixed slice and actual predictive direction(s) of the mixed slice are shown, respectively.

According to an embodiment of the present invention, a macroblock type (mb_type) is prepared by considering both a size (Partition_Size) of a macroblock partition and a predictive direction (Direction) of a macroblock partition.

And, a sub-macroblock type (sub_mb_type) is prepared by considering both a size (Sub_Partition_Size) of a sub-macroblock partition and a predictive direction (Sub_Direction) of each sub-macroblock partition.

Referring to FIG. 45(a), 'Direction0' and 'Direction1' indicate a predictive direction of a first macroblock partition and a predictive direction of a second macroblock partition, respectively. In particular, in case of a 8×16 macroblock, 'Direction0' indicates a predictive direction for a left 8×16 macroblock partition and 'Direction1' indicates a predictive direction for a right 8×16 macroblock partition. A configuration principle of macroblock type (mb_type) is explained in detail as follows. First, the first two bits indicate a partition size (Partition_Size) of a corresponding macroblock and a value of 0~3 is available for the first two bits. And, four bits following the first two bits indicate a predictive direction (Direction) in case that a macroblock is divided into partitions.

For instance, in case of a 16×16 macroblock, four bits indicating a predictive direction of the macroblock are attached to a rear of the first two bits. In case of a 16×8 macroblock, four bits following the first two bits indicate a predictive direction (Direction0) of a first partition and another four bits are attached to the former four bits to indicate a predictive direction (Direction1) of a second partition. Likewise, in case of a 8×16 macroblock, eight bits are attached to a rear of the first two bits. In this case, the first four bits of the eight bits attached to the first two bits indicate a predictive direction of a first partition and a next four bits indicate a predictive direction of a second partition.

Referring to FIG. 45(b), a predictive direction (Sub_Direction) of a sub-macroblock is used in a same manner as a predictive direction (Direction) of the macroblock partition shown in FIG. 45(a). A configuration principle of sub-macroblock type (sub_mb_type) is explained in detail as follows.

First, the first two bits indicate a partition size (Partition_Size) of a corresponding macroblock and the second two bits, next to the former two bits, indicate a partition size (Sub_Partition_Size) of a sub-macroblock of the corresponding macroblock. A value of 0~3 is available for each of the first and second two bits. Subsequently, four bits attached next to the second two bits indicate a predictive direction (Sub_Direction) in case that a macroblock is divided into sub-macroblock partitions. For instance, if a size (Partition_Size) of a partition of a macroblock is 8×8 and if a size (Sub_Partition_Size) of a partition of a sub-macroblock is 4×8, the first two bits have a value of 3, the second two bits have a value of 2, the first four bits next to the second two bits indicate a predictive direction for a left 4×8 block of two 4×8 blocks, and the second four bits next to the first four bits indicate a predictive direction for a right 4×8 block.

Referring to FIG. 46, a predictive direction of a macroblock is constructed with four bits. And, it can be seen that each binary representation becomes '1' according to a case of referring to a picture at the left (L), top (T), right (R) or bottom (B) position of a current picture.

Referring to FIG. 47, for example, in case that a predictive direction is top (T), a picture located at a top in a view direction of a current picture is referred to. In case that a predictive direction corresponds to all directions (LTRB), it can be seen that pictures in all directions (LTRB) of a current picture are referred to.

Figure 48:
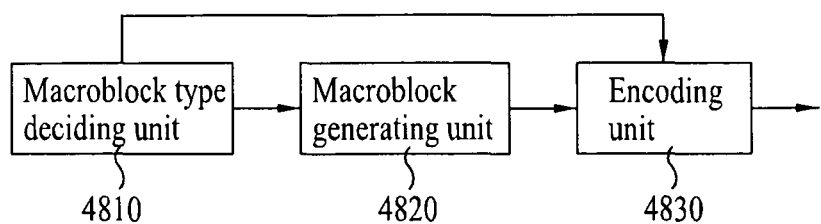
FIG. 48 is a partial block diagram of a video signal encoding apparatus according to a newly defined slice type according to an embodiment of the present invention.

FIG. 48 is a block diagram of an apparatus for encoding a video signal according to an embodiment of the present invention.

Referring to FIG. 48, an apparatus for encoding a video signal according to an embodiment of the present invention. The apparatus includes a macroblock type deciding unit 4810, a macroblock generating unit 4820 and an encoding unit 4830.

Figure 49:
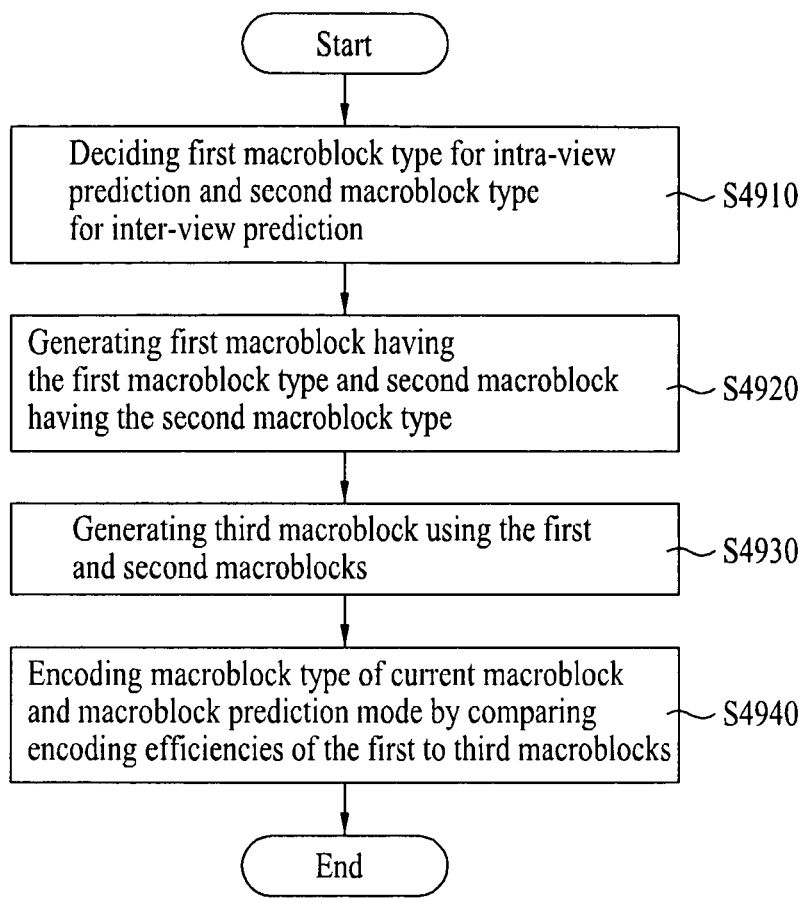
FIG. 49 is a flowchart of a method of encoding a video signal in the apparatus shown in FIG. 48 according to the present invention.

FIG. 49 is a flowchart of a method of encoding a video signal in the encoding apparatus shown in FIG. 48 according to an embodiment of the present invention.

Referring to FIG. 49, a method of encoding a video signal according to an embodiment of the present invention includes a step S4910 of deciding a first macroblock type for intra-view prediction and a second macroblock type for inter-view prediction, a step S4920 of generating a first macroblock having the first macroblock type and a second macroblock having the second macroblock type, a step S4930 of generating a third macroblock using the first and second macroblocks, and a step S4940 of encoding a macroblock type of a current macroblock and a macroblock prediction mode.

According to the present invention, the macroblock type deciding unit 4810 decides a first macroblock type for intra-view prediction and a second macroblock type for inter-view prediction (S4910) as described in detail above.

Subsequently, the macroblock generating unit 4820 generates a first macroblock having the first macroblock type and a second macroblock having the second macroblock type (S4920) using well-known prediction techniques, and then generates a third macroblock using the first and second macroblocks (S4930). In this case, the third macroblock is generated according to a mean value between the first and second macroblocks.

Finally, the encoding unit 4830 encodes a macroblock type (mb_type) of a current macroblock and a macroblock prediction mode (mb_pred_mode) of the current macroblock by comparing encoding efficiencies of the first to third macroblocks (S4940).

In this case, there are various methods to measure the encoding efficiencies. In particular, a method using RD (rate-distortion) cost is used in this embodiment of the present invention. As is well-known, in the RD cost method, a corresponding cost is calculated with two components: an encoding bit number generated from encoding a corresponding block and a distortion value indicating an error from an actual sequence.

The first and second macroblock types may be decided in a manner of selecting a macroblock type having a minimum value of the above-explained RD cost. For instance, a macroblock type having a minimum value of the RD cost among macroblock types by intra-view prediction is decided as the first macroblock type. And, a macroblock type having a minimum value of the RD cost among macroblock types by inter-view prediction is decided as the second macroblock type.

In the step of encoding the macroblock type and the macroblock prediction mode, the macroblock type and prediction mode associated with the one of the first and second macroblocks having the smaller RD cost may be selected. Subsequently, the RD cost of the third macroblock is determined. Finally, the macroblock type and macroblock prediction mode of the current macroblock are encoded by comparing the RD cost of the selected first or second macroblock and the RD cost of the third macroblock to each other.

If the RD cost of the selected first or second macroblock is equal to or greater than the RD cost of the third macroblock, the macroblock type becomes a macroblock type corresponding to the selected first or second macroblock.

For instance, if the RD cost of the first macroblock is smaller than that of the second and third macroblocks, the current macroblock is set as the first macroblock type. And, the macroblock prediction mode (i.e., intra-view) becomes a prediction scheme of a macroblock corresponding to the RD cost.

For instance, if the RD cost of the second macroblock is smaller than that of the first and third macroblocks, an inter-view prediction scheme as a prediction scheme of the second macroblock becomes the macroblock prediction mode of the current macroblock.

Meanwhile, if the RD cost of the third macroblock is smaller than the RD costs of the first and second macroblocks, macroblock types correspond to both the first and second macroblock types. In particular, intra-view prediction and inter-view prediction macroblock types become macroblock types of the current macroblock. And, the macroblock prediction mode becomes a mixed prediction scheme resulting from mixing intra-view and inter-view predictions.

Accordingly, the present invention provides at least the following effect or advantage.

The present invention is able to exclude the redundancy information between views due to various prediction schemes between views and such information as slice types, macroblock types and macroblock prediction modes; thereby enhancing performance of encoding/decoding efficiency.

Furthermore, it will be appreciated that unless specified to the contrary, the syntaxes, flags, etc. discussed above are set by the encoder and included in the video signal sent to the decoder embodiments of the present invention.

While the present invention has been described and illustrated herein with reference to example embodiments thereof, it will be apparent to those skilled in the art that various modifications and variations can be made therein without departing from the spirit and scope of the invention.

What is claimed is:

1. A method for decoding a multi-view video data in a multi-view video data stream, comprising:

receiving the multi-view video data stream, the multi-view video data stream including a random access picture, the random access picture including a random access slice, the random access slice referencing only slices corresponding to a same time and a different view of the random access picture;

obtaining initialization information of a reference picture list for the random access slice, the initialization information representing a reference relation for a single direction or a bi-direction between a plurality of views, the initialization information including view number information and view identification information, the view number information indicating a number of reference views of the random access picture, and the view identification information providing a view identifier of each reference view for the random access picture;

obtaining type information indicating whether the random access slice is predicted from one reference picture or two reference pictures;

initializing the reference picture list using the view number information and the view identification information according to the type information;

obtaining modification information for the initialized reference picture list from the multi-view video data stream, the modification information indicating that a reference picture in the initialized reference picture list is to be reordered;

determining an assignment modification value according to the modification information, the assignment modification value specifying an inter-view reference index of the reference picture to be reordered;

modifying the initialized reference picture list, wherein the modifying includes selecting the reference picture having the inter-view reference index equal to the determined assignment modification value and reordering the reference picture by changing the inter-view reference index of the selected reference picture;

determining a prediction value of a macroblock in the random access picture based on the modified reference picture list; and decoding the macroblock using the prediction value, wherein the initialization information is obtained from an extension area of a sequence header.

2. The method of claim 1, wherein the multi-view video data includes video data of a base view independent of other views, the base view being a view decoded without using inter-view prediction.

3. The method of claim 1, wherein if the type information indicates one reference picture, prediction is single direction prediction and if the type information indicates two reference pictures, prediction is along one or more directions.

4. The method of claim 1, wherein the reference picture list is initialized for bi-direction if the type information indicates the random access slice is predicted from two reference pictures.

5. The method of claim 1, wherein the type information is obtained from a slice header.

6. The method of claim 1, wherein the inter-view reference index is assigned by performing a subtraction operation or an addition operation according to the modification information.

7. The method of claim 1, wherein the modification information is obtained from a slice header.

8. The method of claim 1, wherein the determined assignment modification value is used to assign the changed inter-view reference index to the random access picture in the initialized reference picture list.

9. The method of claim 1, wherein the position of any other remaining pictures are shifted to later in the initialized reference picture list.

10. An apparatus for decoding a multi-view video data in a multi-view video data stream, comprising:

a parsing unit receiving the multi-view video data stream, the multi-view video data stream including a random access picture, the random access picture including a random access slice, the random access slice referencing only slices corresponding to a same time and a different view of the random access picture, and obtaining initialization information of a reference picture list for the random access slice, the initialization information representing a reference relation for a single direction or a bi-direction between a plurality of views, the initialization information including view number information and view identification information, the view number information indicating a number of reference views of the random access picture, and the view identification information providing a view identifier of each reference view for the random access picture, and obtaining type information indicating whether the random access slice is predicted from one reference picture or two reference pictures;

a decoded picture buffer unit initializing the reference picture list using the view number information and the view identification information according to the type information, and obtaining modification information for the initialized reference picture list from the multi-view video data stream, the modification information indicating that a reference picture in the initialized reference picture list is to be reordered, and determining an assignment modification value according to the modification information, the assignment modification value specifying an inter-view reference index of the reference picture to be reordered, and modifying the initialized reference picture list, wherein the modifying includes selecting the reference picture having the inter-view reference index equal to the determined assignment modification value and reordering the reference picture by changing the inter-view reference index of the selected reference picture; and an inter-prediction unit determining a prediction value of a macroblock in the random access picture based on the modified reference picture list, and decoding the macroblock using the prediction value, wherein the initialization information is obtained from an extension area of a sequence header.

11. The apparatus of claim 10, wherein the multi-view video data includes video data of a base view independent of other views, the base view being a view decoded without using inter-view prediction.

12. The apparatus of claim 10, wherein if the type information indicates one reference picture, prediction is single direction prediction and if the type information indicates two reference pictures, prediction is along one or more directions.

* * * * *